United States Patent
Bacastow et al.

(10) Patent No.: US 11,895,125 B2
(45) Date of Patent: *Feb. 6, 2024

(54) METHOD AND SYSTEM FOR FORENSIC DATA TRACKING

(71) Applicant: QuickVault, Inc., Cumming, GA (US)

(72) Inventors: Steven V. Bacastow, Cumming, GA (US); Michael Royd Heuss, Alachua, FL (US)

(73) Assignee: QUICKVAULT, INC., Cumming, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,563

(22) Filed: Apr. 24, 2023

(65) Prior Publication Data

US 2023/0269255 A1    Aug. 24, 2023

Related U.S. Application Data

(63) Continuation of application No. 17/244,505, filed on Apr. 29, 2021, now Pat. No. 11,637,840, which is a continuation of application No. 16/695,949, filed on Nov. 26, 2019, now Pat. No. 10,999,300, which is a continuation of application No. 15/965,625, filed on Apr. 27, 2018, now Pat. No. 10,498,745, which is a continuation of application No. 15/406,746, filed on Jan. 15, 2017, now Pat. No. 9,961,092, which is a continuation of application No. 14/853,464, filed on Sep. 14, 2015, now Pat. No. 9,565,200.

(60) Provisional application No. 62/186,530, filed on Jun. 30, 2015, provisional application No. 62/082,258, (Continued)

(51) Int. Cl.
   *H04L 9/40*     (2022.01)
   *G06F 21/55*    (2013.01)

(52) U.S. Cl.
   CPC ........ *H04L 63/1408* (2013.01); *G06F 21/552* (2013.01); *H04L 63/10* (2013.01); *H04L 63/1433* (2013.01); *H04L 63/20* (2013.01); *H04L 63/105* (2013.01)

(58) Field of Classification Search
   CPC ............ H04L 63/1408; H04L 63/1433; H04L 63/105
   See application file for complete search history.

(56) References Cited

U.S. PATENT DOCUMENTS

| 5,331,136 A | 7/1994 | Koench et al. |
| 5,566,339 A | 10/1996 | Perholtz et al. |
| 5,592,618 A | 1/1997 | Micka et al. |

(Continued)

FOREIGN PATENT DOCUMENTS

| CN | 103700195 A1 | 2/2014 |
| WO | 03/009620 | 1/2003 |

OTHER PUBLICATIONS

International Searching Authority, International Search Report and Written Opinion, dated Jan. 14, 2016, Moscow, Russia, PCT/US/2015/049979.

(Continued)

*Primary Examiner* — Oleg Korsak
(74) *Attorney, Agent, or Firm* — King & Spalding LLP

(57) ABSTRACT

The present invention relates to a method and system for tracking the movement of data elements as they are shared and moved between authorized and unauthorized devices and among authorized and unauthorized users.

30 Claims, 32 Drawing Sheets

Related U.S. Application Data filed on Nov. 20, 2014, provisional application No. 62/049,514, filed on Sep. 12, 2014.

(56) References Cited

U.S. PATENT DOCUMENTS

| | | | |
|---|---|---|---|
| 5,659,595 A | 8/1997 | Chanu et al. | |
| 5,696,909 A | 12/1997 | Wallner | |
| 5,790,074 A | 8/1998 | Rangedahl et al. | |
| 5,844,776 A | 12/1998 | Yamaguchi et al. | |
| 5,903,646 A | 5/1999 | Rackman | |
| 5,956,733 A | 9/1999 | Nakano et al. | |
| 5,979,753 A | 11/1999 | Rosia | |
| 6,003,008 A | 12/1999 | Postrel et al. | |
| 6,062,478 A | 5/2000 | Izaguirre et al. | |
| 6,166,688 A | 12/2000 | Cromer et al. | |
| 6,170,060 B1 | 1/2001 | Mott et al. | |
| 6,442,682 B1 | 8/2002 | Pothapragada et al. | |
| 6,553,348 B1 | 4/2003 | Hashimoto | |
| 6,574,716 B2 | 6/2003 | Dovi | |
| 6,546,441 B1 | 8/2003 | Lum | |
| 6,614,349 B1 | 9/2003 | Proctor et al. | |
| 6,640,217 B1 | 10/2003 | Scanlan et al. | |
| 6,704,885 B1 | 9/2004 | Salas-Meza et al. | |
| 6,901,511 B1 | 5/2005 | Ofsuka | |
| 6,950,949 B1 | 9/2005 | Gilchrist | |
| 7,103,684 B2 | 9/2006 | Chen et al. | |
| 7,143,289 B2 | 11/2006 | Denning et al. | |
| 7,165,154 B2 | 1/2007 | Coombs et al. | |
| 7,225,208 B2 | 5/2007 | Midgley | |
| 7,229,016 B2 | 6/2007 | Bravo | |
| 7,263,190 B1 | 8/2007 | Moritz | |
| 7,269,732 B2 | 9/2007 | Killian-Kehr | |
| 7,356,510 B2 | 4/2008 | Durand et al. | |
| 7,356,703 B2 | 4/2008 | Chebolu et al. | |
| 7,403,743 B2 | 7/2008 | Welch | |
| 7,404,088 B2 | 7/2008 | Giobbi | |
| 7,421,516 B2 | 9/2008 | Minogue et al. | |
| 7,543,053 B2 | 6/2009 | Goodman | |
| 7,561,691 B2 | 7/2009 | Blight et al. | |
| 7,702,922 B2 | 4/2010 | Hetzler | |
| 7,739,402 B2 | 6/2010 | Roese et al. | |
| 7,818,608 B2 | 10/2010 | DeMaio et al. | |
| 8,041,677 B2 | 10/2011 | Sumner et al. | |
| 8,086,688 B1 | 12/2011 | Bacastow | |
| 8,180,735 B2 | 5/2012 | Ansari et al. | |
| 8,316,102 B2 | 11/2012 | Matsuzaki et al. | |
| 8,862,687 B1 | 10/2014 | Bacastow | |
| 8,868,683 B1 | 10/2014 | Bacastow | |
| 9,166,993 B1 * | 10/2015 | Liu | H04L 63/1425 |
| 10,498,745 B2 | 12/2019 | Bacastow | |
| 10,999,300 B2 | 5/2021 | Bacastow | |
| 11,637,840 B2 * | 4/2023 | Bacastow | H04L 63/1433 726/1 |
| 2002/0082925 A1 | 6/2002 | Herwig | |
| 2002/0188856 A1 | 12/2002 | Worby | |
| 2002/0193157 A1 | 12/2002 | Yamada et al. | |
| 2003/0005193 A1 | 2/2003 | Seroussi et al. | |
| 2003/0046034 A1 | 3/2003 | Kitamoto et al. | |
| 2003/0050940 A1 | 3/2003 | Robinson | |
| 2003/0055792 A1 | 3/2003 | Kinoshita et al. | |
| 2003/0074575 A1 | 4/2003 | Hoberock et al. | |
| 2003/0110371 A1 | 6/2003 | Yang et al. | |
| 2003/0135418 A1 | 7/2003 | Shekhar et al. | |
| 2003/0174167 A1 | 9/2003 | Poo et al. | |
| 2003/0225971 A1 | 12/2003 | Oishi et al. | |
| 2003/0233501 A1 | 12/2003 | Ma et al. | |
| 2004/0001088 A1 | 1/2004 | Stancil et al. | |
| 2004/0019742 A1 | 1/2004 | Wei et al. | |
| 2004/0038592 A1 | 2/2004 | Yang | |
| 2004/0039575 A1 | 2/2004 | Bum | |
| 2004/0039851 A1 | 2/2004 | Tang et al. | |
| 2004/0039854 A1 | 2/2004 | Stakhri et al. | |
| 2004/0095382 A1 | 5/2004 | Fisher et al. | |
| 2004/0187012 A1 | 9/2004 | Kohiyama et al. | |
| 2005/0010768 A1 | 1/2005 | Light et al. | |
| 2005/0010835 A1 | 1/2005 | Childs et al. | |
| 2005/0081198 A1 | 4/2005 | Cho et al. | |
| 2005/0125513 A1 | 6/2005 | Lam et al. | |
| 2005/0138390 A1 | 6/2005 | Adams et al. | |
| 2005/0144443 A1 | 6/2005 | Cromer et al. | |
| 2005/0149394 A1 | 7/2005 | Postrel | |
| 2005/0149684 A1 | 7/2005 | Sankaran et al. | |
| 2005/0149745 A1 | 7/2005 | Ishidoshiro | |
| 2005/0216466 A1 | 9/2005 | Miyamoto et al. | |
| 2006/0010328 A1 | 1/2006 | Liu et al. | |
| 2006/0041934 A1 | 2/2006 | Hetzler | |
| 2006/0206720 A1 | 9/2006 | Harada et al. | |
| 2006/0209337 A1 | 9/2006 | Atobe et al. | |
| 2006/0253620 A1 | 11/2006 | Kang | |
| 2007/0028304 A1 | 2/2007 | Brennan | |
| 2007/0038681 A1 | 2/2007 | Pierce | |
| 2007/0081508 A1 | 4/2007 | Madhaven et al. | |
| 2007/0118847 A1 | 5/2007 | Sugimoto et al. | |
| 2007/0143529 A1 | 6/2007 | Bacastow | |
| 2007/0174911 A1 | 7/2007 | Kronenberg | |
| 2007/0214047 A1 | 9/2007 | Antonello et al. | |
| 2007/0245158 A1 | 10/2007 | Giobbi et al. | |
| 2008/0022003 A1 | 1/2008 | Alve | |
| 2008/0082813 A1 | 4/2008 | Chow et al. | |
| 2008/0177755 A1 | 7/2008 | Stern et al. | |
| 2011/0040641 A1 | 2/2011 | Bacastow et al. | |
| 2012/0066759 A1 | 3/2012 | Chen et al. | |
| 2013/0191355 A1 | 7/2013 | Bone et al. | |
| 2013/0247185 A1 | 9/2013 | Viscuso et al. | |
| 2014/0325609 A1 | 10/2014 | Bacastow | |

OTHER PUBLICATIONS

Iomega Automatic Backup Manual Table of Contents (hereafter "IAB" archived on Dec. 22, 2002 at: http://web.archive.org/web/20021222172018/http://www.iomega.com/support/manuals/ioauto/main.html (linking to 22 pages—hereafter "IAB1" . . . "IAB22").

http://web.archive.org/web/20021030183837/www.iomega.com/support/manuals/ioauto/qs_setup.html (hereafter "IAB1") (archived in 2002).

http://web.archive.org/web/20021223082620/www.iomega.com/support/manuals/ioauto/qs_schedule.html (hereafter "IAB11") (archived in 2002).

http://web.archive.org/web/20021223081144/www.iomega.com/support/manuals/ioauto/qs_cache.html (hereafter "IAB12") (archived in 2002).

http://web.archive.org/web/20021223075646/www.iomega.com/support/manuals/ioauto/qs_nomonitor.html (hereafter "IAB13") (archived in 2002).

http://web.archive.org/web20021223081714/www.iomega.com/support/manuals/ioauto/qs_restore.html (hereafter "IAB15") (archived in 2002).

Blaze, Matt. "A cryptographic file system for UNIX." Proceedings of the 1st ACM conference on Computer and communications security. ACM, 1993.

Extended European Search Report for European Patent Application No. 15840841.9, dated Jan. 16.

Tan, Yu Shyang et al., "Tracking of Data Leaving the Cloud", Jun. 25, 2012.

Oberheide, Jonathan Clarke et al., "Leveraging the Cloud for Software Security Services", Jan. 1, 2012.

* cited by examiner

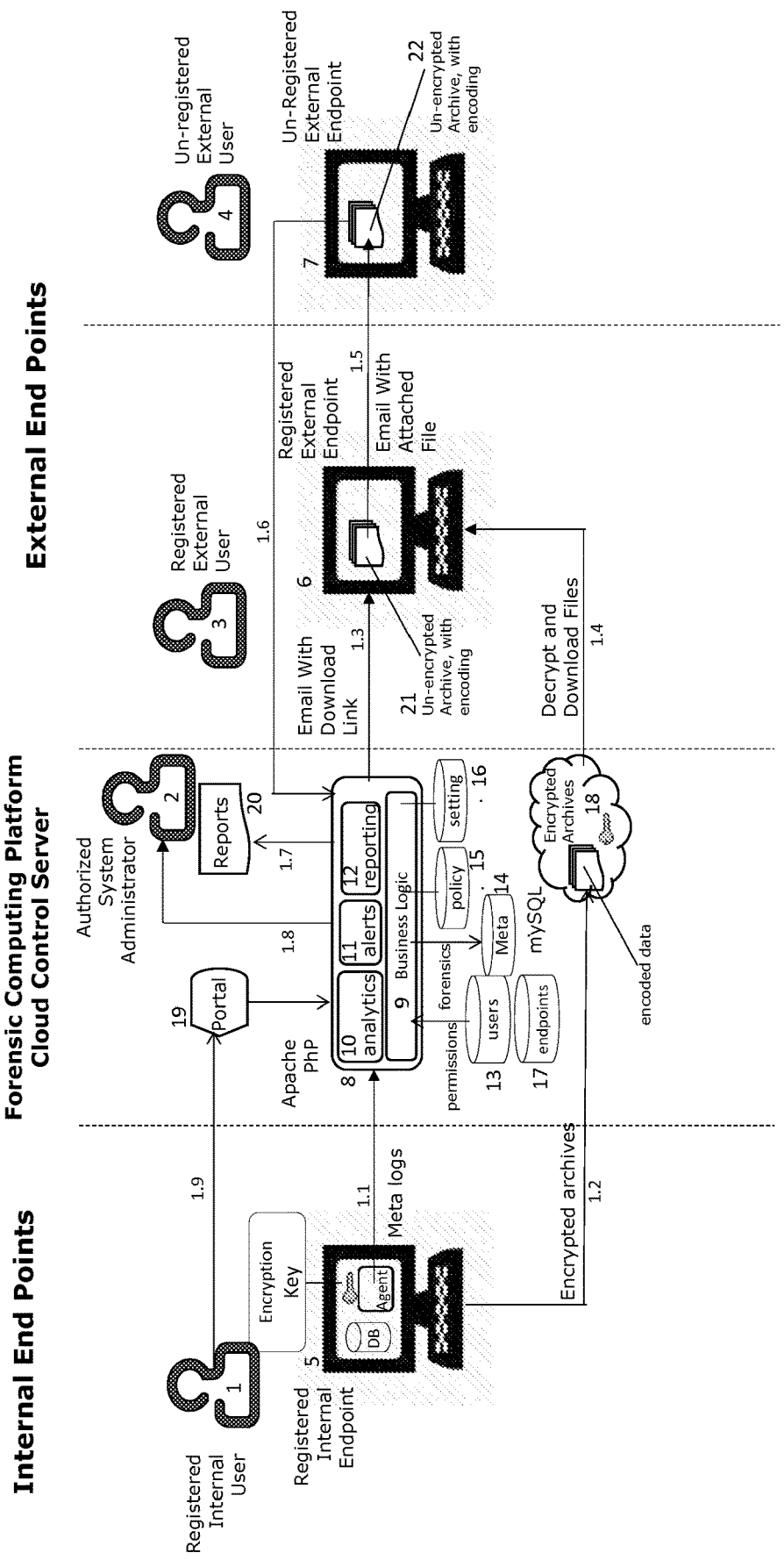
Figure 1 – Forensic Computing Environment

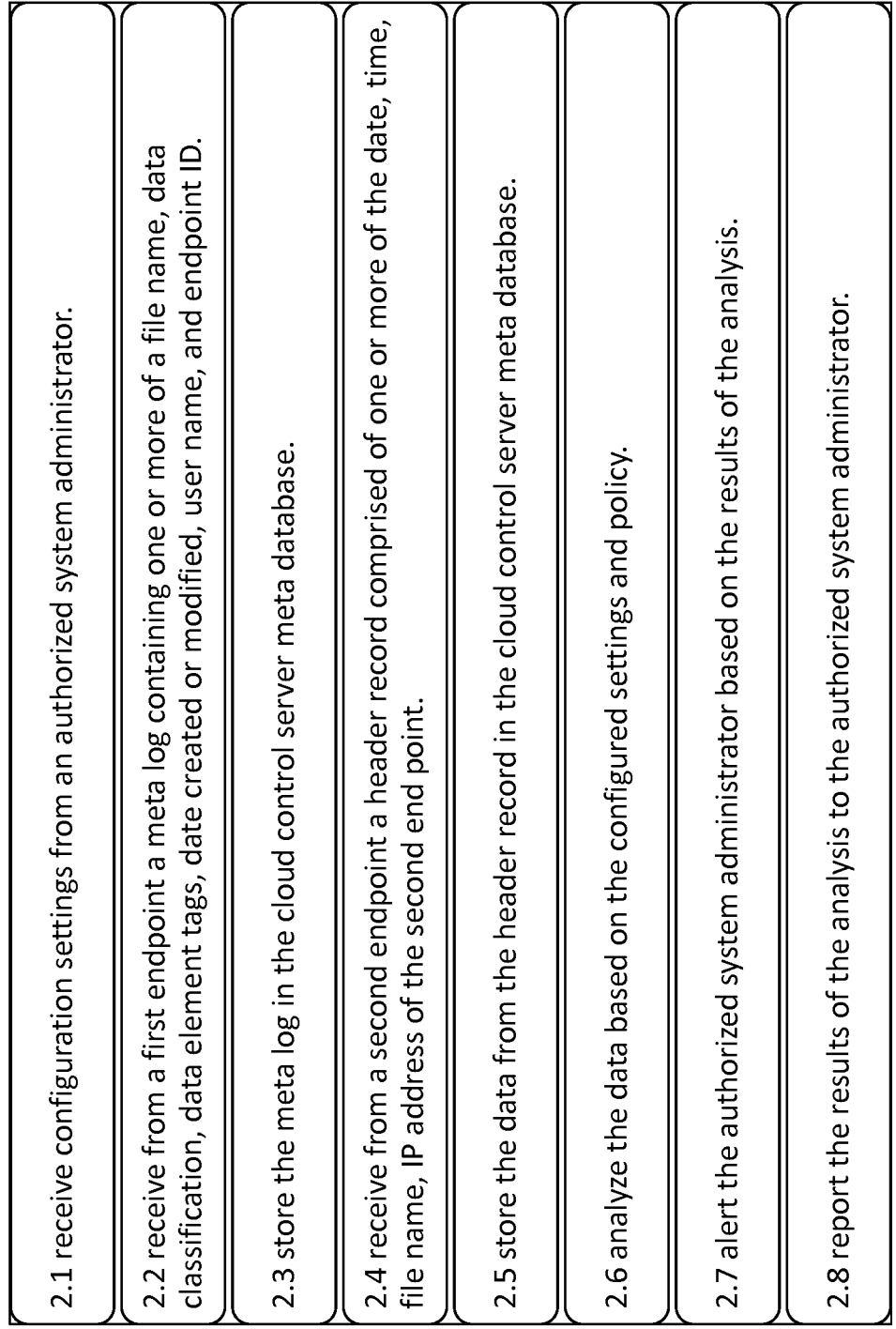
Figure 2 – Tracking Data Element movement

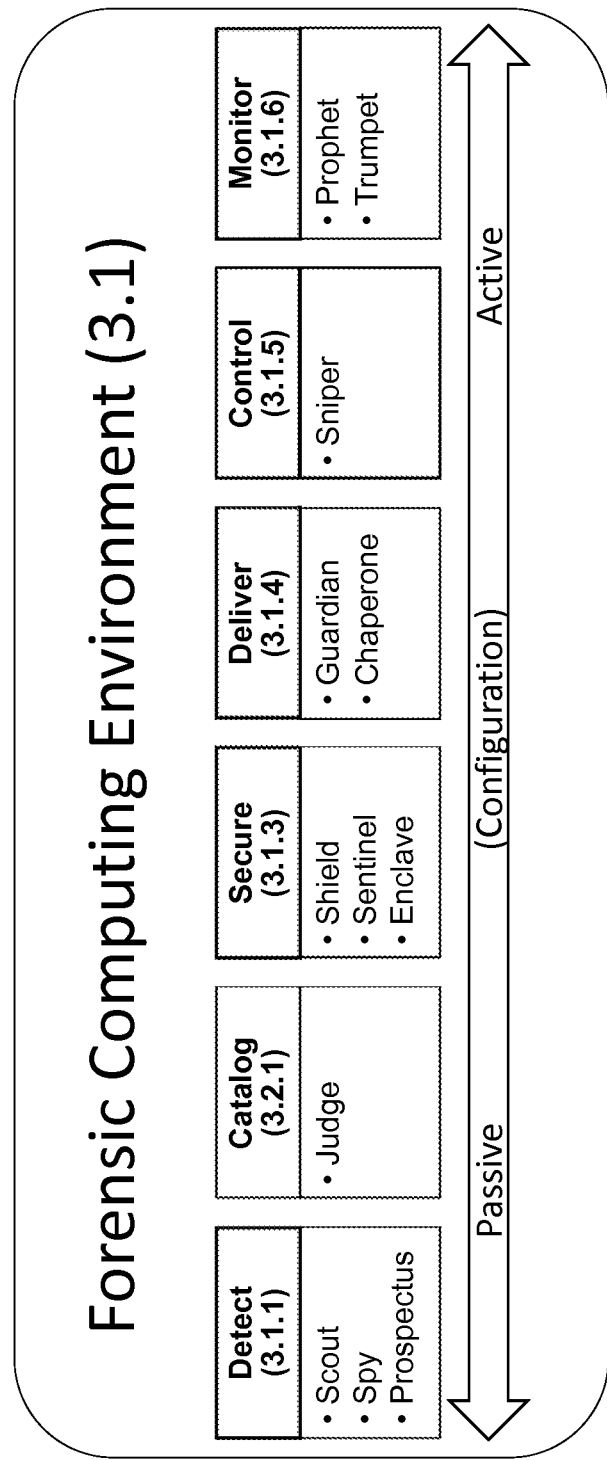
Figure 3 – Product Framework

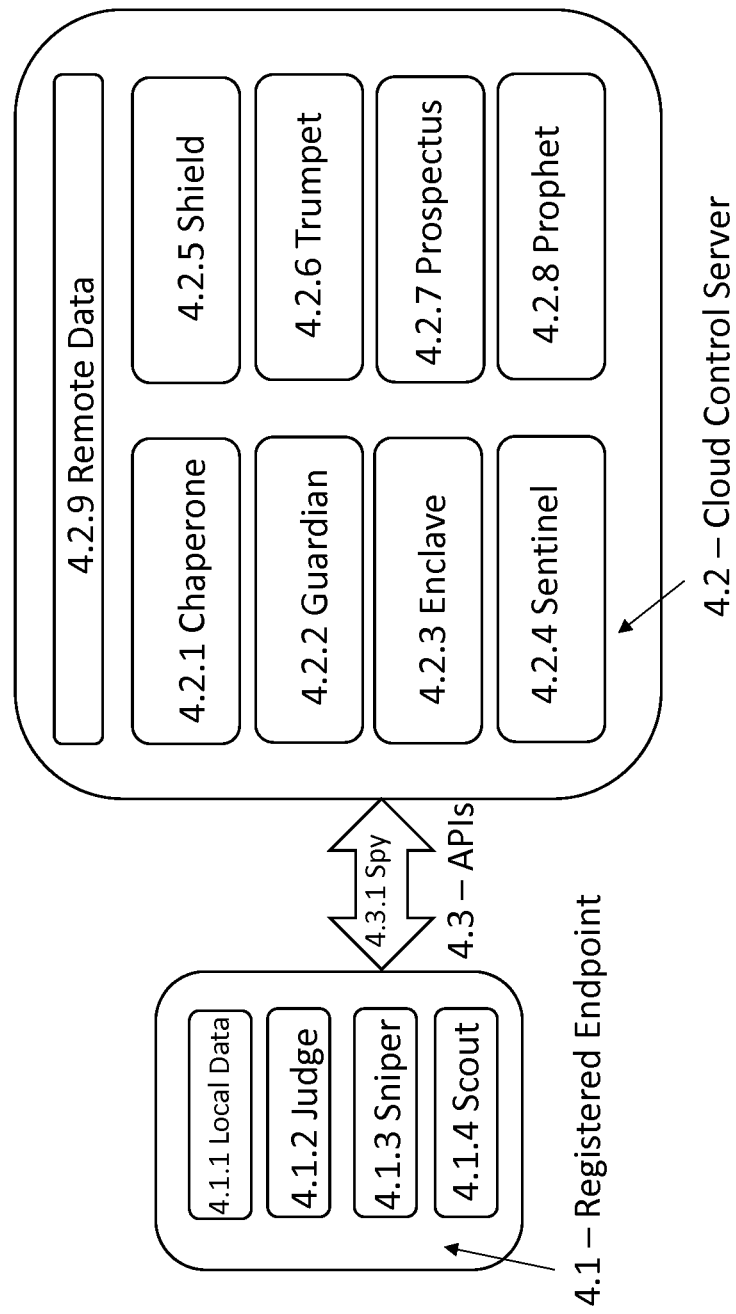
Figure 4 - Functional Model

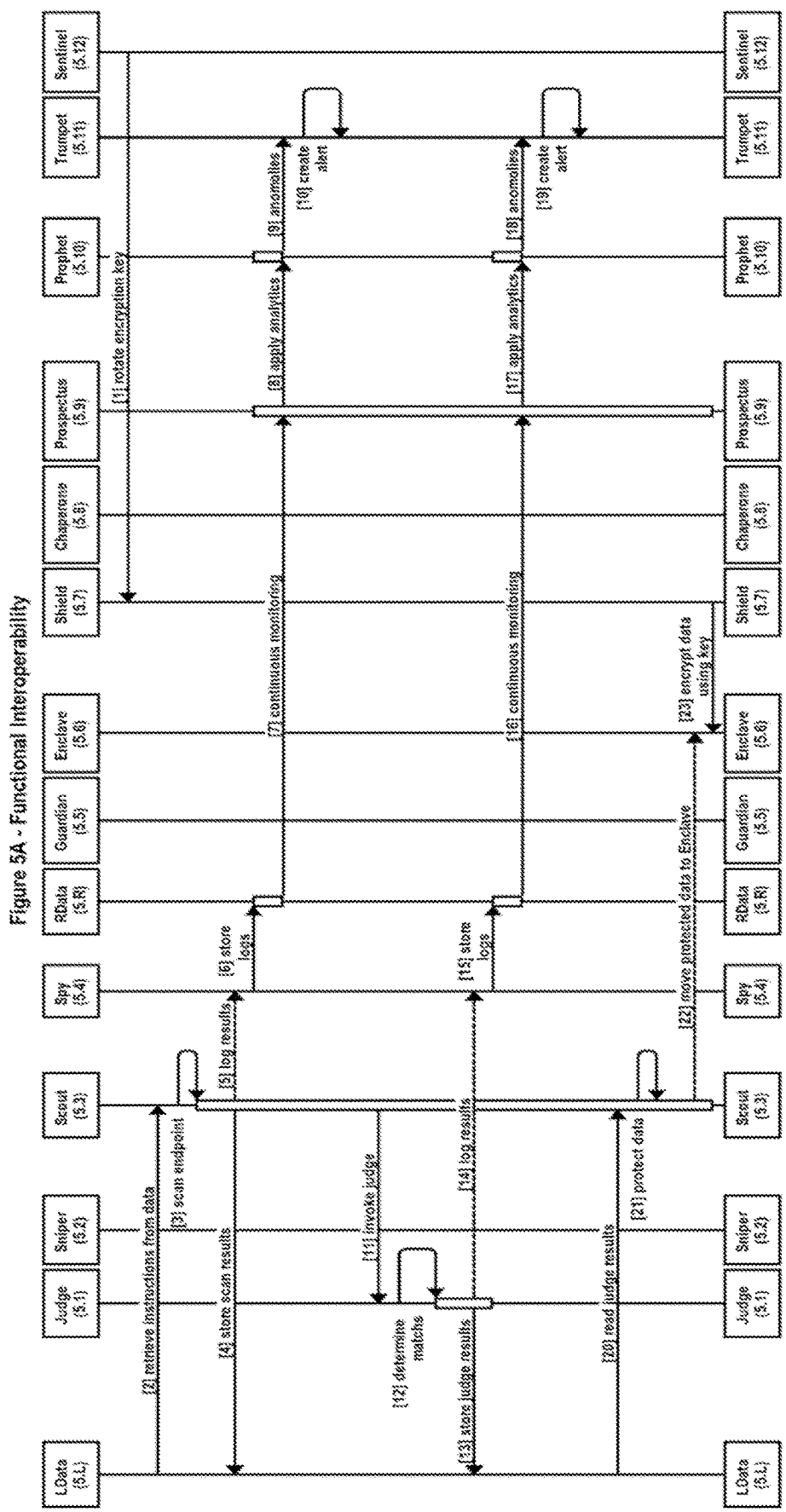

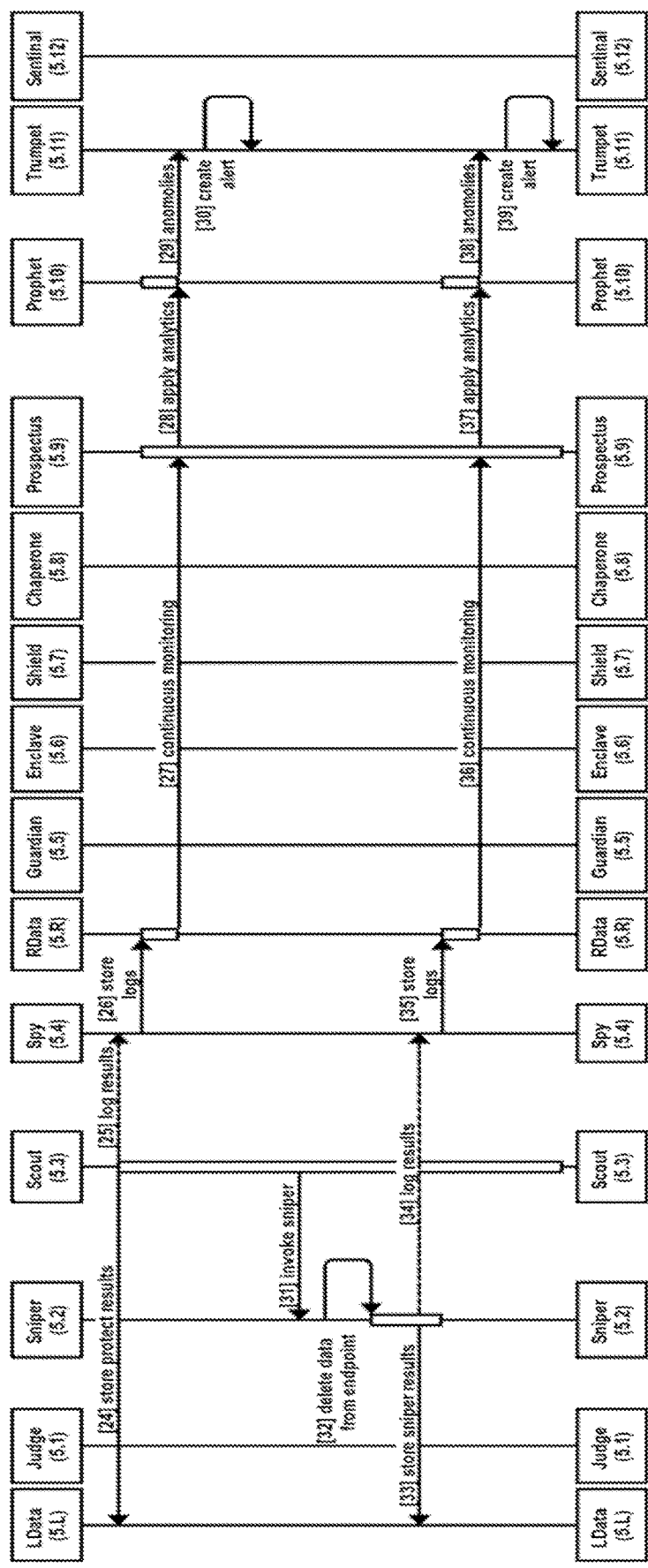

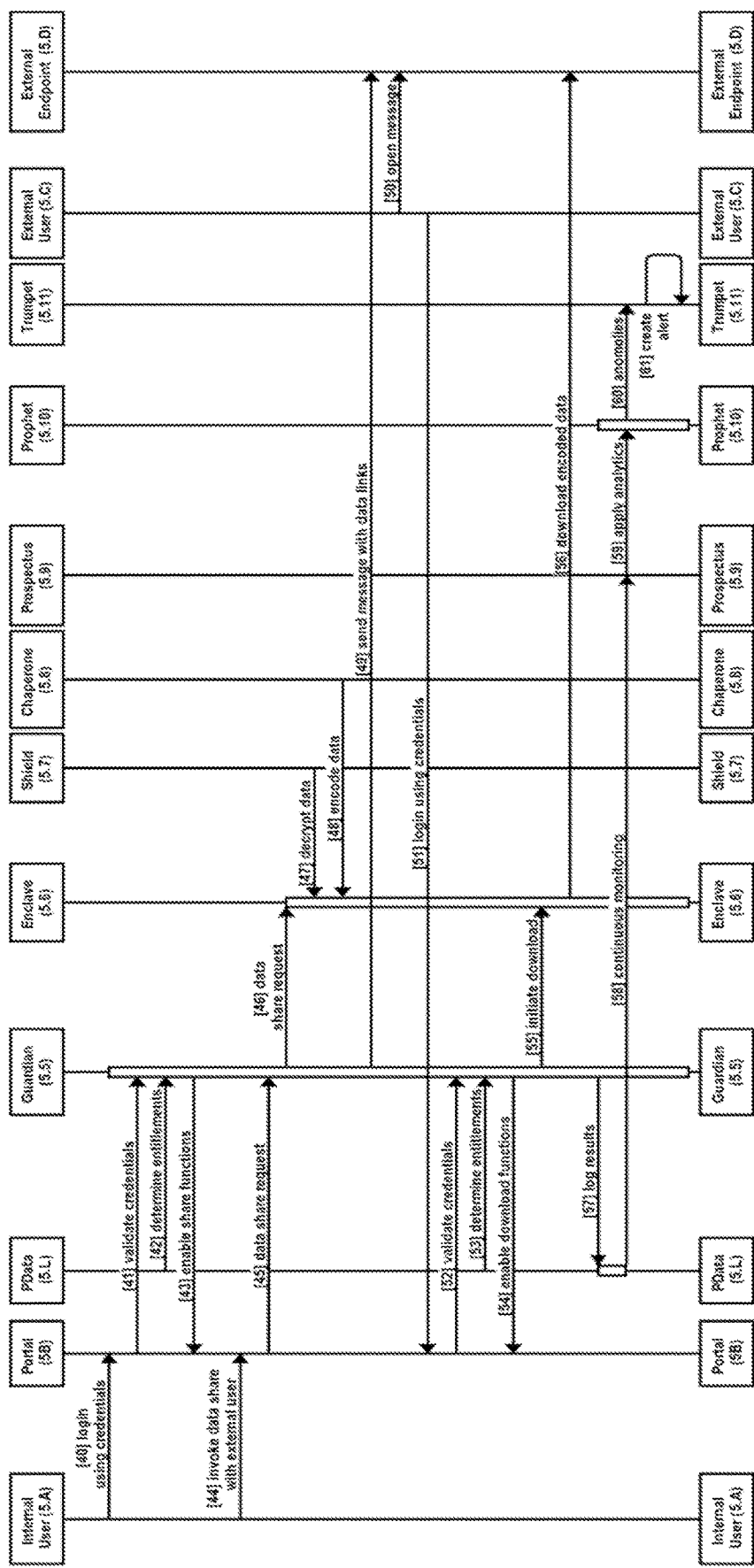

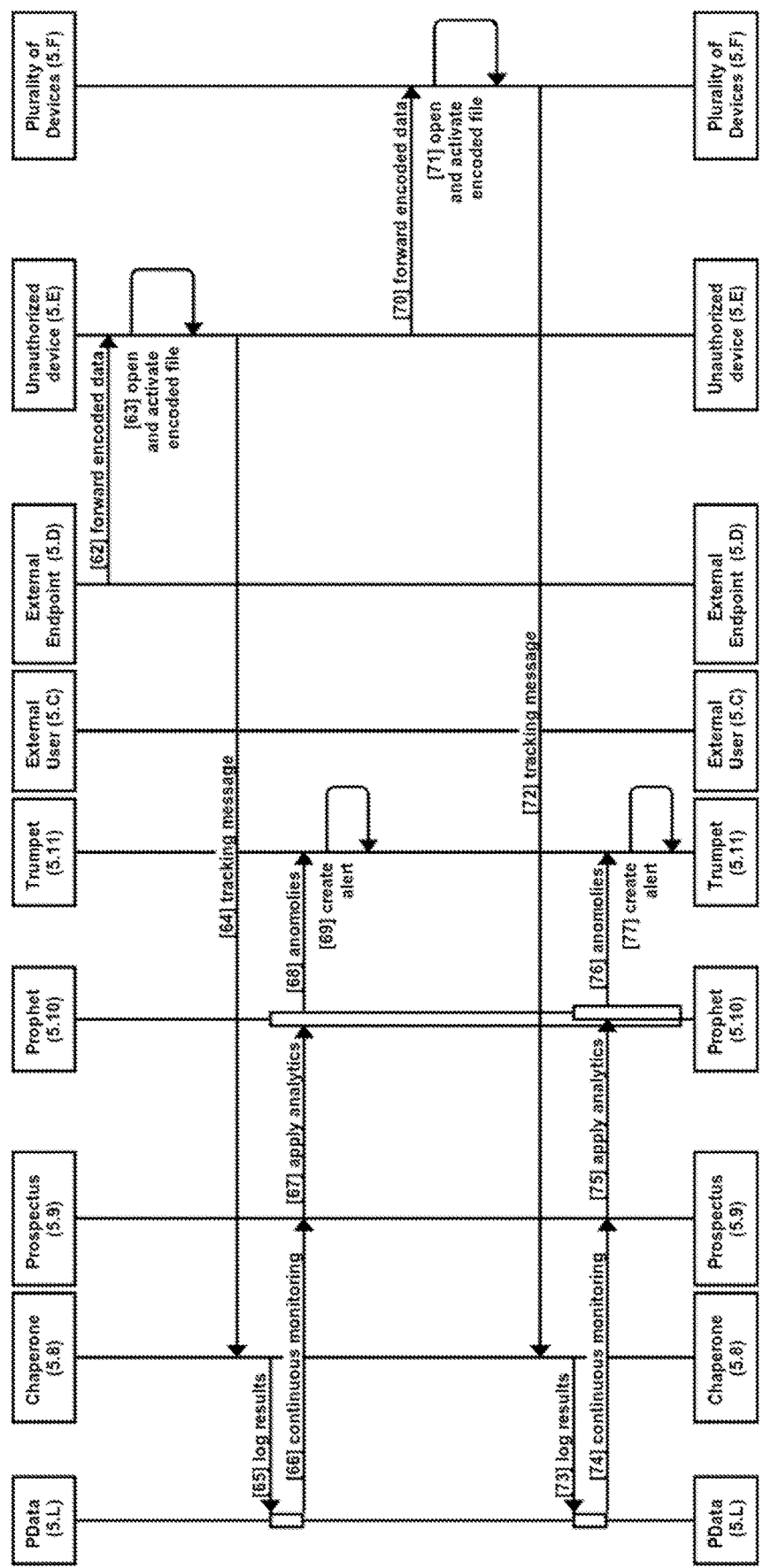
Figure 5D - Functional Interoperability

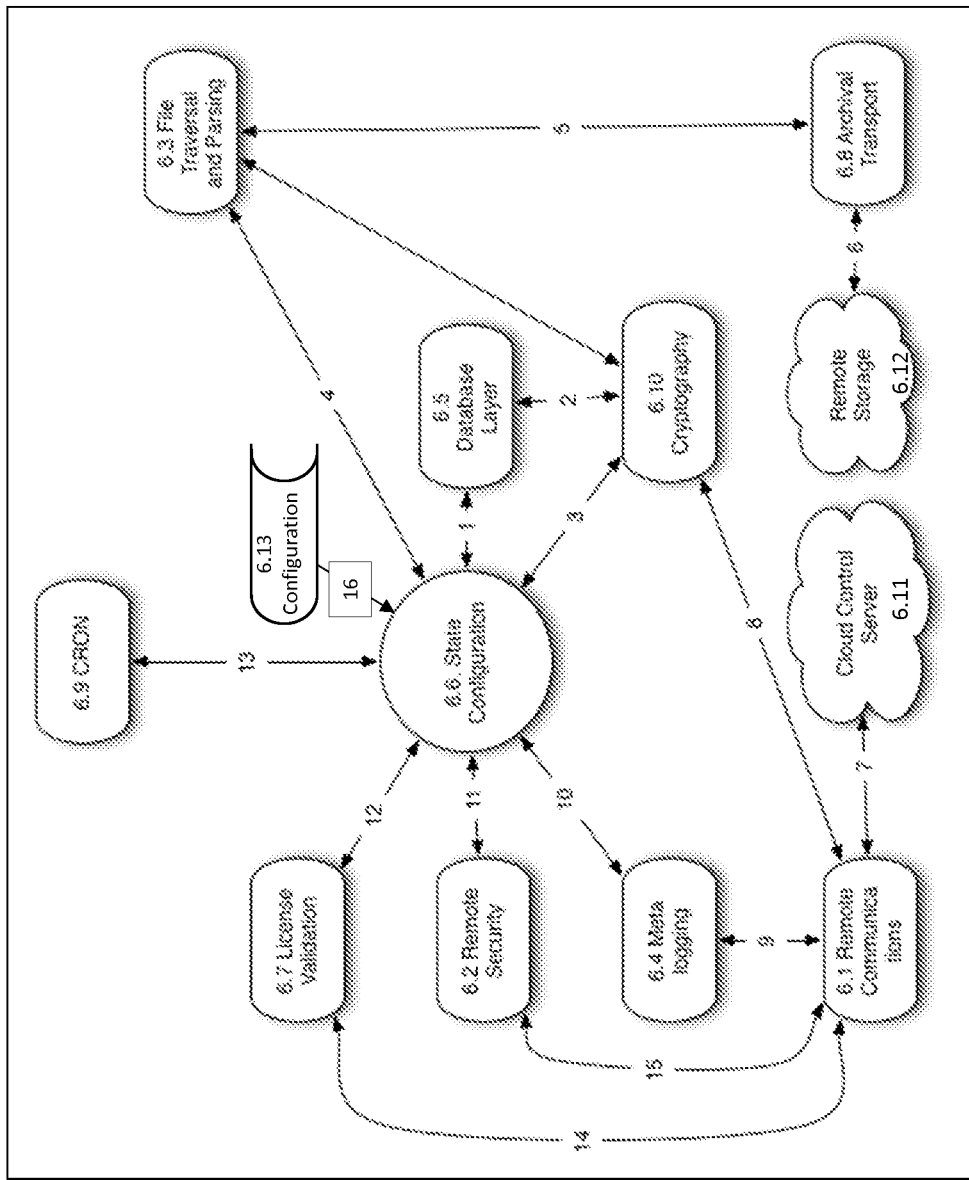
Figure 6 – Technical Layer Overview

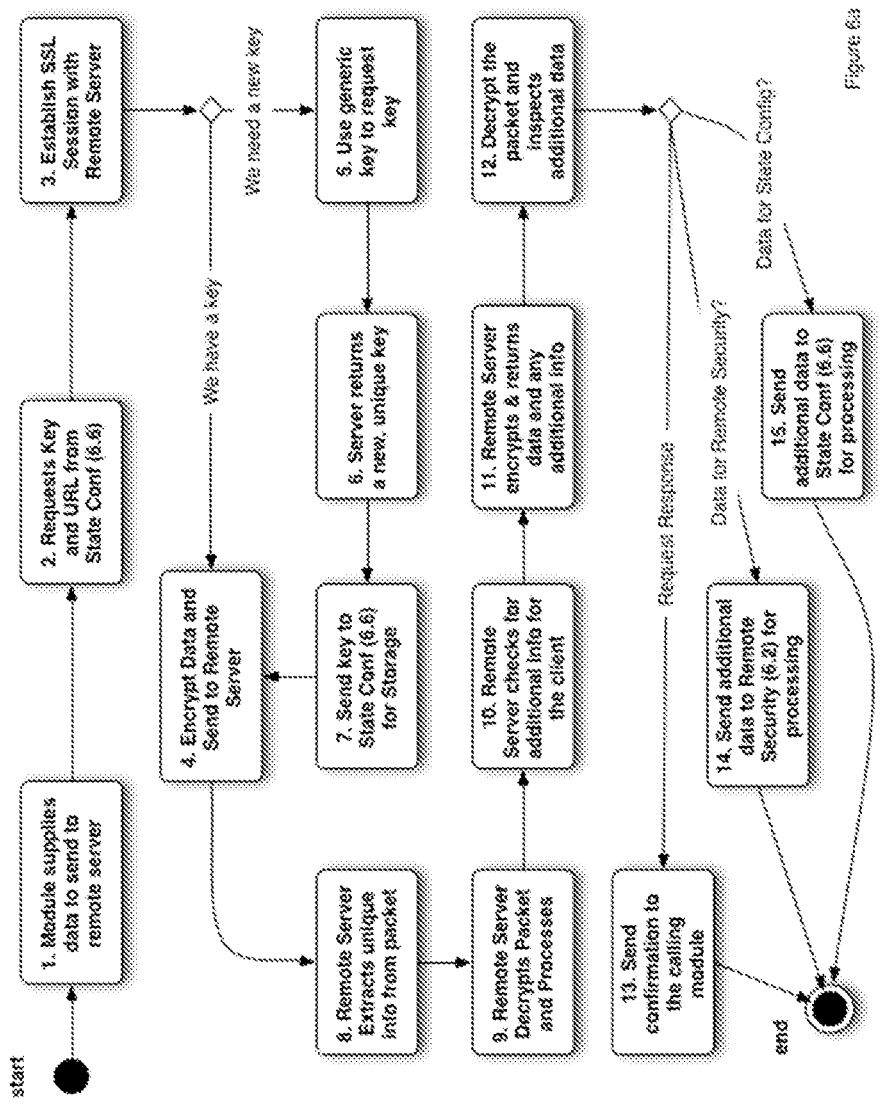
Figure 6a- Sequence Flow of the Technical Layer Overview

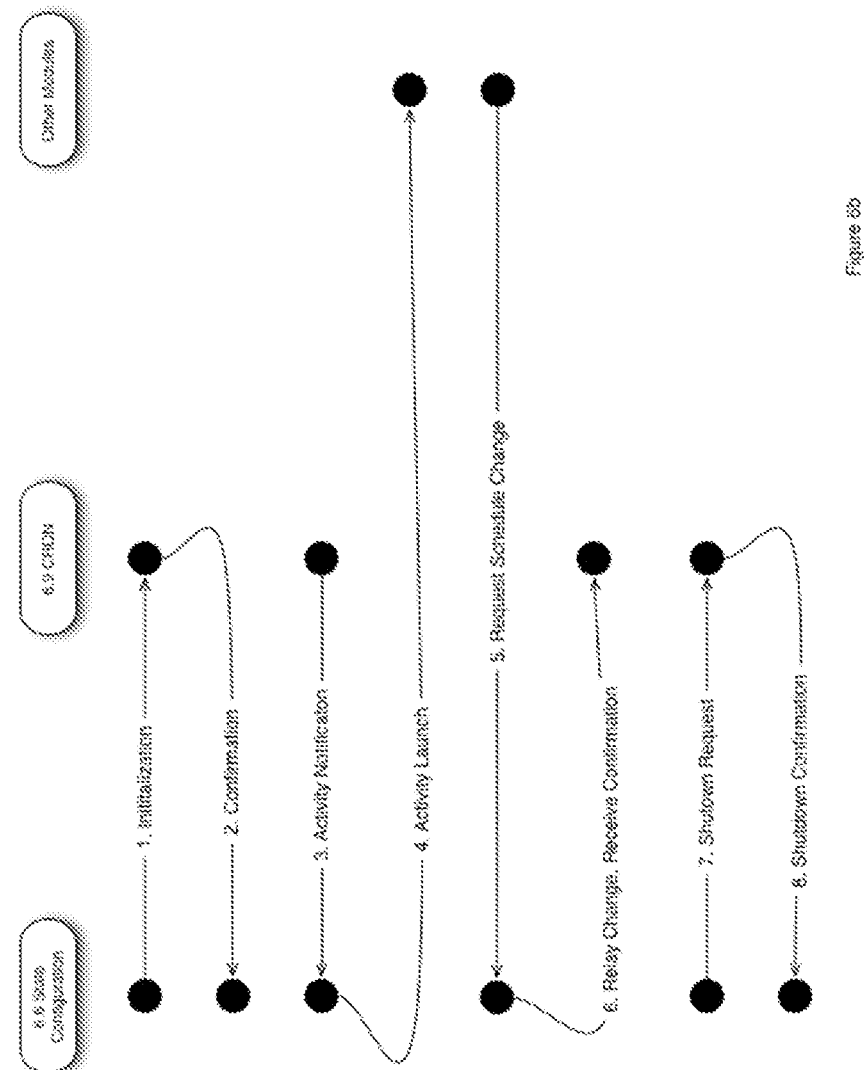
Figure 6b – State Configuration and CRON interaction

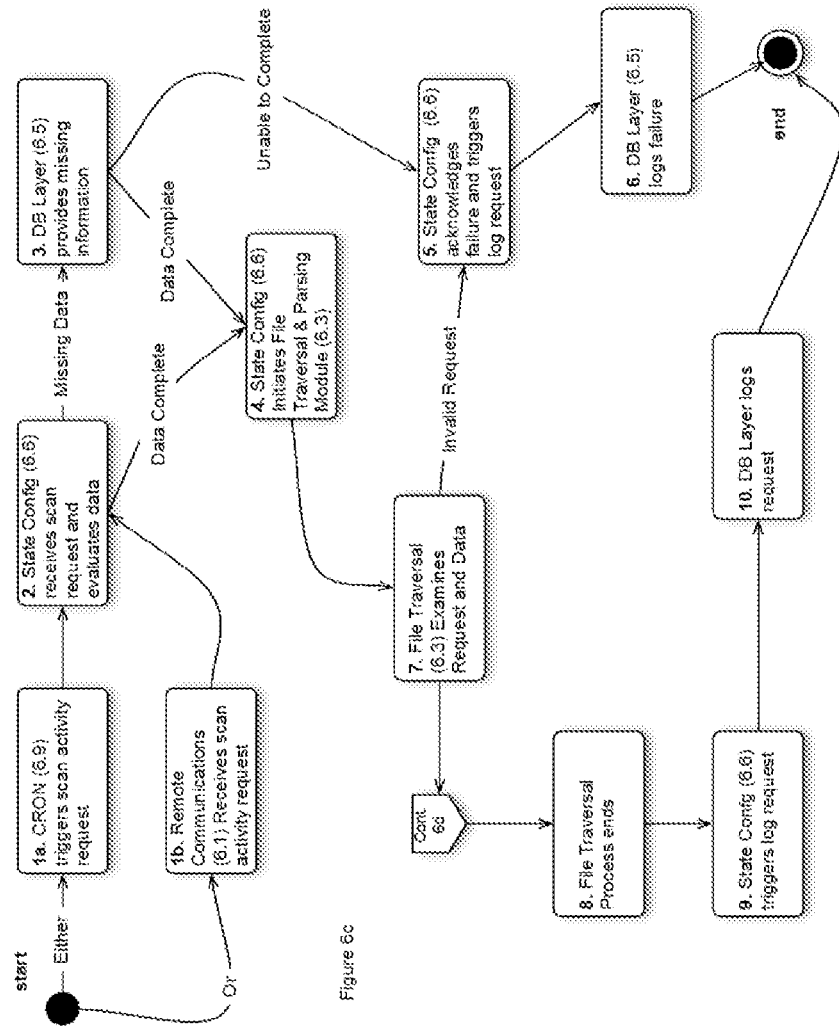
Figure 6c – File Traversal Flow Chart

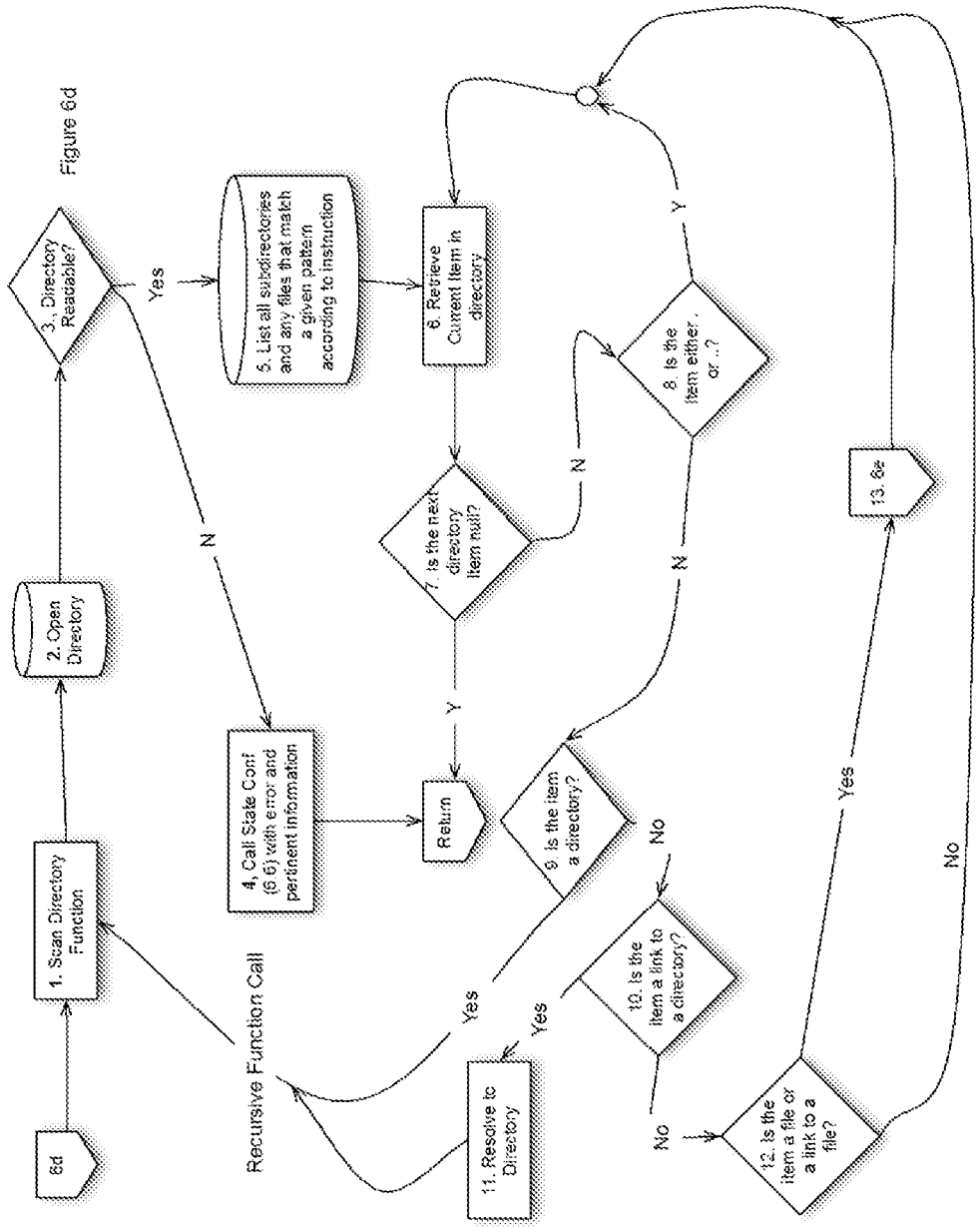
Figure 6d – File Traversal Flow Chart, details

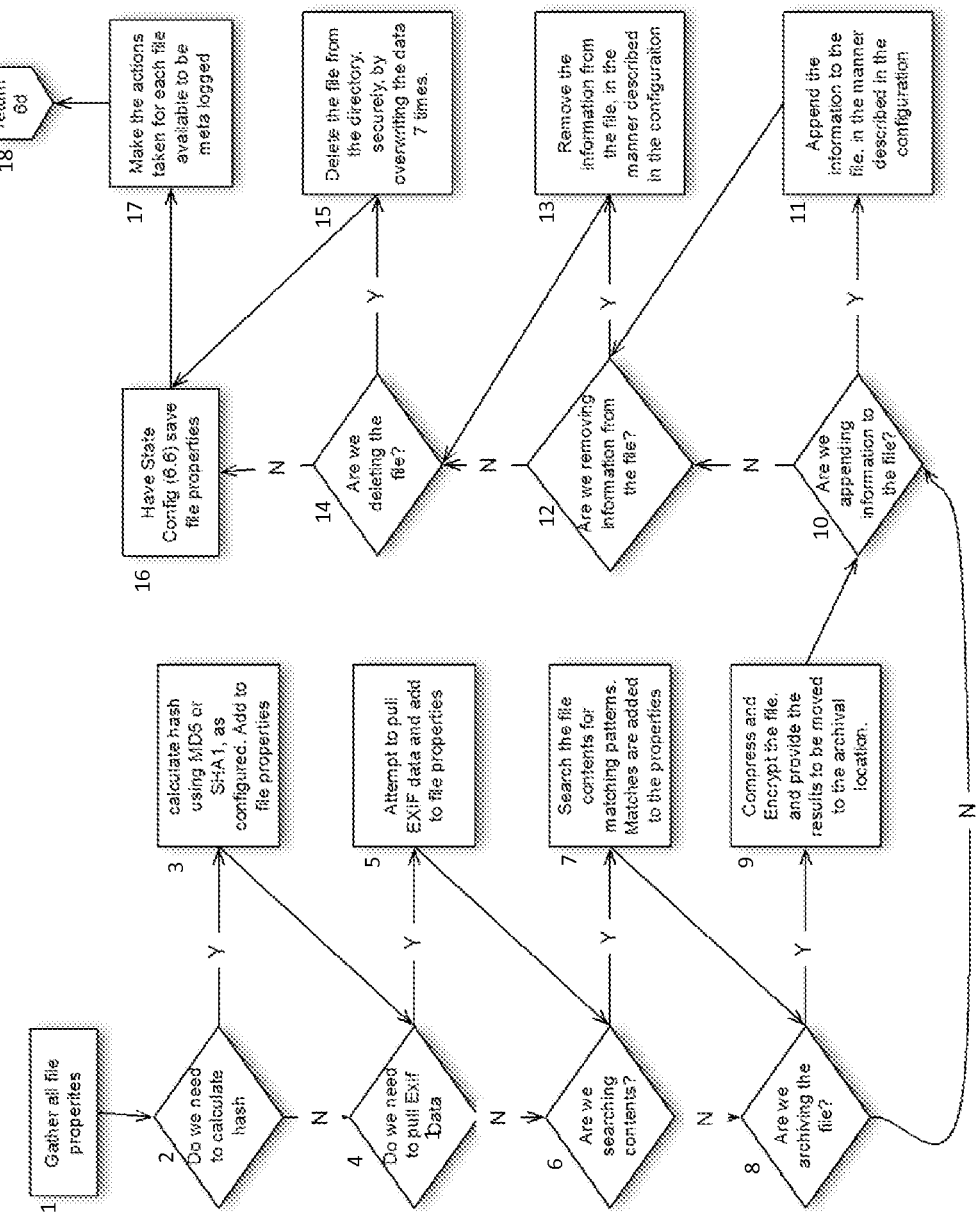
Figure 6e – File Traversal Flow Chart, additional details

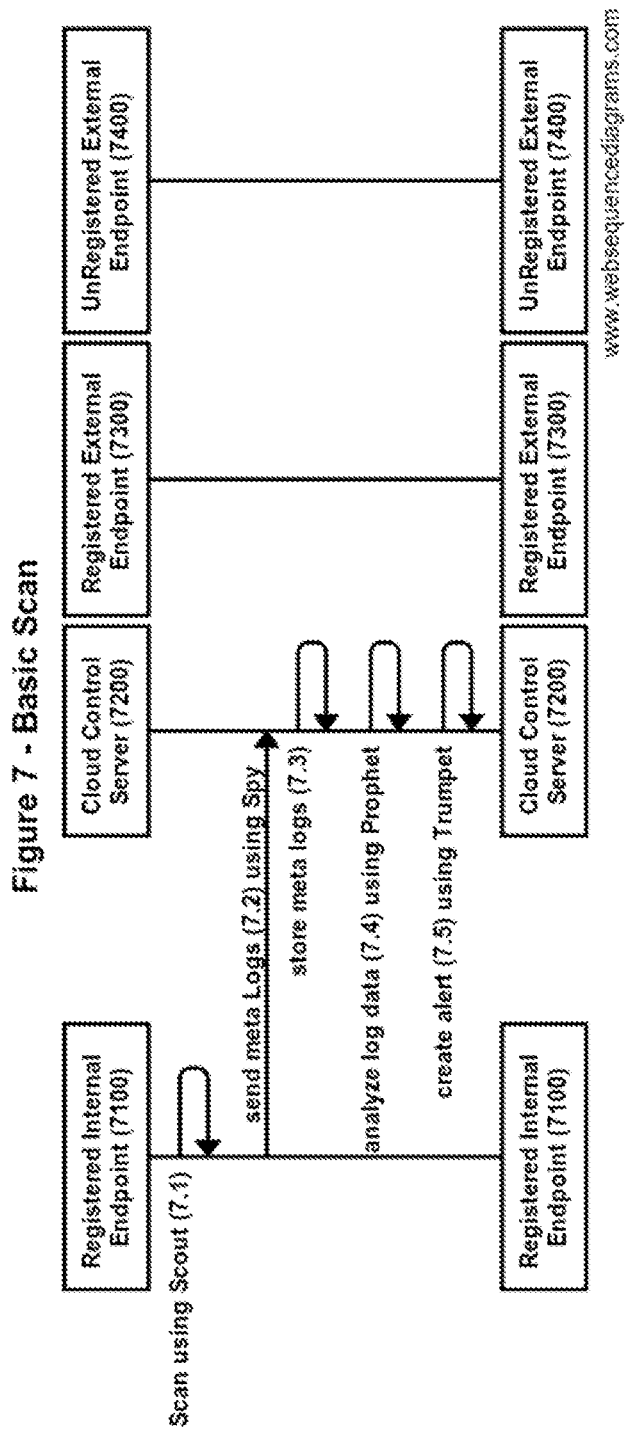

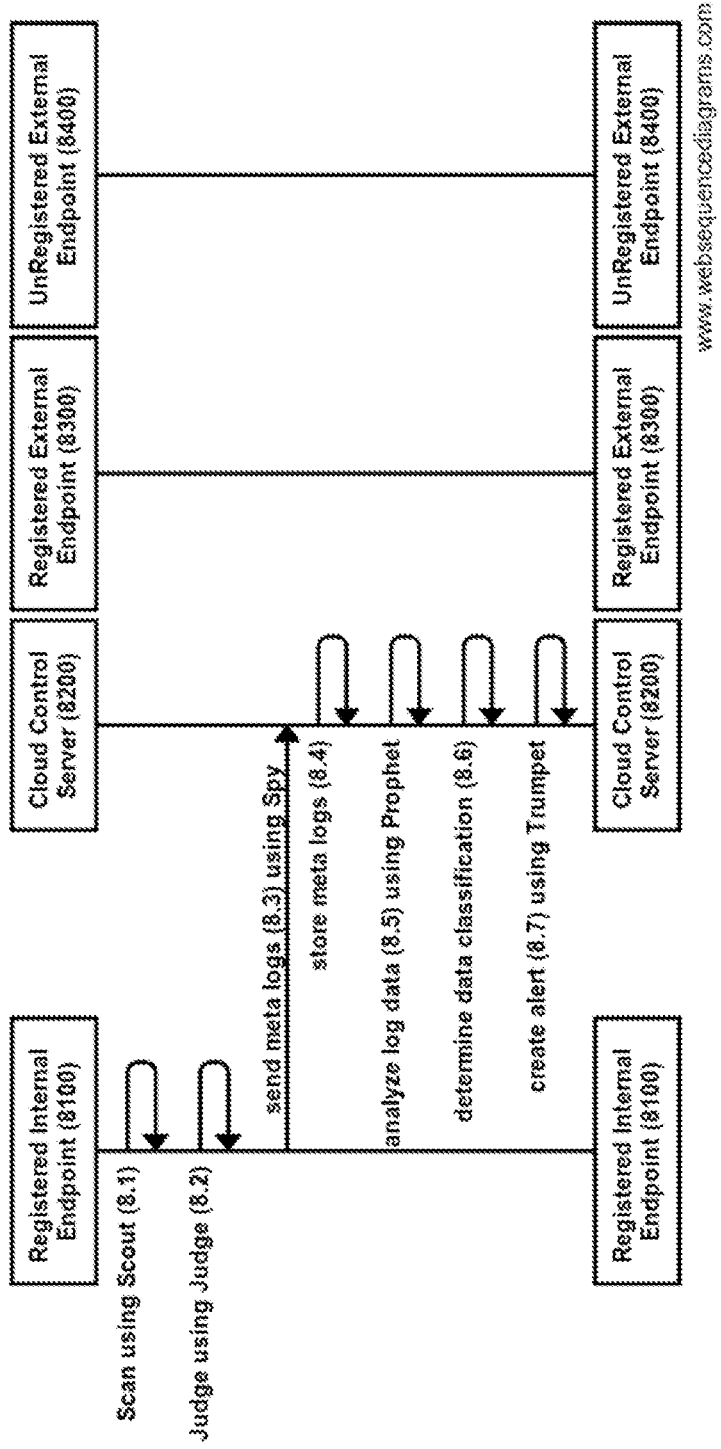

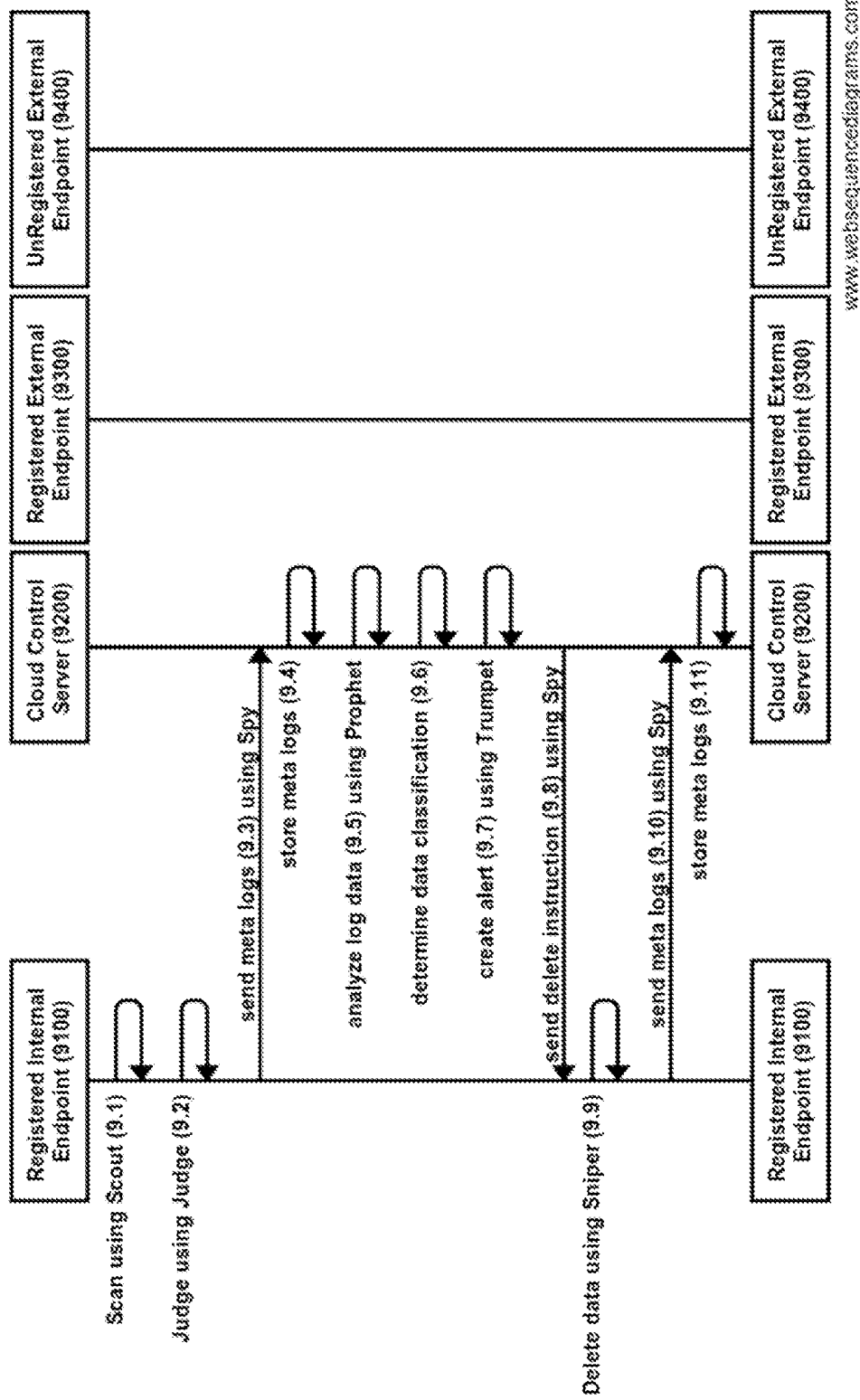

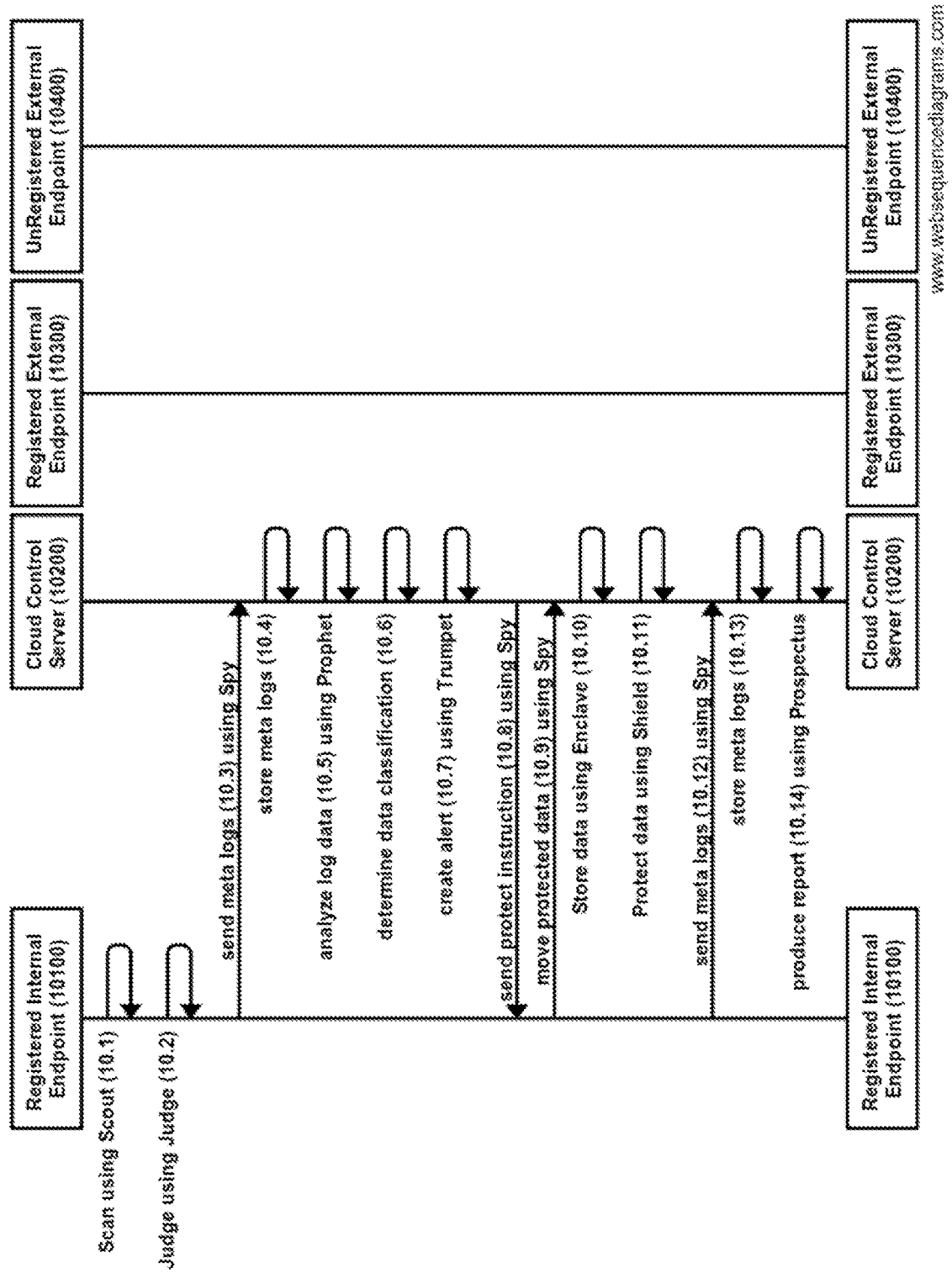
Figure 10 - Scan and Protect

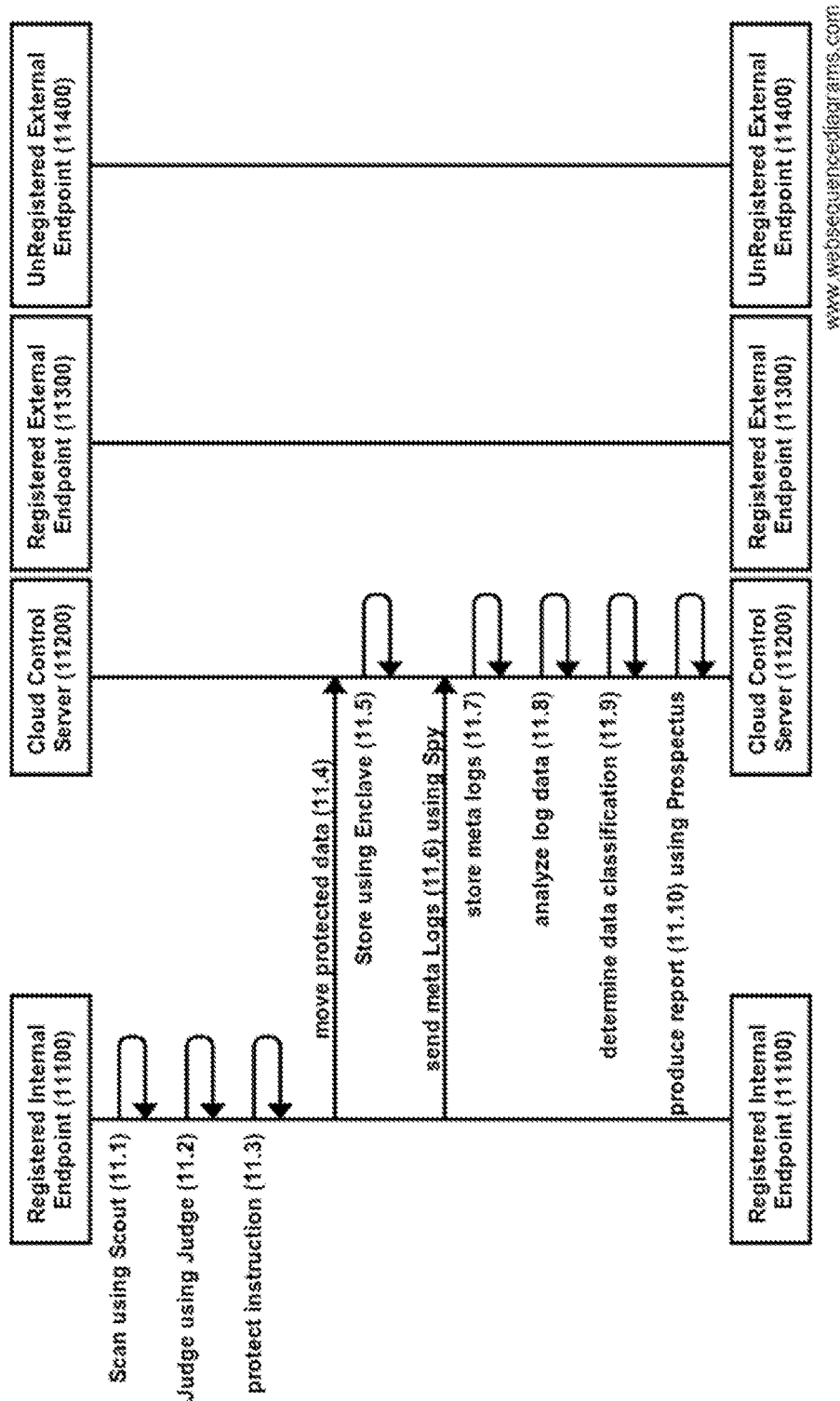

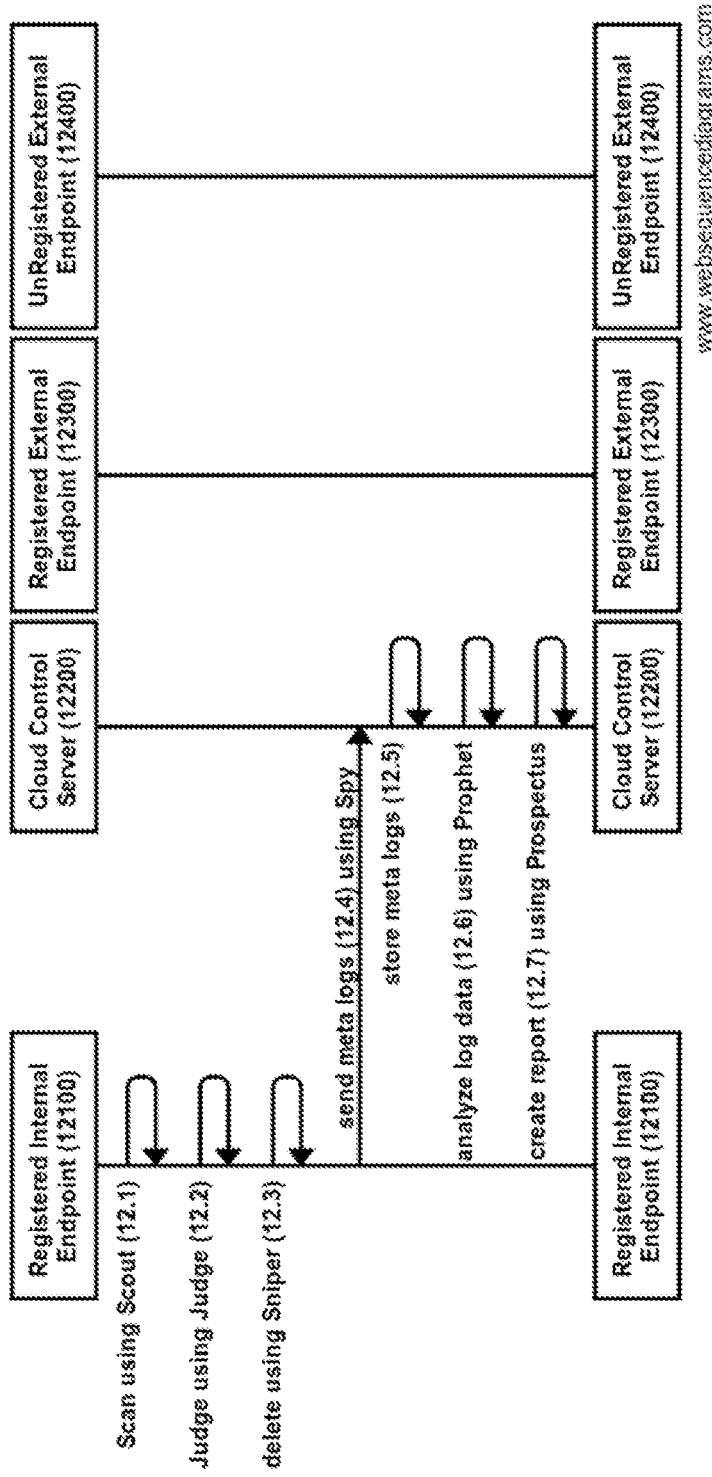

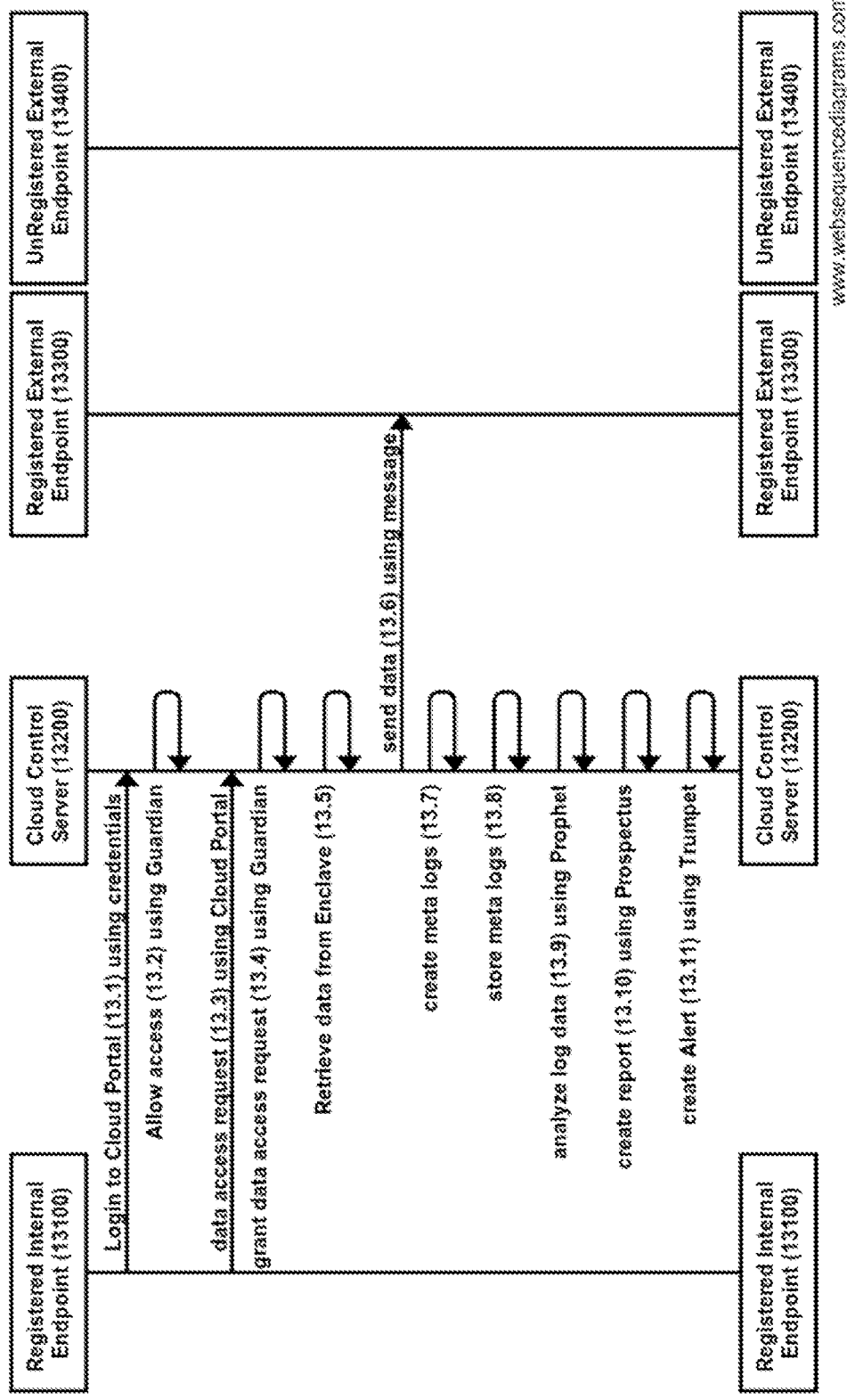
Figure 13 - Share Data with Registered External Endpoint

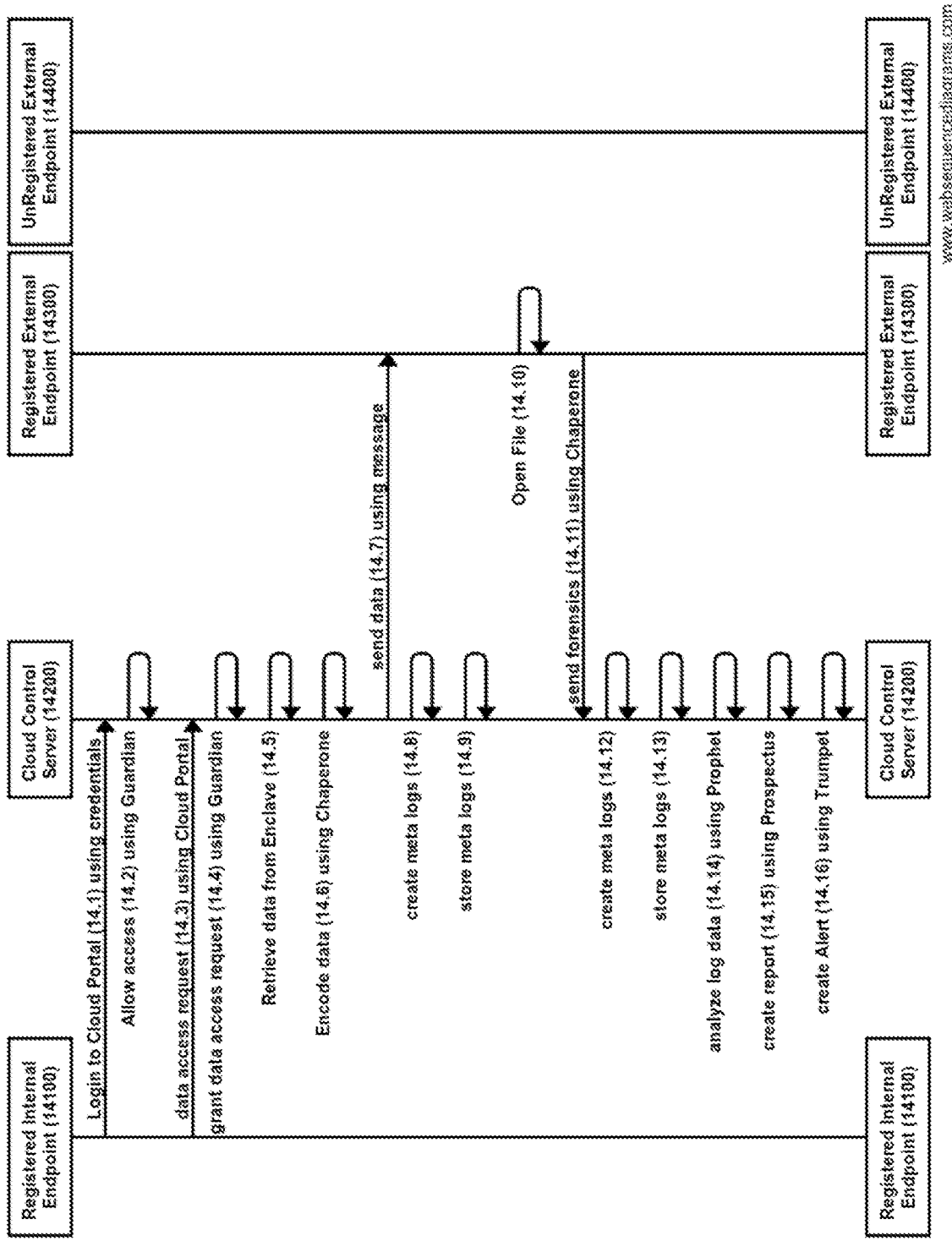

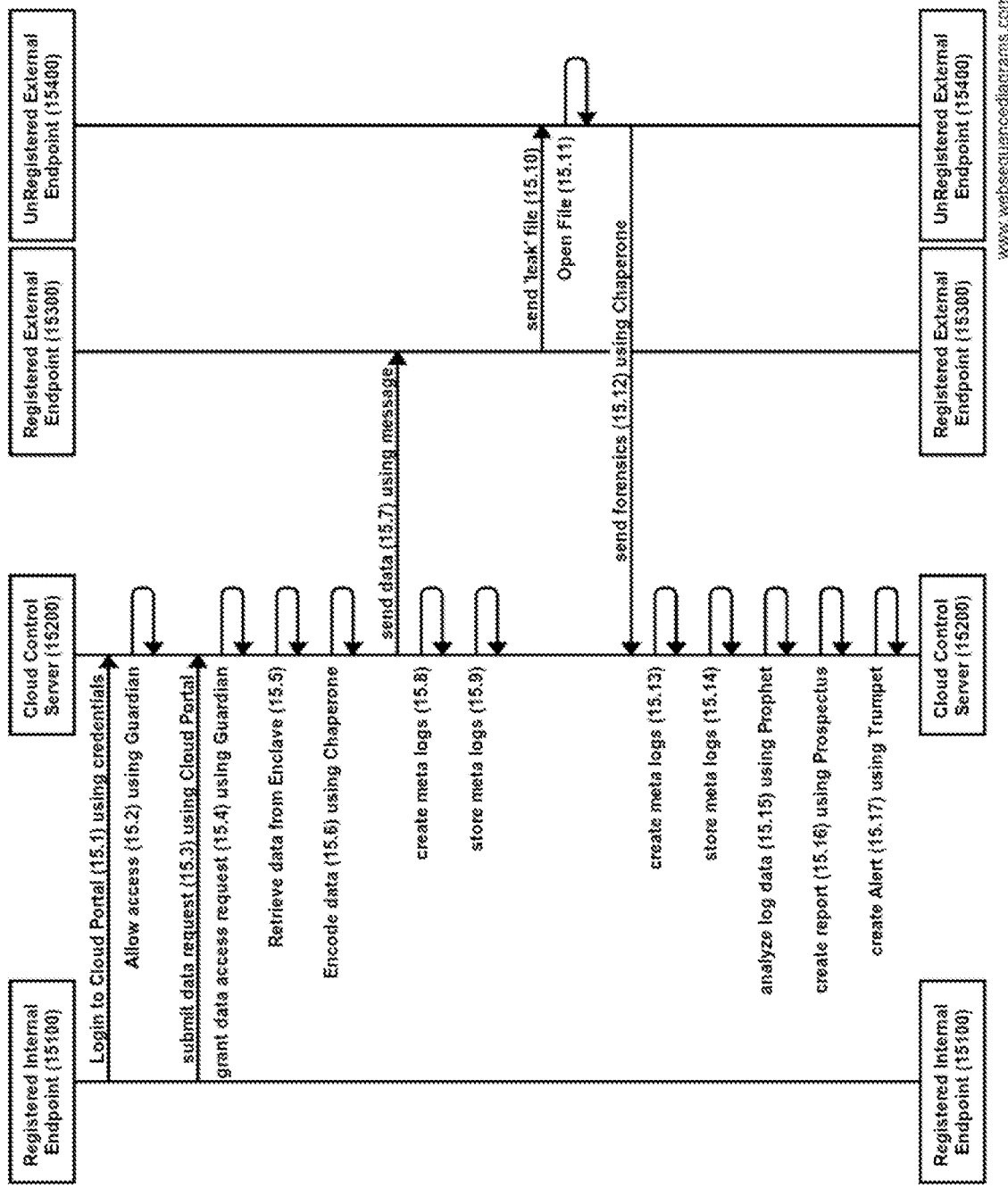
Figure 15 - File Leaked to UnRegistered External Endpoint

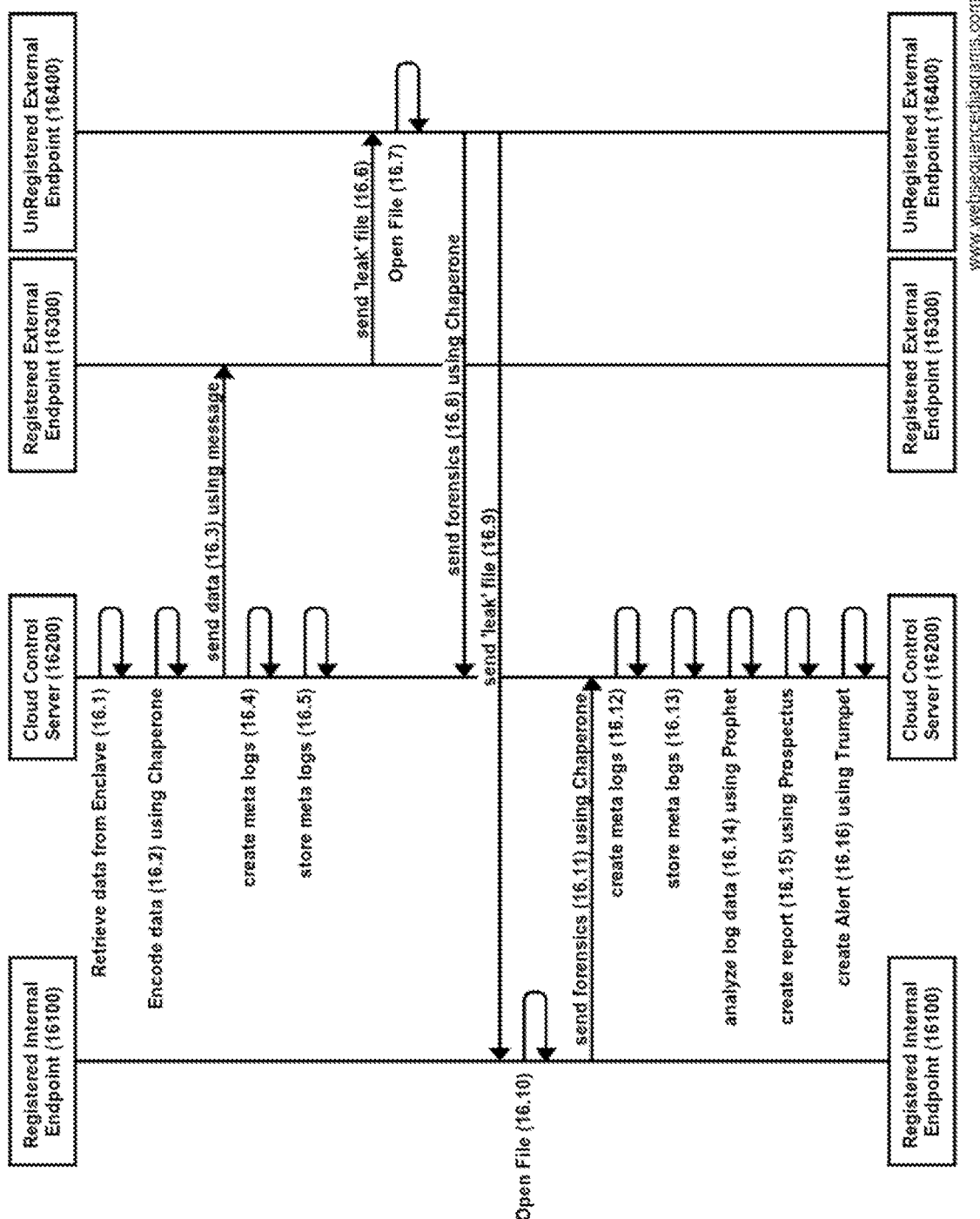

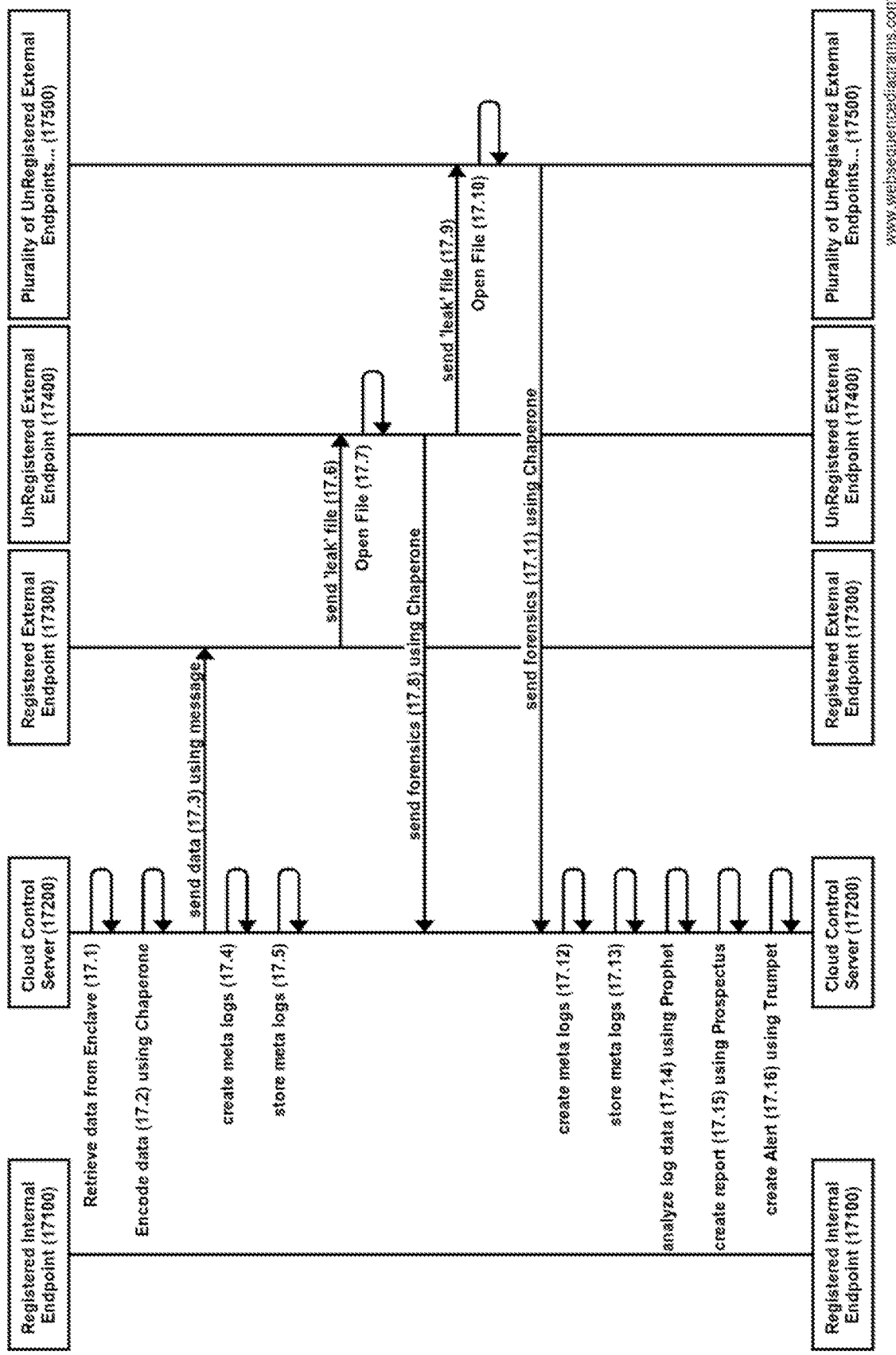

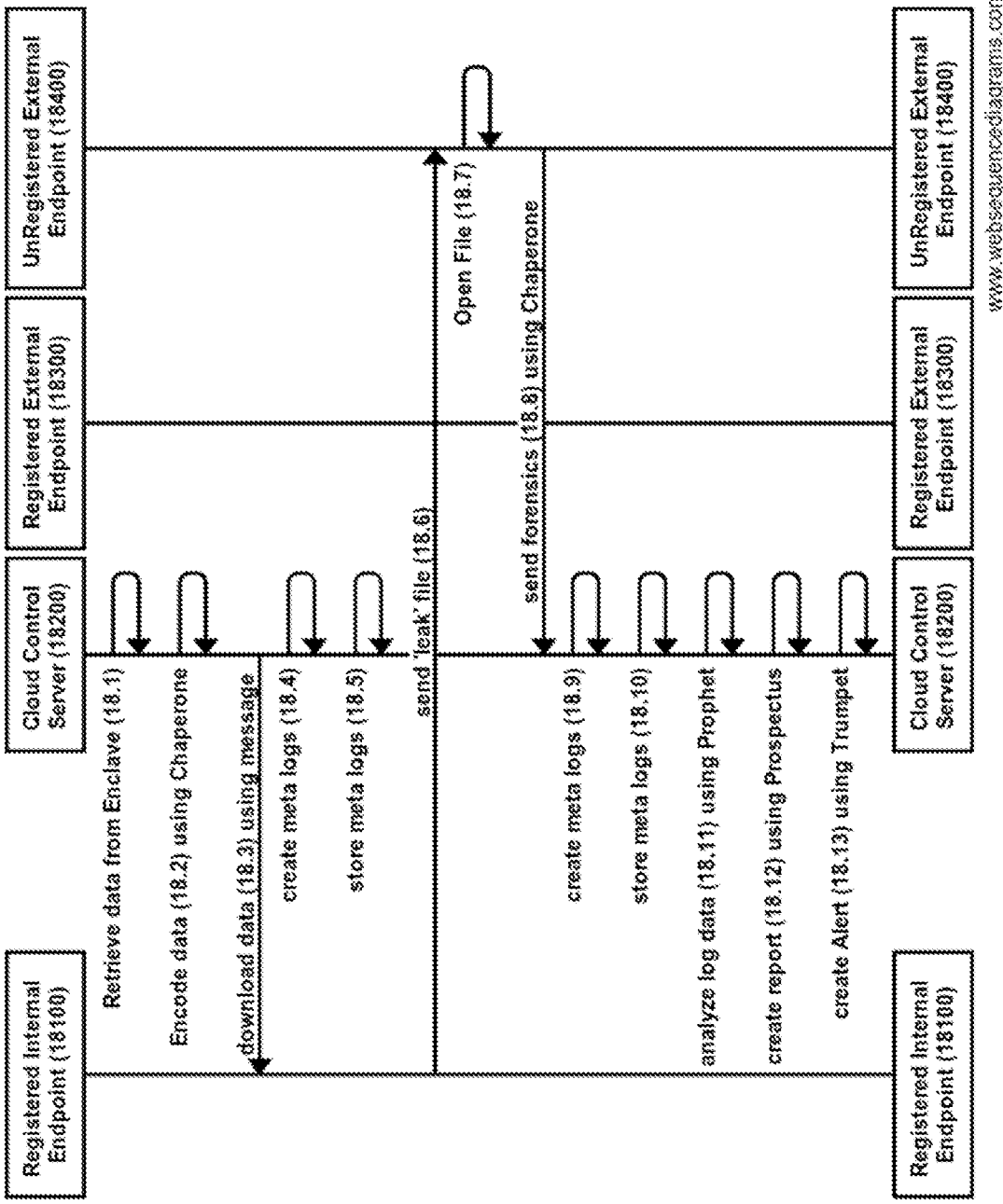
Figure 18 – File Leaked to an Unregistered External Endpoint from a Registered Internal Endpoint

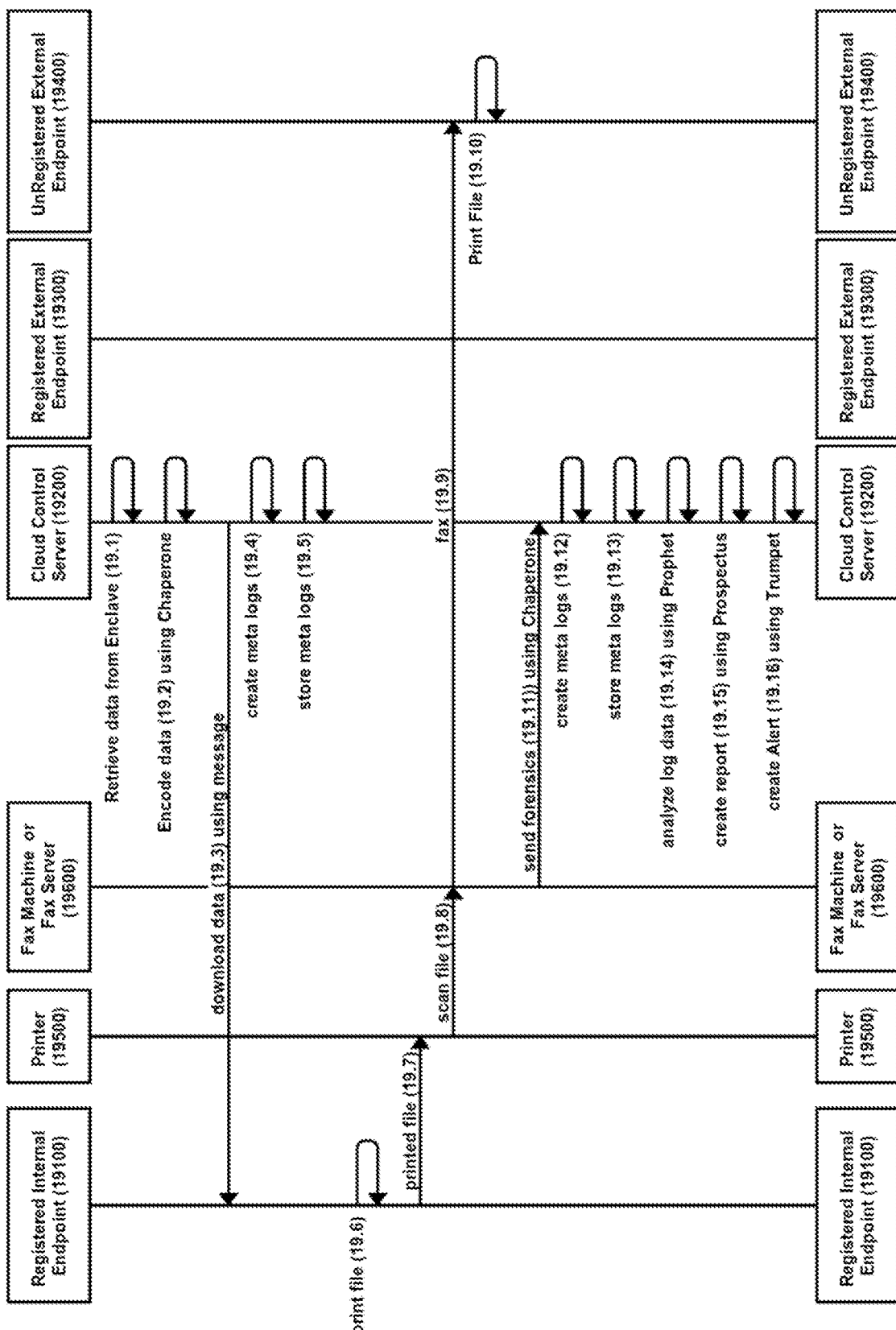

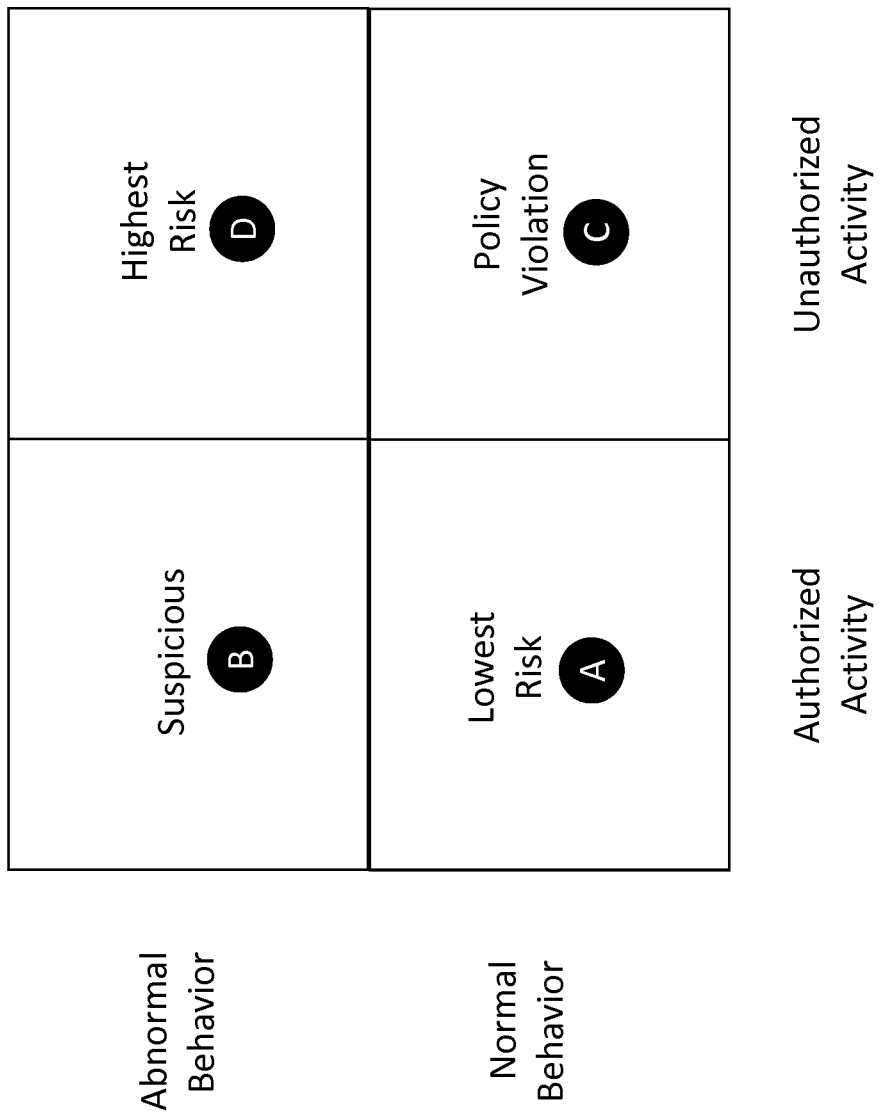

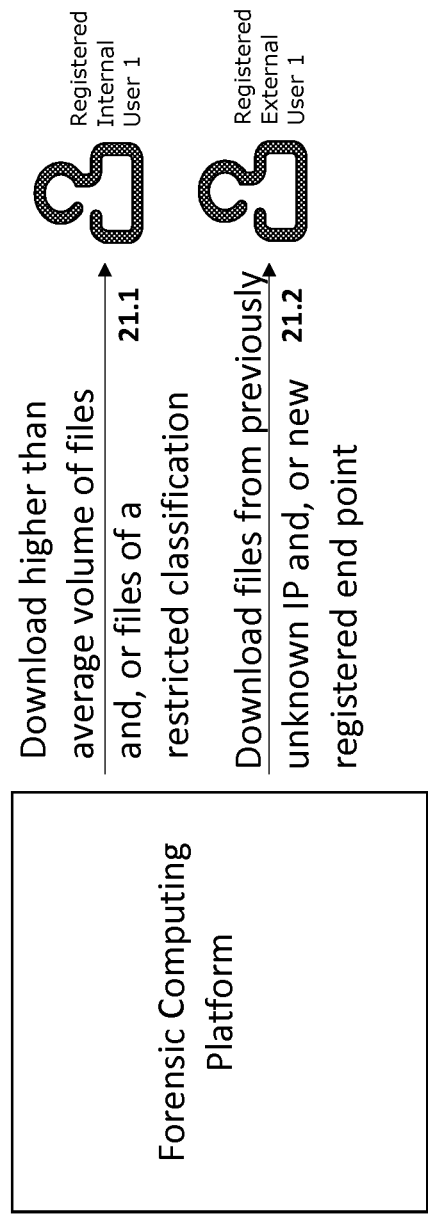
Figure 21 - Suspicious Activities

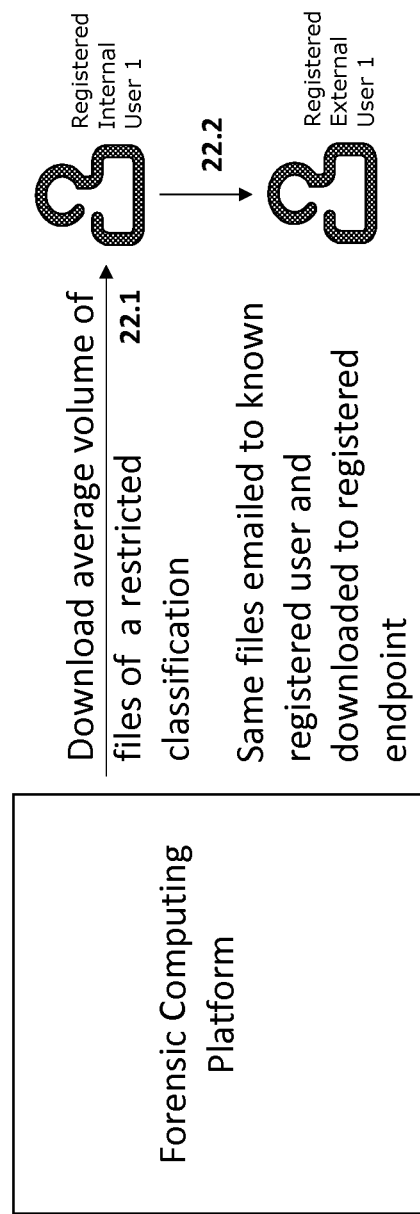
Figure 22 – Policy Violation Activities

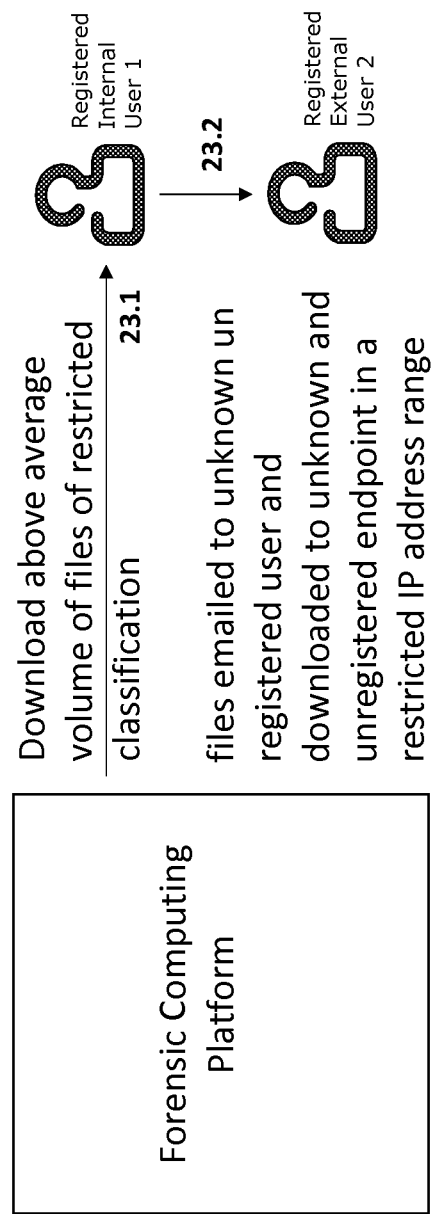
Figure 23 - Highest Risk Activities

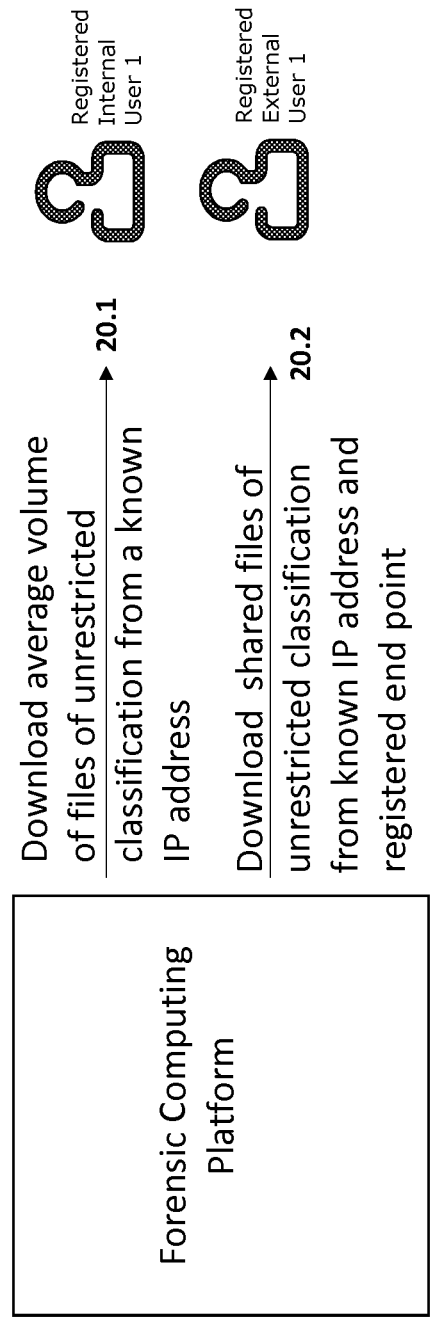
Figure 24 – Lowest Risk Activities

METHOD AND SYSTEM FOR FORENSIC DATA TRACKING

RELATED APPLICATIONS

The present application is a continuation application of and claims priority to U.S. patent application Ser. No. 17/244,505, titled "Method and System For Forensic Data Tracking," filed Apr. 29, 2021, which is a continuation application of and claims priority to U.S. patent application Ser. No. 16/695,949, titled "Method and System For Forensic Data Tracking," filed Nov. 26, 2019, which is a continuation application of and claims priority to U.S. patent application Ser. No. 15/965,625, titled "Method and System For Forensic Data Tracking," filed Apr. 27, 2018, which is a continuation application of and claims priority to U.S. patent application Ser. No. 15/406,746, titled "Method and System For Forensic Data Tracking," filed Jan. 15, 2017, which is a continuation application of and claims priority to U.S. patent application Ser. No. 14/853,464, titled "Method and System for Forensic Data Tracking," filed Sep. 14, 2015, which claims priority to U.S. Provisional Patent Application No. 62/049,514, titled "Method and System for Forensic Data Element Tracking," filed on Sep. 12, 2014; U.S. Provisional Patent Application No. 62/082,258, titled "Method and System for Forensic Data Element Tracking," filed on Nov. 20, 2014; and U.S. Provisional Patent Application No. 62/186,530, titled "Method and System for Forensic Data Element Tracking," filed on Jun. 30, 2015. The entire contents of the foregoing applications are hereby incorporated herein by reference.

COPYRIGHT NOTICE

A portion of the disclosure of this patent document may contain material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention relates to a method and system for protecting data and tracking the movement of data as it is shared and moved between authorized and unauthorized devices and among authorized and unauthorized users using a Forensic Computing Platform.

BACKGROUND

Enterprises are required to protect data according to regulatory requirements such as HIPAA, PCI, and Safe Harbor laws. For example, PCI requires cardholder data to be encrypted at all times, HIPAA requires data breaches to be reported, and Safe Harbor prohibits the transmission of personally identifiable data (PII), without the approval of the data's owner. Furthermore, HIPAA Omnibus requires protected health information ("PHI") data to be protected throughout the entire chain of trust in the healthcare industry. Despite the existence of these regulations, enterprises struggle to comply with the laws due to the lack of a comprehensive method and system for data protection.

Healthcare organizations are now realizing that securing sensitive patient information is critical to the broader mission of providing comprehensive patient safety. Existing security measures which involve network infrastructure (firewalls, VPNs, encryption), or which limit access to systems and applications (passwords, biometrics, two-factor authentication) often fail to prevent breaches of sensitive data. The present invention augments these existing measures by focusing on the actual data, the rising need to understand the context and origin of it, where it has been, and who has seen it. These growing demands, also referred to as "Data Provenance", are cornerstones of OCR's (Office of Civil Rights) enforcement of HIPAA Privacy and Security Rules, as well as ONC's (The Office of the National Coordinator for Health Information Technology) Meaningful Use and Interoperability standards.

The HIPAA Omnibus 2013 Final Rule requires covered entities such as hospitals and insurance companies to now be operationally and financially responsible for tracking and protecting all patient information throughout their service provider networks, including partners and affiliates where up to 70% of all breaches occur.

In recent years there have been many innovations designed to protect data at rest and while in transmission. Encryption for example is commonly used for this purpose. Encryption may be useful to protect data at rest including: individual files, entire data bases, specific data base fields, and even specific fields within documents. Encryption is also commonly used to protect data in transmission. Common methods for protecting data in transmission include Secure Socket Layer (SSL) encryption which creates an encrypted tunnel between the sender and receiver of data. Another method of protecting data in transmission is through the use of a data transmission encryption key. This data transmission encryption key is used to encrypt the data before transmission. Taken together, the above uses of encryption can be effective to protect sensitive data when the data is stored on an authorized system or when the data is transferred between two or more authorized systems.

However, data can occasionally leak outside of the boundaries of the authorized (e.g. protected) environment. For example, employees may copy an unencrypted version of a sensitive file onto a USB flash drive. Or for example, an unencrypted version of a file may be attached to an email and sent to an unauthorized user or device. Or for example, sensitive data can be stored on a public cloud storage system (such as the service provided by Box and Dropbox) and later downloaded to an authorized user onto an unsecure computer or endpoint. There may be no record of this act of downloading the document to an unsecure computer.

In order to address the above and other common causes of data leakage, some companies have implemented tools to prevent the data leakage. These Data Loss Prevention (DLP) tools can be effective in preventing the leakage of much data much of the time. However DLP tools cannot prevent the leakage of all sensitive data all of the time. Therefore, there are occasions when sensitive data escapes from the most sophisticated environments resulting in the data being stored within an unprotected environment. At this point, it is very problematic to either control or track the movement or use of the data.

Therefore, a need exists for a method and system that addresses these shortcomings in the prior art by tracking the movement of data files and data elements as they are shared and moved between authorized and unauthorized devices, within various cloud storage systems, and among authorized and unauthorized users based on the classification of the data.

SUMMARY OF EXAMPLE EMBODIMENTS

The present invention answers these needs by providing a method and system for tracking files and data elements as they are shared and moved between authorized and unauthorized devices, between and among cloud storage systems, and among authorized and unauthorized users. Capabilities described herein provide complete visibility, auditability and management of sensitive information, even when it moves outside the direct possession of the responsible organization and into business associate domains and across and beyond their respective chains of trust.

According to the present invention, data files are scanned and automatically classified at the time of detection according to a data classification policy. The data classification is determined based on matches of one or more of the predefined text strings comprised within the file. For example: an ICD-9-CM code consists of three to five digits wherein the first digit is an alpha (E or V) or numeric; digits two through five are numeric; and a decimal appears after the third digit. Therefore, an organization wishing to identify files that potentially contain PHI data can scan files for the existence of text strings that match the pattern of an ICD9 code or other similar codes. A 'positive hit' would reflect the fact that a match was found resulting in a classification of the file as containing PHI. After the data classification is completed, the file is tagged with the classification and a meta log is sent to a cloud control server with details about the file such as: file name, data classification, date created or modified, user name, and endpoint ID. End point ID may include unique information that describes the computing environment used to create or modify the file such as MAC address, IP address, unique serial number unique software license key, or another unique identifier related to the end point.

In another embodiment, during the scanning process or prior to sharing files outside of the organization files are encoded so that they can be tracked. Numerous encoding methods are disclosed herein.

In other embodiments, the system can be configured to perform one or more of the functions of detect, catalog, secure, deliver, control, and monitor the movement of sensitive information. A 'passive' configuration of the system will enable selected or limited functions to be operable while an 'active' configuration of the system will enable the full spectrum of functions to be operable.

In another exemplary embodiment where the system is configured in active mode, an endpoint is scanned and as a result of the scan a file or files are judged to be inappropriate for the endpoint. Upon determining that the file or files are inappropriate for the endpoint the file or files can be moved to and protected on the remote cloud control server and subsequently deleted from the endpoint. The user can use a portal of the cloud control server to access the protected files in accordance with the user's entitlements. If supported by the entitlements of the user, the protected file or files can be shared with a second user. Prior to sharing the files with the second user, the file or files can be encoded so that they can be tracked. If the second user subsequently shares the encoded files with one or a plurality of other users who are unauthorized to receive the file or files, the forensic computing environment is operable to track the movement of the encoded data as it is opened on the one or a plurality of end points which may be registered or unregistered.

Embodiments of the present invention are described below by way of illustration. Other approaches to implementing the present invention and variations of the described embodiments may be constructed by a skilled practitioner and are considered within the scope of the present invention.

BRIEF DESCRIPTION OF THE DRAWINGS

FIG. 1 is an overview of the forensic computing environment required to support the forensic tracking of the movement of data elements between endpoints.

FIG. 2 is a sequence of the exemplary steps involved in tracking the movement of data elements between endpoints.

FIG. 3 is a depiction of the functional framework of the forensic computing environment and the configuration thereof.

FIG. 4 is a description of the key internal functions of the forensic computing environment.

FIGS. 5A, 5B, 5C, and 5D represent a sequence diagram of the interoperability of the functional components.

FIG. 6 is a depiction of the key components and interconnections between the key components of the technical layer of the forensic computing environment.

FIG. 6A is an exemplary sequence flow of the technical layer.

FIG. 6B is an exemplary state configuration diagram of the technical layer.

FIGS. 6C, 6D and 6E are exemplary flows of the file traversal process.

FIGS. 7 through 19 are sequence diagrams that illustrate how the embodiments comprised within the forensic computing platform interoperate.

FIG. 20 is a four quadrant depiction of activities by risk based on normal and abnormal behavior.

FIG. 21 is an example of suspicious activities.

FIG. 22 is an example of activities that constitute policy violations.

FIG. 23 is an example of the highest risk activities.

FIG. 24 is an example of the lowest risk activities.

DETAILED DESCRIPTION OF EXAMPLE EMBODIMENTS

FIG. 1 is an overview of the computing environment comprising a Forensic Computing Platform required to support the key functions of the invention.

The Registered Internal User (1) is an employee or full time contractor of the enterprise that owns the data and establishes the data classification policy. This Registered Internal User has specific entitlements for using and sharing data according to the data classification policy. Each Registered Internal User has a corresponding row in the User Database Table (13).

The Authorized System Administrator (2) is a super user of the system. The Authorized System Administrator has the credentials to modify system settings, adjust the data classification policy, receive alerts, and receive forensic reports (17).

The Registered External User (3) is not an employee or full time contractor of the enterprise. However, like the Registered Internal User, the Registered External User has specific entitlements for using and sharing data according to the data classification policy. Each Registered External User has a corresponding row in the User Database Table (13).

The Un-Registered External User (4) is not an employee or full time contractor of the enterprise. Furthermore, unlike the Registered External User (3) the Un-Registered External User (4) has no specific entitlements for using and sharing data according to the data classification policy. Un-Registered Internal Users have no corresponding row in the User Database Table (13).

The Registered Internal Endpoint (5) is characterized by and comprised of a software agent, a local database, and at least one encryption key. End points may include but are not limited to PCs, MACs, mobile phones, smart phones, tablet computing devices, servers, computing appliances, medical devices, cameras, programmed logic controllers and any other end point with the minimum memory, persistent non-volatile storage, CPU, and communication capabilities required by the deployed software agents. End points also include any locally attached peripherals or peripherals that are accessible through a network or through wireless methods. Such peripherals may include but are not limited to: DropBox folders, attached storage devices, shared drives, printers, scanners, and other attached or accessible peripherals. The at least one encryption key can be a unique key derived specifically for each Registered Internal Endpoint. The unique key may be derived using a Master Encryption Key (MEK) and two or more unique key components derived from the Registered Internal Endpoint such as: the Mac address, serial number, International Mobile Station Equipment Identity (IMEI), other unique hardware identifier, software license key, or other unique information. At the time an internal endpoint is registered, a row is added to the Cloud Control Server Endpoint Table (22). Unique information such as the endpoint name, serial number, MAC address, IP address and other unique information is captured and stored in the Cloud Control Server Endpoint Table (22). A data transport key (DTK) can be used to safely transmit registration information. The software agent comprised on the Registered Internal Endpoint is operable to scan every new and modified file on the deployed endpoint to determine the proper data classification of the file according to the data classification policy stored in the Cloud Control Server Data Classification Policy Database (15). This software agent may be a C++ or other type program supported by the operating system and memory of the deployed endpoint. After each file is scanned, a meta data record is sent to the Cloud Control Server (8) with details about the scanned file including for example: a file name, data classification, data element tags, access rights, date created or modified, user name, and unique endpoint ID. Data element tags are indictors that specific fields or types of data are included within the file. Examples can include: a person's name, a specific phone number, a number that represent a credit card number, a patient record id, a diagnosis code and other data elements which the enterprise considers private, classified, or otherwise regulated. The meta data record for each scanned file is stored within the Cloud Control Server Meta Database (14). The local database stored on the Registered Internal Endpoint is necessary for the software agent to perform its function. As such the local database stores persistent information that can be accessed even after the software or computer is restarted. For example, the local database can include a history of each local file stored on the endpoint, the date and time of the last scan, and if the file has been transmitted to the Encrypted Archive Storage (19). The local encryption keys are used to encrypt the archives before they are sent to the Encrypted Archive Storage (19). Local encryption keys can also be used to encrypt meta data records before transmission.

The Registered External Endpoint (6) does not require a software agent, a local database, or encryption key. However, the external endpoint must be registered before the first file is transferred. The Registered Internal Endpoint can be a PC, MAC, server, smart phone, tablet, medical device, program logic controller (PLC), camera, watch, or other wearable device. End points also include any locally attached peripherals or peripherals that are accessible through a network or through wireless methods. Such peripherals may include but are not limited to: DropBox folders, attached storage devices, shared drives, printers, scanners, and other attached or accessible peripherals. At the time an external endpoint is registered, a row is added to the Cloud Control Server Endpoint Table (22). Unique information such as the endpoint name, serial number, MAC address, IP address and other unique information is captured and stored in the Cloud Control Server Endpoint Table (22).

The Un-Registered External Endpoint (7) does not require a software agent, a local database, or encryption key. The un-registered external endpoint is not officially known by the system; however, an un-registered end-point can be discovered through one or more forensic data tracking mechanisms. The Un-Registered External Endpoint can be a PC, MAC, server, smart phone, tablet, medical device, program logic controller (PLC), camera, watch, or other wearable device. End points also include any locally attached peripherals or peripherals that are accessible through a network or through wireless methods. Such peripherals may include but are not limited to: DropBox folders, attached storage devices, shared drives, printers, scanners, and other attached or accessible peripherals. At the time an un-registered external endpoint is discovered, a row is added to the Cloud Control Server Endpoint Table (22). Unique information such as the endpoint name, serial number, MAC address, and other unique information is captured and stored in the Cloud Control Server Endpoint Table (22). Although a record can be created representing this endpoint, it is considered un-registered because there is no associated registered user.

The Cloud Control Server (8) of the Forensic Computing Platform consists of a series of components including servers, firewalls, load balancers, and storage devices. The storage devices may be dedicated servers with dedicated storage disks or the storage devices may be an attached storage area network (SAN). The servers may be dedicated physical servers such as an HP ProLiant ML350p Gen8—Xeon E5-2670V2 2.5 GHz-32 GB or the servers may be virtualized servers. The server operating system may be one of a Unix, Lenox, Windows or another operating system. The database may be one of MySQL, Oracle, Database2, MS SQL server or another appropriate database to comprise the tables and transactions of the Forensic Computing Platform. A web services layer is typically used to enable the graphical user interface or presentation layer. The presentation layer may be created with one of pHp, html, .net or other appropriate languages and approaches. The web services layer also is operable to handle data sent from end points using application programming interfaces (APIs). The Cloud Control Server (8) is comprised of several software components operable for specific functions. These include: Business Logic Component (9), Analytics Component (10), Alerts Component (11), and Reporting Component (12).

The Business Logic Component (9) of the Forensic Computing Platform is operable to store and execute all of the programmed instructions associated with the system. Programmed instructions may be coded in one of numerous languages such as pHp, .Net, Java or other similar languages. The business logic component may also include logic for processing requests received from the web services layer.

The Analytics Component (10) of the Forensic Computing Platform is operable to read meta data logs and produce summarized analysis of data movement. Using available meta data logs, the Analytics Component can answer the following types of questions: What confidential data is currently stored on Authorized Internal Endpoints? Is any Private data currently stored on Box or DropBox? Is any PCI classified data stored on an Authorized External Endpoint? Has any PII data related to end users in the United Kingdom (UK) been sent to an endpoint outside of the UK? Is any data which is classified as Private or Confidential detected from an IP addresses registered in Russia? What is the velocity of the movement of Private or Confidential data onto new IP addresses? Have any Authorized Internal Users recorded a spike in data transmission or storage of data of any kind compared to their prior behavior or the average user behavior? What activities are considered to be high risk? What activities are considered to be suspicious? What activities appear to violate company policy? The previous list of questions are exemplary of the types of questions that can be answered by the Analytics Component (10) and not intended to be a complete or exhaustive list. The Analytics Component (10) is further operable to categorize data movement as one of low risk, suspicious, high risk, and a policy violation as further described in FIGS. 20, 21, 22, 23 and 24.

The Alerts Component (11) of the Forensic Computing Platform is operable to send alerts to the Authorized System Administrator (2) and other recipients based on the results of the Analytics Component (10).

The Reporting Component (12) of the Forensic Computing Platform is operable to produce human readable output that reflects the results of processing. Reports may be standard or customized reports in detailed or summary format. Reports may also be reflected in online output or dashboards.

The Users Database Table (13) of the Forensic Computing Platform contains a record for each registered internal and external user. Information such as the user name, phone number, email address, company, department, project, title, position, and other similar information may be stored for each registered user.

The Meta Database Table (14) of the Forensic Computing Platform contains the meta logs that are received from end points and stored by the system. A meta log is created following each scan of a new or modified file and may include specific information about the file such as file name, endpoint ID, date and time, data classification, and meta data tags. Meta logs are also created whenever files are uploaded to the Archive Repository (19) or downloaded to registered internal and external endpoints. Meta logs are also created by various forensic mechanisms which allow additional information to be recorded about the movement of files.

The Policy Table (15) of the Forensic Computing Platform is comprised of the organization's data classification policy. The table includes both standard and customized policies. Based on the industry, a standard policy may be selected by the Authorized System Administrator (2). For example, if the company is involved in the health care industry, a standard HIPAA data classification policy may be selected. However if the company is primarily involved in payment processing, a PCI data classification policy may be selected. Policy components are also available for various foreign jurisdictions such as the European Union, which may have its own data protection policy. The Policy table may also include custom fields that are unique to a specific enterprise such as the CEO's name, a board member's phone number, a chemical formula, internal code names, or other sensitive, confidential, private, or regulated information.

The Settings Table (16) of the Forensic Computing Platform includes options selected by the Authorized System Administrator (2) to control key aspects of processing. For example, alert thresholds can be configured in the Settings Table. The Settings Table can also determine the default value for how many end points each user can register and the default values which determine if a user is authorized to download or share data. These default values may be overridden for any specific user base on the user's specific entitlements.

The Endpoint Table (17) of the Forensic Computing Platform includes a row for each endpoint whether registered or not. Registered Internal end points are recorded when the software agent is installed and configured the first time. Registered External end points are recorded the first time a shared file is downloaded to the end point. Unregistered endpoints are those endpoints that become known based on various forensic mechanisms and include a minimum amount of information such as IP address.

The Encrypted Archive Cloud Storage (18) of the Forensic Computing Platform contains the encrypted files that have previously been scanned and uploaded to the Cloud Control Server (8) by the agent software on the Registered Internal Endpoint (1). Prior to upload, files can be classified by the deployed agent software and the details of the classification of the file can be logged as meta data logs on the Cloud Control Server. Prior to upload, a files can also be encoded with forensic information that will allow the file to be traced in the future. The details of the encoding are separately written to the Cloud Control Server as meta data logs. The archives are encrypted before being uploaded to the Encrypted Archive Cloud Storage (18) using one of the available local encryption keys. The Encrypted Archive Cloud Storage (18) may be a structured or unstructured data storage device. It can be located in the same physical infrastructure that houses the Cloud Control Server (8) or separate infrastructure. For example, a first enterprise may prefer to maintain a private archive server while another enterprise may prefer a public archive server. It is thus an advantage of the deployment architecture to support both public and private cloud storage. The organization of the archive storage may be simple folder based storage as would be satisfactory for common file storage such as SFTP or a proprietary storage device such as Microsoft Azure storage or Google Drive for example may be used.

The Portal (19) of the Forensic Computing Platform is an access method that allows registered internal and external users to interact with files that have been uploaded to the Encrypted Archive Cloud Storage (18). Registered Internal Users may access, search, download and share stored archives based on their entitlements. Registered External Users may only download stored archives based on their entitlements relative to the classification of the data. For example, as an internal user a computer programmer, may only be entitled to download data created or shared by other computer programmers. By contrast, a sales executive may be entitled to share a specific classification of data with external recipients.

Reports (20) of the Forensic Computing Platform represent the results of system operations and may include a list of all scanned records, stored archives, archives that have been shared or downloaded, etc. Reports may also include exceptions such as the conditions that would trigger an alert. For example, if a scanned end point was found to contain a significant number of new files from the previous scan, this could represent a spike in activity related the historical behavior of this end point. Or, if the same end point was found to contain a significantly lower number of files from the previous scan, this could represent an unusual activity compared with the average user. Or, if a number of end points are scanned and each found to contain the same new files, this might be a pattern of activity that falls outside of normal history.

The Unencrypted Archive (21) represents an archive that has been downloaded by an Authorized External User, decrypted and stored onto an Authorized External Endpoint. The Unencrypted Archive (21) may include one of various forensic encoded data elements that will enable the ability to track the movement of this archive. One exemplary forensic encoding method is a transparent GIF for example. The transparent GIF can be added to the archive at the time it is scanned or uploaded to the Encrypted Archive Cloud Storage (18). Or, the transparent GIF may be inserted into the archive at the time it is downloaded to the Registered External Endpoint. The transparent GIF includes a URL and other information that become activated when the file is opened. Other encoding methods are also described herein.

The Unencrypted Archive (22) represents an archive that has been transmitted to an Un-Authorized External User and is comprised on an Un-Authorized External Endpoint. The Unencrypted Archive (22) may have been encoded by embodiments of the Forensic Computing Platform with one of various forensic encoding mechanisms that will enable the ability to track the movement of this archive when it is opened or forwarded again to a plurality of authorized and unauthorized endpoints.

Encoding may be an invisible graphic element such as a transparent Gif (Tgif) may be inserted into the file. The Tgif can include an embedded URL which includes the location of the cloud control server and one or more parameters including a unique token that explicitly identifies the file. Each time the file is subsequently opened on the same or a different end point, the Tgif attempts to connect to the cloud control server by using the embedded URL. Upon each successful connection to the cloud control server, the cloud control server logs the date, time, file name, IP address of the end point and other designated parameters sent in the http or https header or decoded from the token. The Tgif may be encrypted to prevent a user from viewing its contents. The cloud control server can be comprised of a reporting component, an analytic component, an alert component and a business logic layer. These components can be configured to track the movement of data elements and determine the velocity and path as files are subsequently transferred and transferred again. The alerts component can be configured to send a notification to the authorized system administrator based on policy and settings.

Another exemplary encoding method would during the scanning process or prior to downloading a file from the cloud server, insert an executable component into files of types that support scripting languages, such as Microsoft Office files, that, when opened, report back to the cloud control server with as much identifying information as can be garnered from the local system, and a unique token that explicitly identifies the file. Upon successful connection, the server would log this information. Further, if the information identifies a violation of company policy, the component may be configured to deny access to the file by encrypting it, deleting the contents, or removing the file from the operating system registry. As described with the Tgif process above, analytics, alerts and reporting can be utilized to track and notify based on policy and settings.

Another exemplary encoding method implemented during the scanning process or prior to downloading a file from the cloud server would be to encrypt the file. An agent or component would be required on the receiving end point to decrypt and open the file. Upon opening the file, the downloaded component would report back to the cloud control server with as much identifying information as can be garnered from the local system and a unique key to explicitly identify the file. Depending on company policies, the cloud control server, after logging the action, would send back the key that the component would then use to decrypt the file. Upon saving the file, the downloaded component would re-encrypt the contents. As with the processes above, analytics, alerts and reports can be utilized to track and notify based on policy and settings.

Another exemplary encoding method allows a file to be tracked after it is printed. Prior to download, one or more printable and scannable codes or watermarks are included on one or more pages of the document. These printable and scannable codes may be visible codes such as Bar codes or QR codes. Or the codes may be of a custom format which may either be visible to the human eye or invisible to the human eye. The codes and combinations of codes that are added to the document are stored in a database of the Cloud Control Server of the Forensic Computing Platform and associated with the file that can be printed. If a file is printed and later shared in an unauthorized manner, because each document is encoded with unique codes and combinations of codes, it will be traceable back to the point of time that the file was downloaded or shared from the Forensic Computing Platform. To the extent that a file is printed and then later rescanned into electronic form, the deployed agent of the Forensic Computing Platform can detect the codes and combination of codes within the document and report the detection of these codes in the meta logs.

Referring now to the labeled lines in FIG. 1. Line (1.1) shows the connection between the Registered Internal Endpoint (5) and the Cloud Control Server (8). This connection is used to send the meta data from the Registered Internal Endpoint (1) to the Cloud Control Server (8). The connection can be established using an internet protocol such as HTTP or HTTPS. The data can be formatted in one of several formats such as HTTP PUT or POST, XML or using a Restful API such as JSON. Or, a web service based on SOAP or other protocol can be used to facilitate data transmission. Data sent over this connection may be encrypted using a data transport key.

Line (1.2) facilitates the transmission of the encrypted archives from the Registered Internal Endpoint (1) to the Encrypted Archive Cloud Storage (18). Like Line (1.1), the connection can be established using an internet protocol such as HTTP or HTTPS. The data can be formatted in one of several formats such as HTTP PUT or POST, XML, or using a Restful API such as Json. Or, a web service based on SOAP or other protocol can be used to facilitate data transmission. However, some implementations may use the FTP or SFTP protocols for this purpose. Data sent over this connection may be encrypted using a data transport key.

Line (1.3) illustrates a message that is sent from the Cloud Control Server (8) to a Registered External Endpoint (6) based on a data sharing request initiated by a Registered Internal User. The message can be one of an email message, sms message, or a push message and can include one or more of maximum downloads and expiration dates associated with each shared file or files. The push message can be used if the Registered External Endpoint (6) is a smart phone or tablet or similar end point operable to receive push notifications. The message contains a link to the encrypted archive(s) being sent to the Registered External User (3). When the link is clicked, the archive is automatically downloaded shown using Line (1.4).

Line (1.5) shows a communication message between a Registered External Endpoint (6) and an Un-registered External Endpoint (7). The implication here is that an unencrypted artifact is being sent by a Registered External User (3) to an Un-registered External User (4) constituting a leak of the information from the end point associated with the Registered External User to that of the Unregistered External User. Depending on the classification of the data elements included within the document, this transfer could represent a violation of law and or company policy.

Line (1.6) shows the transmission of forensic information gathered from the Un-registered External Endpoint (7) and sent to the Cloud Control Server (8). Information sent on this line can be the file name, IP address, MAC address, serial number, and other information as available and depending on the forensic technique used. For example, as discussed above a hidden file may be embedded into a file which is leaked from an internal or external user. When this file is opened, the hidden file is operable to transmit information about the file and the endpoint back to the Cloud Control Server (8).

Line (1.7) shows the distribution of Reports (20) to the Authorized System Administrator (2) and other authorized recipients. This distribution can be in the form of an email with attached reports or it can be an online presentation of the reporting data. Line 1.8 shows the communication comprised of a distribution of Alerts to the Authorized System Administrator (2). This communication can be an email, sms message, push message, phone call or other appropriate message suitable to deliver the Alert. Line (1.9) shows the connection between the Registered Internal User (1) and the online Portal (19). The Registered External User (3) may also use the Portal (19) although this interaction is not shown to simplify the figure.

FIG. 2 is a sequence of the exemplary steps involved in tracking the movement of data elements between endpoints. In Step 2.1 the Cloud Control Server (8) receives configuration settings from an authorized system administrator. In Step 2.2 the Cloud Control Server (8) receives from a first endpoint a meta log containing one or more of a file name, data classification, data element tags, date created or modified, user name, and endpoint ID. In Step 2.3 the Cloud Control Server (8) stores the meta log in the cloud control server meta database. In Step 2.4 the Cloud Control Server receives from a second endpoint a header record comprised of one or more of the date, time, file name, and IP address of the second end point. The second end point may be one of a registered or unregistered end point. In Step 2.5 the Cloud Control Server (8) stores the data from the header record in the cloud control server meta database. In Step 2.6 the Cloud Control Server (8) analyzes the meta data based on the configured settings and policy. In Step 2.7 the Cloud Control Server generates an alert which is sent to the authorized system administrator based on the results of the analysis. In Step 2.8 the Cloud Control Server (8) renders a report showing the results of the analysis to the authorized system administrator.

Now referring to FIGS. 3, 4, 5, and 6. FIG. 3 illustrates the product framework (3.1) of the Forensic Computing Platform described in FIG. 1. The six key areas of functionality are detect (3.1.1), catalog (3.1.2), secure (3.1.3), deliver (3.1.4), control (3.1.5), and monitor (3.1.6). In accordance with this framework, the Forensic Computing Platform is operable to detect sensitive data on end points and servers, catalog and classify that data according to the data classification policy, secure the data according to policy, deliver data to authorized users and end points, control data movement and monitor of sensitive data. The Forensic Computing Platform may be configured to perform one or more of the functions of detect, catalog, secure, deliver, control and monitor the movement of sensitive information. A passive configuration of the system will enable selected or limited functions to be operable while an active configuration of the system will enable the full spectrum of functions to be operable. In order to accomplish this capability, the Forensic Computing Platform is further comprised of twelve functions (Scout, Spy, Prospectus, Judge, Shield, Sentinel, Enclave, Guardian, Chaperone, Sniper, Prophet, and Trumpet) that are further described in FIG. 4 and can be implemented as software modules running on one or more servers and a plurality of endpoints.

Continuing now with a description of FIG. 4, which is a functional description of the Forensic Computing Platform. Each of the twelve functions are further described as regards to their primary responsibility within the Forensic Computing Platform. The functional model is comprised of a Registered End Point (4.1), a Cloud Control Server (4.2) and APIs (4.3). The registered endpoint may be any computing endpoint with the capability to store and execute the deployed agents of the Forensic Computing Platform. End points may include but are not limited to PCs, mobile phones, smart phones, tablet computing devices, servers, computing appliances, medical devices, cameras, programmed logic controllers and any other end point with the minimum memory, persistent non-volatile storage, CPU, and communication capabilities required by the deployed software agents.

4.1.1—Data is an embodiment of secure, local data storage comprised within the Registered Endpoint 4.1). As such, Local Data (4.1.1) is a non-volatile memory storage component. Local Data (4.1.1) may be further comprised of a database which is further comprised of rows and columns of information that are organized in accordance with the functional requirements of the deployed agents.

4.1.4—Scout scans endpoints for new and changed information. As previously described in FIG. 1 as the Agent software comprised within the Registered Internal Endpoint (5), Scout accomplishes this responsibility using a compiled program and local, secure data (4.1.1). Scout can run on a predetermined schedule or on demand. The local database contains the schedule and the results of the previous scan of the end point. It is also possible that the schedule can be stored on the Cloud Control Server Remote Data (4.2.9) and that Scout (4.1.4) can be notified by the API (4.3.1) that a scan of the endpoint be performed. After each new scan, Scout compares the results of the new scan with the stored results of the previous scan. Using this method, Scout can determine which files have been deleted, which files are new, and which files have been modified in some way. Scout (4.1.4) then uses Spy to communicate the details of the scan to the Cloud Control Server (4.2). In another preferred embodiment, Scout (4.1.4) can send the results of the entire scan to the Cloud Control Server (4.2) where they can be stored in the Persistent Data (4.2.9). In this embodiment, the Prophet (4.2.8) functional component is operable to compare the results of two or more scans and to record the differences in the Persistent Data (4.2.9). The end result of each of these processes yields the same result. It is an advantage of the second option to utilize the computing resources of the Cloud Control Server (4.2) to perform the analysis of system changes.

4.1.2—Judge is not shown in FIG. 1 and can be deployed either as a separate Agent or as a functional subroutine of Scout (4.1.4) on the Registered Internal Endpoint (5). In either case, Judge (4.1.2) is either invoked by Scout during the scanning process or when deployed as a separate agent, Judge (4.1.2) is invoked based on its own configuration and schedule. In either case, when invoked as a subroutine of Scout (4.1.4) or as a separate agent, Judge (4.1.2) opens the files and searches for pre-determined text strings which can be pre-stored on the local, secure data (4.1.1). The results of the analysis by Judge (4.1.2) are transmitted as meta logs to the Cloud Control Server (4.2) as described in FIG. 1, Line (1.1). Files are then classified by business logic on the Cloud Control Server (4.2) based on a data classification policy stored in the Remote Data (4.2.9) and also previously described in FIG. 1 as the Policy Database Table (16).

4.1.3—Sniper removes unauthorized information from endpoints based on configuration rules that are stored in the local, secure, Local Data (4.1.1) or as communicated to Sniper (4.1.3) using the API (4.3.1). Sniper (4.1.3) is deployed onto the Registered Internal Endpoints (1). Like Judge, Sniper (4.1.3) can be deployed either as a separate Agent or as a subroutine of Scout (4.1.4) on the Registered Internal Endpoint (5) and is invoked either by Scout (4.1.4) during the scanning process or based on its own configuration and schedule. As new files are detected by Scout (4.1.4) and determined to be unauthorized for the scanned endpoint, the files are marked for deletion in the secure local data (4.1.1). Sniper (4.1.3) is operable to remove the files from the endpoint. Sniper (4.1.3) is operable to completely remove the file from the endpoint using secure delete techniques such as a Department of Defense (DOD) seven pass wipe so that the file cannot later be recovered. The results of Sniper's activity are reported to the Cloud Control Server (4.2) as Meta Logs as previously described using the communication channel depicted as Line (1.1). In another preferred embodiment, the business logic comprised within the Cloud Control Server (as previously described in FIG. 1) can determine if a file is unauthorized for a given end point based on the Policy Database Table (15) and Configuration Settings Table (16). Using this alternate method, the Cloud Control Server (4.2) can use the API (4.3.1) to communicate an instruction to Sniper (4.1.3) which caused Sniper to delete the identified file or files from the Registered Endpoint (5) described in FIG. 1.

4.2.1—Embodiments of Chaperone (4.2.1) travel with the data and comprise digital residue or 'breadcrumbs' on Registered External Endpoints (6) and Unregistered External Endpoints (7) as previously described on FIG. 1. Referring again to FIG. 1, we previously described encoding a file with a Transparent GIF into the Encrypted Archive (18) at the time of scan or at the time of download. Chaperone (4.2.1) is comprised as the embodiment within the business logic layer (9) that adds the hidden fields to the Encrypted Archive (18) and are operable to transmit tracking information back to the Cloud Control Server (4.2) using communication channel described as Line (1.6).

4.2.2—Guardian guards information and grants access using an entitlement-based information access framework. As previously described in FIG. 1, entitlements are established for Registered Internal Users (1), Registered External Users (3), and the Authorized System Administrators (2). These entitlements determine what data may be accessed by each user according to their role and according to other information available in the User (13) database table. For example, a Registered Internal User (1) may be assigned to the role of 'Sales'. As such, the Registered Internal User (1) would enjoy all of the access rights that are related to this role as defined in the Settings (16) database table. A Registered Internal User (1) defined with the role of Sales may be authorized to send information of a specific classification to Registered External Users (3). If the Settings (16) table is later modified, all users with the role of 'Sales' automatically are subject to the changes. In addition to this role-based access, a Registered Internal User (1) or Registered External User (3) may be further restricted based on information stored in the User (13) database table. For example, a computer programmer may be assigned to the role of 'Technical'. As such, the Registered Internal User would enjoy all of the access rights that are related to this role as defined in the Settings (16) database table. A user assigned to the role of 'Technical' may not be authorized to send information outside of the company and only authorized to share data with other internal users in the same role. However, if the user belongs to a specific project, their data access may be further limited to data associated with (classified as related to) this project and other users associated with the same project.

4.2.3—Enclave secures data while at rest using secure containers on endpoints, mobile devices, and remote servers. Secure containers are logical groupings of data that are stored using defined encryption keys. The Encrypted Archives (18) described in FIG. 1 are an example of an embodiment of Enclave. Other embodiments of Enclave may exist on a variety of end points and devices. As related to embodiments FIG. 4, Enclave (4.2.3) can be comprised within the Registered Endpoint (4.1) and within the Cloud Control Server (4.2).

4.2.4—Sentinel rotates encryption keys based on established schedules and in accordance with risk and regulatory requirements. Certain regulatory frameworks such as Payment Card Industry (PCI) require that the master data encryption key be changed on a periodic minimum schedule such as annually. The Sentinel (4.2.4) is responsible for ensuring that the encryption keys are properly rotated in accordance with these requirements and in accordance with company policy if different. Sentinel is deployed as part of the Business Logic (9) as described in FIG. 1 and may use the Policy (15) database table and the Setting (16) database table to determine and control its functions.

4.2.5—Shield consists of data encryption libraries and cryptographic methods that protect data at rest and during transmission. As previously described in FIG. 1, one or more encryption keys are deployed to the Registered Internal Endpoint (5). These encryption keys are used by the deployed Agent software to encrypt the Meta Logs sent using communication channel described in Line (1.1) and to encrypt the archives sent using the communication channel described in Line (1.2). As such, the keys are functional to protect data while in transmission and at rest. Other encryption keys may be used to protect data stored on the Cloud Control Server (4.2) such as database keys that can encrypt the rows and columns comprised within the Cloud Control Server database and shown as Persistent Data (4.2.9). In a preferred embodiment, Shield (4.2.5) may be deployed as a Hardware Security Module (HSM).

4.2.6—Trumpet sends alerts based on violations of entitlements and potential data breaches as it reads the records that are written to the Remote Data (4.2.9) by Prophet and as previously described in FIG. 1 as the Alerts (11) component.

4.2.7—Prospectus creates a dynamic topology of known information resulting in forensic blueprint showing the location and movement of data. Referring again to FIG. 1, Prospectus is comprised within the Reporting (12) component of the Cloud Control Server (8). As meta data is received and stored in the Meta (14) table the data is consumed by the Reporting (12) component which produces artifacts that represent the location and movement of data according to the type of data and the classification of data. Embodiments of Prospectus are deployed as Business Logic (9).

4.2.8—Prophet predicts data breaches based on degree changes in data topology. Referring again to FIG. 1, Prophet (4.2.8) is comprised within the Analytics (10) component of the Cloud Control Server (8). Prophet is configured in accordance with Policy (15) and within the Settings (16) database tables. As meta data is received and stored in the Meta (14) table the data is consumed by the Analytics (10) component which produces signals that are sent to the Trumpet component. One signal may reflect a spike in user activity. Another signal may reflect data of a specific classification that has leaked onto one or more Unregistered External Endpoints (3). Signals are stored in a database table with a reference to the Meta (14) data.

4.3.1—Spy consists of APIs used by Scout to securely archive the information detected on end points using meta logs as previously described in FIG. 1, Line (1.1). The meta logs are encrypted using one of the encryption keys available to the Registered Internal Endpoint (5).

FIGS. 5A, 5B, 5C, and 5D are a continuous sequence diagram that illustrate the end-to-end process steps of the Forensic Computing Platform in an exemplary use case. The following use case is exemplary of a single use case and the corresponding end-to-end flow and is not intended to limit other use cases of the Forensic Computing Platform. As such, the following steps describe the major steps performed by the functional components of the Forensic Computing Platform when a registered internal endpoint (comprised of Scout, Judge, Sniper, and local data as previously described in FIG. 4) is scanned and as a result of the scan a single file or multiple files are judged to be inappropriate for the registered internal endpoint. Upon determining that the single file or multiple files are inappropriate for the registered internal endpoint the single file or multiple files can be moved to and protected on the remote cloud control server and deleted from the registered internal endpoint. The registered internal user can use a portal of the cloud control server to access the protected files in accordance with the internal user's entitlements. If supported by the entitlements of the registered internal user, the protected file or files can be shared with a registered external user. Prior to sharing the files with the registered external user, the single file or multiple files can be encoded so that they can be tracked. If the registered external user subsequently shares the encoded files with one or a plurality of registered or unregistered external users who are unauthorized to receive the file or files in this method, the forensic computing environment is operable to track the movement of the encoded data as it is opened on the one or a plurality of end points which may be of a registered or unregistered type.

Now referring to FIG. 5A, in Step 1, Sentinel (5.12) rotates (e.g. changes) the encryption key used by Shield (5.7). In Step 2, Scout (5.3) as deployed on and comprised within an endpoint retrieves instructions from the local data storage, Data (5.L), comprised on the same endpoint that comprises Scout (5.3). An instruction may be a one time or recurring instruction to scan the end point. The scan of the endpoint may be a full scan of the entire endpoint or it may be a limited scan as determined by the retrieved instruction. (The scanning process is comprised of the file traversal process which is described in FIG. 6). In Step 4, contemporaneously with the scan or after the scan, Scout (5.3) meta logs the results of the scan to LData (5.L). In Step 5, contemporaneously with the scan or after the scan, Scout (5.3) sends the meta logs comprising the results of the scan to Spy (5.4) which is the API layer that connects the endpoint with the cloud control server. (see FIG. 1 for a description of the Cloud Control Server) In Step 6, Spy (5.4) is operable to receive and store the meta logs into the remote data storage of the cloud control server designated as RData (5.R). In Step 7, as meta logs are written to RData (5.R) they are fed into the reporting component of the cloud control server which is designated as Prospectus (5.9). In another preferred embodiment, the meta logs may be read by Prospectus (5.9). In Step 8, as files are received by Prospectus (5.9) analytics are applied to the data by Prophet (5.10) in order to determine patterns of data use that constitute rule violations or deviations from normal behavior. In another embodiment Prophet (5.10) is operable to read the meta logs directly from RData (5.R). An example of a rule violation is the discovery by Scout (5.3) that a scanned file contained confidential data as determined by its file type ('.rx' or '.AO8' for example). An example of a deviation from normal behavior is the discovery that a given endpoint has increased or decreased the total number of files by a percentage that exceeds 100% of the average increase or decrease of the total number of files for this user or the average user. In Step 9, as unusual behavior or rule violations are detected constituting anomalies, the anomalies are sent to Trumpet (5.11). Trumpet (5.11) is the alerting component of the Forensic Computing Platform. In Step 10 Trumpet (5.11) creates an alert in accordance with the configuration of the Forensic Computing Platform. Anomalies may also be sent back to Prospectus (5.9) to be included in the activity reporting. Continuing now with Step 11, Scout (5.3) is operable to invoke Judge (5.1) to inspect the contents of the scanned file or files that correspond with the instructions received by Scout (5.3). (Details of this process are described in greater detail in FIG. 6). An example of an instruction would be to open and search any new or changed word, PDF, Excel documents for patterns of data that match a pattern that would possibly constitute PHI data or PCI data. Another example of an instruction received by Scout (5.3) and invoked using Judge (5.1) would be to open any new or changed file with an extension of '837' or '835' which are standard EDI payment file formats. In Step (13) Judge, which is comprised on the same endpoint with Scout (5.3) is operable to store the results of its processing into LData (5.L). In Step (14) either contemporaneously with its operation or after completion, Judge (5.1) sends the meta logs comprising the results of its operation to Spy (5.4) which is the API layer that connects the endpoint with the cloud control server. In Step 15, Spy (5.4) is operable to receive and store the meta logs into the remote data storage of the cloud control server designated as RData (5.R). In Step 16, as meta logs are written to RData (5.R) they are fed into the reporting component of the cloud control server which is designated as Prospectus (5.9). In another preferred embodiment, the meta logs may be read directly by Prospectus (5.9). In Step 17, as files are received by Prospectus (5.9) analytics are applied to the data by Prophet (5.10) in order to determine patterns of data use that constitute rule violations or deviations from normal behavior. In another embodiment Prophet (5.10) is operable to read the meta logs directly from RData (5.R). In Step 18, as unusual behavior or rule violations are detected constituting anomalies, the anomalies are sent to Trumpet (5.11). Anomalies may also be sent back to Prospectus (5.9) to be included in the activity reporting. In Step 19 Trumpet (5.11) creates an alert in accordance with the configuration of the Forensic Computing Platform. Alerts may be sent to different recipients depending on system configuration. For example in a violation of policy, a first alert based on the discovery of PCI data comprised within a file or files may be configured to be sent to the Chief Compliance Officer employed by the entity utilizing the Forensic Computing Platform. In another example which is a suspicious activity but not a policy violation, a second alert based on a deviation from normal file download behavior may be sent to the system administrator of the Forensic Computing Platform. Continuing now with Step 20, Scout (5.3) is operable to read the results of the completed operation of Judge (5.1). In a second exemplary deployed configuration, Scout (5.3) is operable to read the results of the operation of Judge (5.1) contemporaneously with Steps (11 through 19). It is an advantage of the second configuration to protect data concurrently with the operations of Judge (5.1). In either configuration, Scout (5.3) is operable to protect data in accordance with its retrieved instructions. Files flagged for protection are moved from the scanned endpoint to Enclave (5.6) comprised within the cloud control server. (Refer to FIG. 6 for additional details.) In Step 23 files are immediately encrypted by (Shield 5.6) upon receipt. For enhanced security, in a typical and preferred deployment of the Forensic Computing Platform, data may also be encrypted by Scout (5.3) before transmission to Enclave (5.6) using a data transmission key. Referring now to FIG. 5B, in Step 24, following or contemporaneously with Step 21 and 22, Scout (5.3) meta logs the results of the data protection to LData (5.L). In Step 25, contemporaneously or immediately following Step 24 Scout (5.3) sends the meta logs comprising the results of the data protection to Spy (5.4) which is the API layer that connects the endpoint with the cloud control server. In Step 26, Spy (5.4) is operable to receive and store the meta logs into the remote data storage of the cloud control server designated as RData (5.R). In Step 27, as meta logs are written to RData (5.R) they are fed into the reporting component of the cloud control server which is designated as Prospectus (5.9). In another preferred embodiment, the meta logs may be read directly by Prospectus (5.9). In Step 28, as files are received by Prospectus (5.9) analytics are applied to the data by Prophet (5.10) in order to determine patterns of data use that constitute rule violations or deviations from normal behavior. In another embodiment Prophet (5.10) is operable to read the meta logs directly from RData (5.R). In Step 29, as unusual behavior or rule violations are detected constituting anomalies, the anomalies are sent to Trumpet (5.11). Anomalies may also be sent back to Prospectus (5.9) to be included in the activity reporting. In Step 30 Trumpet (5.11) creates an alert in accordance with the configuration of the Forensic Computing Platform.

Continuing now with Step 31, Scout (5.3) having now meta logged the results of the completed data protection operation and based on its configuration and in accordance with the received instructions, Scout (5.3) is operable to invoke functionality comprised within Sniper (5.2). Sniper (5.2) is comprised on the same endpoint with Scout (5.3) and may be deployed as a separate agent or comprised as a sub-routine within Scout (5.3). In Step 31, Sniper (5.2) is operable to delete files from the endpoint. Sniper (5.2) is also operable to delete or redact specific data elements within a scanned file. (refer to FIG. 6 for more details.) In the present example, files are deleted immediately after they are first protected (referring to Step 22). However in other exemplary embodiments, a file or files may be deleted by Sniper (5.2) irrespective of the prior result of data protection. For example, a file may be deleted as a result of a scan by Scout (5.3) that determined that the file is of a type (e.g. 'rx', 'A08', HL7, '837') that is not authorized for this endpoint. In yet another embodiment, a file or files may be deleted following the results of Judge (5.1) and wherein the file is determined to contain inappropriate data for this endpoint (e.g. PCI, PII, PHI) and in this case the files can be deleted by Sniper (3.2) without a prerequisite to first protect the file or files. In Step 32, Sniper (3.2) deletes the identified file or files from the endpoint. In Step 33, Sniper (3.2) meta logs the results of the file deletion to the LData (5.L). In Step 34, Sniper (5.2) sends the meta logs comprising the results of the data protection to Spy (5.4) which is the API layer that connects the endpoint with the cloud control server. In Step 35, Spy (5.4) is operable to receive and store the meta logs into the remote data storage of the cloud control server designated as RData (5.R).

In Step 36, as meta logs are written to RData (5.R) they are fed into the reporting component of the cloud control server which is designated as Prospectus (5.9). In another preferred embodiment, the meta logs may be read directly by Prospectus (5.9). In Step 37, as files are received by Prospectus (5.9) analytics are applied to the data by Prophet (5.10) in order to determine patterns of data use that constitute rule violations or deviations from normal behavior. In another embodiment Prophet (5.10) is operable to read the meta logs directly from RData (5.R). In Step 38, as unusual behavior or rule violations are detected constituting anomalies, the anomalies are sent to Trumpet (5.11). Anomalies may also be sent back to Prospectus (5.9) to be included in the activity reporting. In Step 39 Trumpet (5.11) creates an alert in accordance with the configuration of the Forensic Computing Platform. Continuing now with FIG. 5C. In Step 40, Internal User (5.A) a Registered Internal User of the Forensic Computing Platform logs into the Portal (5B) of the Forensic Computing Platform using unique credentials associated with Internal User (5.A). In Step 41, the unique credentials of Internal User (5.A) are passed to Guardian (5.5). In Step 42, Guardian (5.5) is operable to retrieve the entitlements associated with Internal User (5.A) from PData (5.P). Having retrieved the entitlements associated with Internal User (5.A), Guardian is further operable to enable authorized functions on the Portal (5.B) of the forensic computing environment.

As shown in Step 43, and in accordance with this specific use case, Guardian (5.5) is operable to enable the file share functions of the Portal (5.B). However, it should be noted in another exemplary embodiment, Guardian is also equally operable to disable the same file share options based on the entitlements for a given user or users. In Step 44, Internal User (5.A) invokes a data sharing request using Portal (5.B). The received data sharing request is passed to Guardian (5.5) in Step 45. Guardian (5.5) comprised of business logic is operable to orchestrate steps (46, 47 and 48). In Step 46, the data sharing request is sent to Enclave (5.6); data sharing request is comprised of the specific file or files to be shared, one or more of maximum downloads and expiration date, and the intended external user or users targeted to receive the file or files. In Step 47, Shield (5.7) is operable to decrypt the file or files. In Step 48, Chaperone (5.8) is operable to encode the file or files with tracking embodiments as previously discussed in FIG. 1. Having now identified the file or files to be shared and decrypted and encoded those files, in Step 49, Guardian (5.5) is operable to initiate a message to External User (5.C) with a secure link to the shared files. In another preferred embodiment, the shared files may be re-encrypted using an additional transport key, thus providing an additional layer of security for the files while in transmission. In this embodiment, the transport key is obtained from Shield (5.7) and applied to the shared files after they are encoded by Chaperone (5.8) in Step 48. In Step 49, the message comprised with the secure link is sent to the External Endpoint (5.D), the endpoint associated with External User (5.C).

In Step 50, the message is opened and the External User (5.C) clicks on the link comprised within the message. If the External User (5.C) is already registered on the Forensic Computing Platform, the External User (5.C) is one of a Registered External User as previously described in FIG. 1. In Step 51, External User (5.C) logs in to the Portal (5B) using the unique credentials associated with this external user. In Step 52 the unique credentials of External User (5.C) are passed to Guardian (5.5). In Step 53, Guardian (5.5) is operable to retrieve the entitlements associated with External User (5.C) from PData (5.P). Having retrieved the entitlements associated with External User (5.C), Guardian is further operable to enable authorized functions on the Portal (5.B) of the forensic computing environment. As shown in Step 54, and in accordance with this specific use case, Guardian (5.5) is operable to enable the file download functions of the Portal (5.B). In Step 55, having enabled the download functions, as the process orchestrator of the Forensic Computing Platform, Guardian (5.5) sends a message to Enclave (5.6) to initiate the download.

In Step 56, the file or files are downloaded to the External Endpoint (5.D). In Step 57, Guardian (5.5) is operable to store the meta logs comprising the results of the completed file share into the remote data storage of the cloud control server designated as RData (5.R). In Step 58 as meta logs are written to RData (5.R) they are fed into the reporting component of the cloud control server which is designated as Prospectus (5.9). In another preferred embodiment, the meta logs may be read directly by Prospectus (5.9). In Step 59, as files are received by Prospectus (5.9) analytics are applied to the data by Prophet (5.10) in order to determine patterns of data use that constitute rule violations or deviations from normal behavior. In another embodiment Prophet (5.10) is operable to read the meta logs directly from RData (5.R). In Step 60, as unusual behavior or rule violations are detected constituting anomalies, the anomalies are sent to Trumpet (5.11). Anomalies may also be sent back to Prospectus (5.9) to be included in the activity reporting. In Step 61 Trumpet (5.11) creates an alert in accordance with the configuration of the Forensic Computing Platform. In this exemplary embodiment, an alert may be generated based on an anomaly wherein the External User (5.C) has received files from multiple internal users that exceeds the average number of files received or exceeds a preestablished threshold of total files. This alert is necessary because Guardian (5.5) may not be aware of the total number of files already received by External User (5.C), particularly if those files were sent by a plurality of internal users. In this case, the analytics capability of Prophet (5.10) is operable to see this pattern of activity and generate the corresponding anomaly in Step 60. Continuing now with FIG. 5D, in Step 62, previously downloaded files comprised with encoded data are forwarded to an Unauthorized Device (5.E).

In Step 63, at least one encoded file is opened on Unauthorized Device (5.E). In Step 64, a tracking message is sent to the Chaperone (5.8) function of the Forensic Computing Platform. Depending on the encoding method, the tracking message may be comprised of one or more of the following: download file ID, IP address, MAC address, user information, hardware serial numbers, Identifying Operating System Data, Cookies, Locally Stored Objects and other data associated with the Unauthorized Device (5.E). In Step 65, Chaperone (5.8) is operable to store the meta logs comprising the results of the data tracking message into the remote data storage of the cloud control server designated as RData (5.R). In Step 66 as meta logs are written to RData (5.R) they are fed into the reporting component of the cloud control server which is designated as Prospectus (5.9). In another preferred embodiment, the meta logs may be read by Prospectus (5.9). In Step 67, as files are received by Prospectus (5.9) analytics are applied to the data by Prophet (5.10) in order to determine patterns of data use that constitute rule violations or deviations from normal behavior. In another embodiment Prophet (5.10) is operable to read the meta logs directly from RData (5.R). In Step 68, as unusual behavior or rule violations are detected constituting anomalies, the anomalies are sent to Trumpet (5.11). Anomalies may also be sent back to Prospectus (5.9) to be included in the activity reporting. In Step 69 Trumpet (5.11) creates an alert in accordance with the configuration of the Forensic Computing Platform. In this exemplary embodiment, an alert may be generated based on an anomaly wherein the Unauthorized Device (5.E) has received files from Registered External Endpoint (5.D). In this case, the analytics capability of Prophet (5.10) is operable to see this pattern of activity and generate the corresponding anomaly in Step 68. In Step 70, previously downloaded files comprised with encoded data are forwarded from Unauthorized Device (5.E) to a Plurality of Devices (5.F). The Plurality of devices may be any combination of Registered Internal Devices, Registered External Devices, and Unregistered External Devices. In Step 71, at least one encoded file is opened on at least one of the Plurality of Devices (5.F). In Step 72, a tracking message is sent to the Chaperone (5.9) function of the Forensic Computing Platform. Depending on the encoding method, the tracking message may be comprised of one or more of the following: download file ID, IP address, MAC address, User Information, Hardware Serial Numbers, Identifying Operating System Data, Cookies, Locally Stored Objects and other data associated with the at least one of the Plurality of Devices (5.F). In Step 73, Chaperone (5.8) is operable to store the meta logs comprising the results of the data tracking message into the remote data storage of the cloud control server designated as RData (5.R). In Step 74 as meta logs are written to RData (5.R) they are fed into the reporting component of the cloud control server which is designated as Prospectus (5.9). In another preferred embodiment, the meta logs may be read directly by Prospectus (5.9). In Step 75, as files are received by Prospectus (5.9) analytics are applied to the data by Prophet (5.10) in order to determine patterns of data use that constitute rule violations or deviations from normal behavior. In another embodiment Prophet (5.10) is operable to read the meta logs directly from RData (5.R). In Step 76, as unusual behavior or rule violations are detected constituting anomalies, the anomalies are sent to Trumpet (5.11). Anomalies may also be sent back to Prospectus (5.9) to be included in the activity reporting. In Step 77, Trumpet (5.11) creates an alert in accordance with the configuration of the Forensic Computing Platform. In this exemplary embodiment, an alert may be generated based on an anomaly wherein one of the Plurality of Devices (5.F) is a Registered Internal Endpoint (device) that has received files from an Unauthorized Device (5.E). In this case, the analytics capability of Prophet (5.10) is operable to see this pattern of activity and generate the corresponding anomaly in Step 76. Although in this final exemplary alert, the receiving device is one of a Registered Internal Endpoint, which may otherwise have had access to the file or files, the encoded file or files were received at the Registered Internal Endpoint in an unauthorized manner, thus constituting a breach of security policy.

FIG. 6 highlights the key components of the technical layer of the Forensic Computing Environment comprised within a deployed endpoint in an exemplary implementation. These components can be implemented as one or more software modules running on one or more servers and a plurality of endpoints. 6.1—As required to support the functional embodiments of Spy, the Remote Communications (6.1) component is operable to send packets of information to a remote server of the Forensic Computing Platform, receive information from a remote server of the Forensic Computing Platform, parse it, and make it available to other functions comprised within the deployed endpoint. On the initial request, this component will use a generic transmittal key to encode the data packets within an established SSL tunnel. The remote server of the Forensic Computing Platform will return data in that request, encrypted with the generic key, a unique transmittal key as a data element comprised within the encrypted response. This component will notify the state machine of the new key, and will use the new key for all subsequent requests. This key exchange happens only once, unless a new key rotation is initiated from the remote server of the Forensic Computing Platform. Certain data elements may be passed back from the remote server of the Forensic Computing Platform with each corresponding response from any request. This data can include new profiles from the remote server, updated keys, remote server addresses, a request to delete file(s) or a given file, or a request to disable the application. These instructions will be provided directly to other modules for further action.

6.2—Remote security may be deployed as a separate component or comprised within the State Configuration component and is operable to disable the deployed agent of the Registered Internal Endpoint if it has received a command from the remote server of the Forensic Computing Platform to do so. Once an application is disabled, the only operation the entire deployed agent will do is check with the remote server of the Forensic Computing Platform to see if it is enabled again. 6.3—As required to support the functional embodiments of Scout, Judge, and Sniper, and other embodiments described herein, File Traversal & Parsing (6.3) is operable to traverse the file system of the endpoint that comprises the deployed agent and extract information about each file. The resulting information is collected in a memory array of file system objects. The scanning process works by traversing the file system from a given starting point, descending into all directories, and detecting and reporting information about each file discovered therein that matches whatever search criteria was passed in. Search criteria can include the volume, folder, file type, file name and other criteria that can be used to identify specific files on the deployed endpoint. Information such as file name, creation date, permissions, ownership, size, and modification date is collected for each detected file, as well as a computed hash of the contents of the file. Additional discovered attributes may include 'Exchangeable Image File Format' (EXIF) tag information of a file such as document creation dates, revision dates MAC addresses, document file paths, usernames and text revisions archived by a document track changes feature. Certain photographs taken by smart phones may include location information which is stored as EXIF tags. If these photographs are subject to a scan or are embedded in a scanned document, the EXIF tags of the photograph can be detected. Email headers also contain hidden EXIF tags that can be read. All detected EXIF tags can be appended to the properties of the scanned file and Meta Logged (see step 6.4). A scan may also include examining the contents of compressed files (i.e. zip, 7z, tar, gzip), opening and testing any file for patterns in commonly used database formats such as PST, MDB, and others, and testing for patterns of data within a detected file with the use of regular expressions or other means. After each file is scanned and examined, the results are logged. Depending on those results, other actions might be taken on that file by other functional components, including deletion, redaction, encryption, appending data or archiving.

6.4—As required to support the functional embodiments of Spy, Meta Logging is operable to gather information from the Database/Storage (6.5) component and uses the Remote Communications (6.1) component to send it forward to the remote servers comprised within the Forensic Computing Platform. Meta Logging expects a response back from the remote servers comprised within the Forensic Computing Platform to confirm that the message was received, and then is operable to update the Database/Storage (6.5) component that the info was successfully received and logged.

6.5—Database Storage component is operable to control communications to and from the local Database. Any database that supports encrypting at the table level is sufficient for the technical deployment on the deployed endpoint and this invention is not dependent on a particular database.

6.6—State Configuration is the master component that contains interfaces to the other modules and provides access to configuration files and the license validation module. All database interaction between the deployed application and the local database of the endpoint happens through the State Configuration (6.6)—and no direct access to the database is given to any other module. The State Configuration (6.6) also listens for shutdown requests received from the remote server of the Forensic Computing Platform, and is responsible to shut down the deployed agent or agents.

6.7—License Validation is operable to validate a license key, and also returns information to the State Configuration (6.6) component that is used to enable various functions depending on license key type. A first license key may for example enable the deployed application to scan only. While a second license key may enable the deployed application to classify information based on the contents of a scanned file. A third license key may enable the deployed application to protect a file discovered on an endpoint. While a fourth license key may enable the deployed application to delete files or redact information from discovered files from the endpoint.

6.8—Needed to support the movement of data from the endpoint to Enclave, Archive Transport is operable for taking a file and placing it in the archival location. This component supports File System, FTP, SFTP and other defined interfaces. This module depends on the Cryptographic (6.10) component for message encryption prior to transport.

6.9—CRON is operable as a time based scheduler that is responsible for kicking off and managing scans, meta logging, remote security, and any other remote validation.

6.10—Cryptography is operable for all encryption and decryption operations.

6.11—Cloud Control Server is operable as the cloud control server comprised within the Forensic Computing Platform as described in FIG. 1 and referenced in FIGS. 4 and 5.

6.12—Remote Storage is operable to store the Encrypted Archives (18) as describe in FIG. 1 and supports the functional embodiments of Enclave. Remote Storage (6.12) may be deployed in a geographically or physically separate location from the other servers comprised within the Forensic Computing Platform.

6.13—Configuration is operable as the initial set of instructions for the deployed application. On the first execution, the deployed application reads the Configuration (6.13) file and stores the instructions into the Database Storage component (6.5).

Continuing now with a description of each line comprised within FIG. 6.

Line 1 shows that when the State Configuration (6.6) initializes, it opens a connection to the Database component (6.5) and maintains that connection. When State Configuration (6.6) accepts requests for data from other modules, it requests data from the database component and returns the requested data to the requesting module.

Line 2 shows that the Database component (6.5) depends heavily on the Cryptographic (6.10) component to read and write to the deployed local database, as all data can be encrypted at rest. As such, data to be encrypted or decrypted is sent to the Cryptographic (6.10) component, and the results are returned to the Database component (6.5).

Line 3 shows that the State Configuration (6.6) also interacts directly with the Cryptographic component (6.10) to encrypt and decrypt data and return the results for processing.

Line 4 shows that the State Configuration (6.3) launches a thread to perform File Traversal and Parsing (6.3), and thereafter manages that thread, retrieving data from (6.3), answering requests from (6.3), and shutting down (6.3) when its services are no longer needed. The trigger to launch File Traversal and Parsing (6.3) may come from instructions from the Cloud Control Server (6.11), from the CRON component (6.9), or from user input.

Line 5 shows that the File Traversal and Parsing (6.3) may, depending on configuration, call upon the Archival Transport component (6.8) to push an encrypted file to an archival location shown as Remote Storage (6.12). Once pushed, the Archival Transport component (6.8) will return a confirmation message to File Traversal and Parsing (6.3).

Line 6 shows that the Archival Transport component (6.8) may interact directly with a Remote Storage (6.12) Environment. This environment could be a single file server, a cloud based storage environment, or any other conceivable connected/networked storage device.

Line 7 shows that the Remote Communications component (6.1) communicates securely with the Cloud Control Server (6.11) using an encrypted SSL session and sending encrypted data. This Cloud Control Server will decrypt the data packets and process the request and return a response. The environment may also return additional configuration information and instructions to the local client.

Line 8 shows the Remote Communications component (6.1) relies on the Cryptographic component (6.10) to encrypt data packets and maintain an encrypted SSL session. Data to be encrypted or decrypted is sent to the Cryptographic component, with results returned.

Line 9 shows that the Meta Logging component (6.4) makes use of Remote Communications (6.1) to send data to the Cloud Control Server (6.11). Confirmation of receipt is returned to back the Meta Logging function.

Line 10 shows that the State Configuration (6.6) is responsible for launching the Meta Logging component (6.4). Requests for data to Meta Log and requests for confirmations of data successfully sent are returned to (6.6).

Line 11 shows that the Remote Security component (6.2) is responsible for instructing State Configuration (6.6) to deactivate the process and fall back to a mode of operation where all the deployed application does is wait for either an activation instruction or it receives other instructions from the Cloud Control Server. Additionally, State Configuration (6.6) will periodically request Remote Security to check to see if the activation status of the deployed application has changed.

Line 12 shows that License Validation (6.7) is called by State Configuration to validate license keys and to return information about the license that enables or disables certain functionality of the deployed application.

Line 13 shows that CRON (6.9) is initialized by State Configuration (6.6) with a list of profiles or activities to schedule, and returns back to the State Configuration when an activity is supposed to take place. (This is more fully detailed in FIG. 6b.) The activities subject to scheduling include initiating a File Traversal, pushing Meta Logs, checking in with Remote Security, and any other activities that run on a schedule.

Line 14 shows that License Validation (6.7) requests Remote Communications (6.1) to validate license key information. The results of that validation are returned to License Validation (6.7).

Line 15 shows that Remote Security (6.2) requests Remote Communications (6.1) to check in with the Cloud Control Server (6.11) and determine if there has been a change in status for this deployed application while the local environment is running, and checks to see if there are additional instructions waiting from the Cloud Control Server (6.11). The results of that check are returned to the State Configuration (6.6) function.

Line 16 shows the consumption of the Configuration (6.13) file by the State Configuration (6.6) component of the deployed application.

FIG. 6a describes a typical sequence flow of the components of the technical layer of the Forensic Computing Platform.

Step 1—remote communications component of deployed application supplies data to the remote server.

Step 2—license validation component of deployed application requests a license key and registration URL from the State Configuration (6.6) function.

Step 3—An SSL session is established with the remote server.

Step 4—If the deployed application already has obtained a license key from user input, control is passed to this step to encrypt the data and send the encrypted data to the remote server.

Step 5—If the deployed application does not have a license key, a generic license key is used to request an official license key.

Step 6—The remote server returns a new, unique license key.

Step 7—The received license key is sent to the State Configuration (6.6) function.

Step 4—Data is encrypted and sent to the remote server. This initial data set includes information about the deployed endpoint such as serial number, MAC address, and other unique information obtained during registration and as previously described herein.

Step 8—The remote server extracts information from the received packet.

Step 9—The remote server decrypts the data packet and processes the data.

Step 10—The remote server checks for additional information to send to the deployed application (client).

Step 11—The remote server encrypts and returns the data to the deployed application.

Step 12—The cryptography component of the deployed application decrypts the data packet and inspects the additional data.

At this point in the process, the deployed application makes a decision based on the inspected packet. If the data is simply a confirmation message from the remote server, Step 13 is executed and data is sent to the calling function. If the data is comprised of an instruction for the Remote Security (6.2) function, the data is sent to remote security as shown in Step 14. If the data is configuration data, the message is sent to the State Configuration (6.6) component of the deployed application.

FIG. 6*b* describes the interaction with State Configuration (6.6) and the CRON (6.9) system.

Line 1. State Configuration (6.6) initializes, and provides from the Database component (6.5) a list of activities and the times they should run.

Line 2. CRON (6.9) arranges these activities into a chain of objects, each link includes a timestamp and an activity type. A confirmation of receipt of the list is sent back to State Configuration (6.6).

Line 3. Each second the CRON component compares the chain with the current timestamp, and if any links are equal to or older than the current timestamp, they are returned to the State Configuration for execution.

Line 4. State Configuration then sends to the pertinent module a command to start a given function, along with any data pertinent to that activity.

Line 5. External modules may receive instructions or, based on programming logic, request to change a currently set activity schedule. They subsequently request a scheduling change from State Configuration.

Line 6. State Configuration receives the request, logs it, and forwards the request to the CRON, which sends back confirmation of receipt. The CRON then updates the schedule accordingly.

Line 7. State Configuration is responsible for shutting down CRON. A request for shutdown is sent.

Line 8. When CRON has freed up used resources, it sends back confirmation that it is indeed shut down.

Continuing now with the next figure. FIG. 6*c* is a flow chart describing the File Traversal (6.3) flow of the deployed application of the Forensic Computing Platform.

Box 1*a* and 1*b* show the two ways a file traversal can be initiated. Either the CRON (6.9) component requests the file traversal run because a previously scheduled task is now ready to run, or instructions to run a File Traversal were received over Remote Communications.

Box 2 shows that the State Configuration (6.6) received the request and evaluates the data.

Box 3. If the data is not complete, as in a scheduled task, then the Database component is requested to provide the remaining data.

Box 4. The remaining data is retrieved, and the file traversal is initiated.

Box 5. The data remains incomplete and State Configuration asks the Database component to log the failure.

Box 6. The failure is logged, and the process ends.

Box 7. File traversal examines the request and starts the traversal process.

Box 8. When the traversal process is complete, the process ends.

Box 9. State Configuration requests the results be logged.

Box 10. The Database component logs the results, and the process ends.

Continuing now with the next figure. FIG. 6*d* describes more in detail the file traversal process.

Box 1. Notes that this part of the process starts with an internal component call—the component being responsible for managing the traversal of a single directory.

Box 2. Open the directory.

Box 3. Test the accessibility of the directory.

Box 4. If the directory is not readable—the State Configuration is called with the error and details.

Box 5. Prepare to list the contents of the directory based on the instruction received by the deployed application. All subdirectories and all files that match whatever pattern(s) requested for the current scan. The patterns can be a variety of things, including the file type, files that have certain EXIF data, files that contain information matching a specific pattern, file names matching a pattern, or files matching other searchable criteria.

Box 6. The file traversal component of the deployed application reads each entry one at a time, and processes that entry.

Box 7. Each entry is tested to determine if the item is null—if so, then it has completed the process of listing the current directory and control is returned out of the function. If this is the last directory to traverse, this will end this part of the process. —the completion corresponding to FIG. 6*c* Box 8.

Box 8. The current entry is tested for redundant operating system directory entries, namely the '.' and '..' directories. The '.' directory represents the current directory, and '..' represents the parent directory.

Box 9. If the item is a directory, the same component is recursively called, so that directory contents can be included in the current traversal.

Box 10. If the item is a link to a directory, it is treated as a directory.

Box 11. The link is resolved to a full path, and traversal logic ensures that this path isn't one that is already scanned. Next, the same component is recursively called, so the directory contents can be included in the current traversal.

Box 12. If the item is a file, or a link to a file (in operating systems supporting that concept), the deployed component subjects the file to a series of different tests and actions, depending on the instructions that accompanied this traversal. The file can be archived to a remote server, its contents can be tallied, or examined, and compared against strings or data segments, a hash can be computed on the file, data can be appended or removed from the file, etc. No matter what action is to be taken, all parameters are made available to be meta logged (6.4) to the Cloud Control Server (6.11). An overview of this process is outlined in FIG. 6*e*.

The above process repeats for each item in the directory, with the component returning back to either the recursive call that initiated a scan on a subdirectory, or, when all files are scanned, to Box 8 on FIG. 6*c*.

Continuing now with the next figure. FIG. 6*e*—File Traversal Flow Chart, showing additional details of Box 12, FIG. 6*d*—This sample flow chart shows the decisions made during the file examination portion of the file traversal, and the actions thus taken for each scanned file:

Step 1—Gather all file properties of the scanned file in accordance with configuration requirements.

Step 2—Is a hash value to be calculated?

Step 3—If a hash value is to be calculated, a unique hash value is calculated for the file and added to the properties associated with the scanned file in accordance with configuration requirements.

Step 4—Are EXIF values to be determined?

Step 5—If EXIF values are to be determined, pull available EXIF data and add EXIF data to the properties associated with the current file in accordance with configuration requirements.

Step 6—Is there a requirement to search the contents of the scanned file?

Step 7—If there is a requirement to search the contents of the scanned file, search the contents of the file for matching patterns and add to the properties associated with the scanned file in accordance with configuration requirements.

Step 8—Is there a requirement to archive the scanned file?

Step 9—If there is a requirement to archive the scanned file, compress and encrypt the file in accordance with configuration requirements.

Step 10—Is there additional information to append to the scanned file?

Step 11—If there is additional information to append to the scanned file, append additional information to the scanned file in accordance with configuration requirements. Additional information may include EXIF data tags, forensic encoding to allow tracing the file movement, or other information in accordance with the system configuration.

Step 12—Is information to be removed (redacted) from the scanned file?

Step 13—If information is to be removed from the scanned file, remove information from the file in accordance with configuration requirements. Examples include social security numbers, credit card numbers, and other information that is considered restricted.

Step 14—Is the file to be deleted?

Step 15—If the file is to be deleted, delete the file in accordance with configuration requirements. If there is a requirement to perform a secure delete such as a DOD seven-pass wipe or similar secure deletion, overwrite in accordance with this requirement.

Step 16—Pass information to State Configuration (6.6) to save all collected file properties.

Step 17—Prepare all data for meta logging.

Step 18—Return to step 6*d*.

Having described the components of the technical architecture of the deployed endpoint, it should be appreciated that other implementations of the technology architecture are possible and can be described in subsequent disclosures.

FIG. 7 provides an end-to-end process flow that illustrates the interaction of key functions in an exemplary Basic Scan use case. In step (7.1) Registered Internal Endpoint (7100) is scanned by Scout producing meta logs that are sent to the Cloud Control Server (7200) of the Forensic Computing Platform using Spy in step (7.2). The Cloud Control Server (7200) is operable to receive and store the meta logs in step (7.3). The Cloud Control Server (7200) is further operable to analyze the meta logs using Prophet in step (7.4). The Cloud Control Server (7200) is further operable to create an alert based on the analysis of the meta logs using Trumpet in step (7.5).

FIG. 8 provides an end-to-end process flow that illustrates the interaction of key functions in an exemplary Scan Using Judge case. In step (8.1) Registered Internal Endpoint (8100) is first scanned by Scout followed by an examination by Judge in step (8.2) producing meta logs that are sent to the Cloud Control Server (8200) of the Forensic Computing Platform using Spy in step (8.3). The Cloud Control Server (8200) is operable to receive and store the meta logs in step (8.4). The Cloud Control Server (8200) is further operable to analyze the meta logs using Prophet in step (8.5). The Cloud Control Server (8200) is further operable to determine the data classification of scanned files based on the analysis of the meta logs using Trumpet in step (8.6). The Cloud Control Server (8200) is further operable to create an alert based on the analysis of the meta logs using Trumpet in step (8.7) and in accordance with the configuration and settings for the data classification.

FIG. 9 provides an end-to-end process flow that illustrates the interaction of key functions in an exemplary Scan and Control use case. In step (9.1) Registered Internal Endpoint (9100) is first scanned by Scout followed by an examination by Judge in step (9.2) producing meta logs that are sent to the Cloud Control Server (9200) of the Forensic Computing Platform using Spy in step (9.3). The Cloud Control Server (9200) is operable to receive and store the meta logs in step (9.4). The Cloud Control Server (9200) is further operable to analyze the meta logs using Prophet in step (9.5). The Cloud Control Server (9200) is further operable to determine the data classification of scanned files based on the analysis of the meta logs using Trumpet in step (9.6). The Cloud Control Server (9200) is further operable to create an alert based on the analysis of the meta logs using Trumpet in step (8.7) and in accordance with the configuration and settings for the data classification. The Cloud Control Server (9200) is further operable to send a data delete instruction (step 8) to the Registered Internal Endpoint (9100) using Spy. The Registered Internal Endpoint (9100) having received the data delete instruction is operable to delete the target data element as shown in (step 9). Meta logs of the delete operation are sent from the Registered Internal Endpoint (9100) in (step 9.10) using Spy. The Cloud Control Server (9200) is operable to receive and store the meta logs in step (9.11).

FIG. 10 provides an end-to-end process flow that illustrates the interaction of key functions in an exemplary Scan and Protect use case. In step (10.1) Registered Internal Endpoint (10100) is first scanned by Scout followed by an examination by Judge in step (10.2) producing meta logs that are sent to the Cloud Control Server (10200) of the Forensic Computing Platform using Spy in step (10.3). The Cloud Control Server (10200) is operable to receive and store the meta logs in step (10.4). The Cloud Control Server (10200) is further operable to analyze the meta logs using Prophet in step (10.5). The Cloud Control Server (10200) is further operable to determine the data classification of scanned files based on the analysis of the meta logs in step (10.6). The Cloud Control Server (10200) is further operable to create an alert based on the analysis of the meta logs using Trumpet in step (10.7) and in accordance with the configuration and settings for the data classification. The Cloud Control Server (10200) is further operable to send a data protect instruction (step 10.8) to the Registered Internal Endpoint (10100) using Spy. The Registered Internal Endpoint (10100) having received the data protect instruction is operable to move the protected data file(s) as shown in (step 10.9). The Cloud Control Server (10200) is operable to receive and store the protected data file(s) in (step 10.10) using Enclave. The Cloud Control Server (10200) is operable to protect the stored data file(s) in (step 10.11) using Shield. Meta logs of the protect operation are sent from the Registered Internal Endpoint (10100) in (step 10.12) using Spy. The Cloud Control Server (10200) is operable to receive and store the meta logs in step (10.13). The Cloud Control Server (10200) is operable produce a report based on the analysis of the meta logs in step (10.14) using Prospectus.

FIG. 11 provides an end-to-end process flow that illustrates the interaction of key functions in an exemplary Scan and Local Protect use case. In step (11.1) Registered Internal Endpoint (11100) is first scanned by Scout followed by an examination by Judge in step (11.2) Scout is operable to invoke a locally stored instruction to protect the scanned data as shown in step (11.3). Protected data is moved to the Cloud Control Server (11200) of the Forensic Computing Platform in step (11.4). The Cloud Control Server (11200) is operable to receive and store the protected data file(s) in (step 11.5) using Enclave. Meta logs are sent to the Cloud Control Server (11200) using Spy in step (11.6). The Cloud Control Server (11200) is operable to receive and store the meta logs in step (11.7). The Cloud Control Server (11200) is further operable to analyze log data in step (11.8) using Prophet and determine the data classification of scanned files based on the analysis of the meta logs in step (11.9). The Cloud Control Server (11200) is further operable to create a report based on the analysis of the meta logs using Prospectus in step (11.10) in accordance with the configuration and settings for the data classification.

FIG. 12 provides an end-to-end process flow that illustrates the interaction of key functions in an exemplary Scan and Local Control use case. In step (12.1) Registered Internal Endpoint (12100) is first scanned by Scout followed by an examination by Judge in step (12.2) Scout is operable to invoke a locally stored instruction to delete the scanned data as shown in step (12.3). Meta logs are sent to the Cloud Control Server (12200) of the Forensic Computing Platform using Spy in step (12.4). The Cloud Control Server (12200) is operable to receive and store the meta logs in step (12.5). The Cloud Control Server (12200) is further operable to analyze log data in step (12.6) using Prophet and produce a report of deleted files based on the analysis of the meta logs as shown in step (12.7)

FIG. 13 provides an end-to-end process flow that illustrates the interaction of key functions in an exemplary Share Data with Registered External End Point use case. In step (13.1) the Registered Internal User uses the Registered Internal Endpoint (13100) to log into the Cloud Portal comprised within the Cloud Control Server (13200) of the Forensic Computing Platform. In step (13.2) the Cloud Control Server (13200) is operable to allow access using entitlements that have previously stored in Guardian and associated with the Registered Internal User's credentials. In step (13.3) the Cloud Control Server (13200) receives a data access request from the Registered Internal Endpoint (13100). Guardian determines if the data access request is valid for the credentials associated with the Registered Internal User and the Registered Internal Endpoint. If the data access request is valid, data is retrieved from Enclave in step (13.5). Data may be downloaded, shared with internal users or shared with external users in accordance with entitlements for the Registered Internal User. In this example, the retrieved data is sent to the Registered External Endpoint (13300) in step (13.6). Meta logs are created by the Cloud Control Server (13200) in step (13.7). The Cloud Control Server (13200) is operable to store the meta logs in step (13.8). The Cloud Control Server (13200) is further operable to analyze log data in step (13.9) using Prophet. The Cloud Control Server (13200) is further operable to create a report based on the analysis of the meta logs using Prospectus in step (13.10). The Cloud Control Server (13200) is further operable to create an alert based on the analysis of the meta logs using Trumpet in step (13.11).

FIG. 14 provides an end-to-end process flow that illustrates the interaction of key functions in an exemplary Share Data with Registered External End Point using Chaperone use case. In step (14.1) the Registered Internal User uses the Registered Internal Endpoint (14100) to log into the Cloud Portal comprised within the Cloud Control Server (14200) of the Forensic Computing Platform. In step (14.2) the Cloud Control Server (14200) is operable to allow access using entitlements that have previously stored in Guardian and associated with the Registered Internal User's credentials. In step (14.3) the Cloud Control Server (14200) receives a data access request from the Registered Internal Endpoint (14100). Guardian determines if the data access request is valid for the credentials associated with the Registered Internal User and the Registered Internal Endpoint. If the data access request is valid, data is retrieved from Enclave in step (14.5). Data may be downloaded, shared with internal users or shared with external users in accordance with entitlements for the Registered Internal User. In this example, the retrieved data is first encoded with Chaperone in step (14.6) and sent to the Registered External Endpoint (14300) in step (14.7). Meta logs are created by the Cloud Control Server (14200) in step (14.8). The Cloud Control Server (14200) is operable to store the meta logs in step (14.9). In step (14.10) the file comprised of Chaperone encoding is opened on the Registered External Endpoint (14300) which causes Chaperone encoding to send forensic data sent back to the Cloud Control Server (14200) as shown in step (14.11). Meta logs are created by the Cloud Control Server (14200) in step (14.12). The Cloud Control Server (14200) is operable to store the meta logs in step (14.13). The Cloud Control Server (14200) is further operable to analyze log data in step (14.14) using Prophet. The Cloud Control Server (14200) is further operable to create a report based on the analysis of the meta logs using Prospectus in step (14.15). The Cloud Control Server (14200) is further operable to create an alert based on the analysis of the meta logs using Trumpet in step (14.16).

FIG. 15 provides an end-to-end process flow that illustrates the interaction of key functions in an exemplary File Leaked to Unregistered External Endpoint use case. In step (15.1) the Registered Internal User uses the Registered Internal Endpoint (15100) to log into the Cloud Portal comprised within the Cloud Control Server (15200) of the Forensic Computing Platform. In step (15.2) the Cloud Control Server (15200) is operable to allow access using entitlements that have previously stored in Guardian and associated with the Registered Internal User's credentials. In step (15.3) the Cloud Control Server (15200) receives a data access request from the Registered Internal Endpoint (15100). Guardian determines if the data access request is valid for the credentials associated with the Registered Internal User and the Registered Internal Endpoint. If the data access request is valid, data is retrieved from Enclave in step (15.5). Data may be downloaded, shared with internal users or shared with external users in accordance with entitlements for the Registered Internal User. In this example, the retrieved data is first encoded with Chaperone in step (15.6) and sent to the Registered External Endpoint (15300) in step (15.7). Meta logs are created by the Cloud Control Server (15200) in step (15.8). The Cloud Control Server (15200) is operable to store the meta logs in step (15.9). In step (15.10) the file comprised of Chaperone encoding is sent to Unregistered External Endpoint (15400) constituting a leak of information to this Unregistered Endpoint. In step (15.11) the file opened on the Unregistered External Endpoint (15400) which causes Chaperone encoding to send forensic data back to the Cloud Control Server (15200) as shown in step (15.12). Meta logs are created by the Cloud Control Server (15200) in step (15.13). The Cloud Control Server (15200) is operable to store the meta logs in step (15.14). The Cloud Control Server (15200) is further operable to analyze log data in step (15.15) using Prophet. The Cloud Control Server (15200) is further operable to create a report based on the analysis of the meta logs using Prospectus in step (15.16). The Cloud Control Server (15200) is further operable to create an alert based on the analysis of the meta logs using Trumpet in step (15.17).

FIG. 16 provides an end-to-end process flow that illustrates the interaction of key functions in an exemplary File Leaked to Registered Internal Endpoint use case. As previously described in FIG. 15, a Registered Internal User uses the Registered Internal Endpoint (16100) to log into the Cloud Portal comprised within the Cloud Control Server (16200) of the Forensic Computing Platform. The Cloud Control Server (16200) is operable to allow access using entitlements that have previously stored in Guardian and associated with the Registered Internal User's credentials. The Cloud Control Server (16200) receives a data access request from the Registered Internal Endpoint (16100). Guardian determines if the data access request is valid for the credentials associated with the Registered Internal User and the Registered Internal Endpoint. If the data access request is valid, data is retrieved from Enclave in step (16.1). Data may be downloaded, shared with internal users or shared with external users in accordance with entitlements for the Registered Internal User. In this example, the retrieved data is first encoded with Chaperone in step (16.2) and sent to the Registered External Endpoint (16300) in step (16.3). Meta logs are created by the Cloud Control Server (16200) in step (16.4). The Cloud Control Server (16200) is operable to store the meta logs in step (16.5). In step (16.6) the file comprised of Chaperone encoding is sent to Unregistered External Endpoint (16400) constituting a leak of information to this Unregistered Endpoint. In step (16.7) the file is opened on the Unregistered External Endpoint (16400) which causes Chaperone encoding to send forensic data back to the Cloud Control Server (16200) as shown in step (16.8). In step (16.9) the leaked file comprised of Chaperone encoding is sent Registered Internal Endpoint (16100). In step (16.10) the file is opened on the Registered Internal Endpoint (16100) which causes Chaperone encoding to send forensic data back to the Cloud Control Server (16200) in step (16.11). Meta logs are created by the Cloud Control Server (16200) in step (16.12). The Cloud Control Server (16200) is operable to store the meta logs in step (16.13). The Cloud Control Server (16200) is further operable to analyze log data in step (16.14) using Prophet. The Cloud Control Server (16200) is further operable to create a report based on the analysis of the meta logs using Prospectus in step (16.15). The Cloud Control Server (16200) is further operable to create an alert based on the analysis of the meta logs using Trumpet in step (16.16).

FIG. 17 provides an end-to-end process flow that illustrates the interaction of key functions in an exemplary File Leaked to a Plurality of Unregistered External Endpoints from an Unregistered External Endpoint use case. As previously described in FIG. 16, a Registered Internal User uses the Registered Internal Endpoint (17100) to log into the Cloud Portal comprised within the Cloud Control Server (17200). The Cloud Control Server (17200) is operable to allow access using entitlements that have previously stored in Guardian and associated with the Registered Internal User's credentials. The Cloud Control Server (17200) of the Forensic Computing Platform receives a data access request from the Registered Internal Endpoint (17100). Guardian determines if the data access request is valid for the credentials associated with the Registered Internal User and the Registered Internal Endpoint. If the data access request is valid, data is retrieved from Enclave in step (17.1). Data may be downloaded, shared with internal users or shared with external users in accordance with entitlements for the Registered Internal User. In this example, the retrieved data is first encoded with Chaperone in step (17.2) and sent to the Registered External Endpoint (17300) in step (17.3). Meta logs are created by the Cloud Control Server (17200) in step (17.4). The Cloud Control Server (17200) is operable to store the meta logs in step (17.5). In step (17.6) the file comprised of Chaperone encoding is sent to Unregistered External Endpoint (17400) constituting a leak of information to this Unregistered Endpoint. In step (17.7) the file is opened on the Unregistered External Endpoint (17400) which causes Chaperone encoding to send forensic data back to the Cloud Control Server (17200) as shown in step (17.8). In step (17.9) the leaked file comprised of Chaperone encoding is sent to a plurality of Unregistered External Endpoints (17500) constituting an unauthorized leak of the information to the plurality of Unregistered External Endpoints (17500). In step (17.10) the file is opened on the plurality of Unregistered External Endpoints (17500) (17100), which causes Chaperone encoding to send forensic data back to the Cloud Control Server (17200) in step (17.11). Meta logs are created by the Cloud Control Server (17200) in step (17.12). The Cloud Control Server (17200) is operable to store the meta logs in step (17.13). The Cloud Control Server (17200) is further operable to analyze log data in step (17.14) using Prophet. The Cloud Control Server (17200) is further operable to create a report based on the analysis of the meta logs using Prospectus in step (17.15). The Cloud Control Server (17200) is further operable to create an alert based on the analysis of the meta logs using Trumpet in step (17.16).

FIG. 18 provides an end-to-end process flow that illustrates the interaction of key functions in an exemplary File Leaked to an Unregistered External Endpoint from a Registered Internal Endpoint use case. As previously described in FIG. 17, a Registered Internal User uses the Registered Internal Endpoint (18100) to log into the Cloud Portal comprised within the Cloud Control Server (18200) of the Forensic Computing Platform. The Cloud Control Server (18200) is operable to allow access using entitlements that have been previously stored in Guardian and associated with the Registered Internal User's credentials. The Cloud Control Server (18200) receives a data access request from the Registered Internal Endpoint (18100). Guardian determines if the data access request is valid for the credentials associated with the Registered Internal User and the Registered Internal Endpoint. If the data access request is valid, data is retrieved from Enclave in step (18.1). Data may be downloaded, shared with internal users or shared with external users in accordance with entitlements for the Registered Internal User. In this example, the retrieved data is first encoded with Chaperone in step (18.2) and downloaded to the Registered Internal Endpoint (18100) in step (18.3). Meta logs are created by the Cloud Control Server (18200) in step (18.4). The Cloud Control Server (18200) is operable to store the meta logs in step (18.5). In step (18.6) the file comprised of Chaperone encoding is sent to Unregistered External Endpoint (18400) constituting a leak of information to this Unregistered Endpoint. The leaked file(s) can be leaked by email, portable storage device, DropBox, or other technical means of transferring the file(s). If the file was leaked through email, the deployed Scout is operable to scan the email headers and meta log relevant information such as the recipient email other information comprised within the email header. If the file was leaked using a cloud storage platform such as DropBox, the deployed Scout is operable to scan the DropBox folder to discover the file or files leaked. In step (18.7) the leaked file is opened on the Unregistered External Endpoint (18400) which causes Chaperone encoding to send forensic data back to the Cloud Control Server (18200) as shown in step (18.8). Meta logs are created by the Cloud Control Server (18200) in step (18.9). The Cloud Control Server (18200) is operable to store the meta logs in step (18.10). The Cloud Control Server (18200) is further operable to analyze log data in step (18.11) using Prophet. The Cloud Control Server (18200) is further operable to create a report based on the analysis of the meta logs using Prospectus in step (18.12). The Cloud Control Server (18200) is further operable to create an alert based on the analysis of the meta logs using Trumpet in step (18.13).

FIG. 19 provides an end-to-end process flow that illustrates the interaction of key functions in an exemplary Printed File Leaked to an Unregistered External Endpoint from a fax machine use case. As previously described in FIG. 18, a Registered Internal User uses the Registered Internal Endpoint (19100) to log into the Cloud Portal comprised within the Cloud Control Server (19200) of the Forensic Computing Platform. The Cloud Control Server (19200) is operable to allow access using entitlements that have been previously stored in Guardian and associated with the Registered Internal User's credentials. The Cloud Control Server (19200) receives a data access request from the Registered Internal Endpoint (19100). Guardian determines if the data access request is valid for the credentials associated with the Registered Internal User and the Registered Internal Endpoint. If the data access request is valid, data is retrieved from Enclave in step (19.1). Data may be downloaded, shared with internal users or shared with external users in accordance with entitlements for the Registered Internal User. In this example, the retrieved data is first encoded with Chaperone in step (19.2) and downloaded to the Registered Internal Endpoint (19100) in step (19.3). Meta logs are created by the Cloud Control Server (19200) in step (19.4). The Cloud Control Server (19200) is operable to store the meta logs in step (19.5). In step (19.6) the file comprised of Chaperone encoding is printed. It is important to note that this file is comprised of printable and scannable codes which may be visible or invisible to the Registered Internal User or Unregistered External user.

In this scenario, a combination of printable and scannable codes will allow the document to be traced back to the point of leakage from the Registered Internal Endpoint (19100). In connection with this example, the disk comprised within the fax machine may be scanned using a deployed agent operable to detect the scannable codes resulting in forensic data about the leaked document as shown in step (19.11) which is sent to the Cloud Control Server (19200). In another exemplary embodiment of data leakage using fax, a fax server may be comprised of a deployed application that is operable to read and detect the combination of codes comprised within the faxed document as the documents are transmitted. In this example, the codes can be transmitted as forensic data to the Cloud Control Server (19200). Meta logs are created by the Cloud Control Server (19200) in step (19.12). The Cloud Control Server (19200) is to operable store the meta logs in step (19.13). (Note—In an alternative exemplary embodiment, the Guardian functional component of the Cloud Control Server is operable to react to the meta data received from the fax server and prevent the file or files from being transmitted.) Continuing now with the description of FIG. 19, the Cloud Control Server (19200) is further operable to analyze log data in step (19.14) using Prophet. The log data can be examined to determine if the file was faxed in accordance with company policy and in accordance with the entitlements of the Registered Internal User. The Cloud Control Server (19200) is further operable to create a report based on the analysis of the meta logs using Prospectus in step (19.15). The Cloud Control Server (18200) is further operable to create an alert based on the analysis of the meta logs using Trumpet in step (19.16).

FIG. 20 is a four quadrant depiction of activities by risk based on normal and abnormal behavior which are determined by the Analytics Component (10) as previously described in FIG. 1. Quadrant A is the intersection of normal behavior and authorized activities and represents the lowest risk of activities related to the Forensic Computing Platform. Quadrant B is the intersection of abnormal behavior but where activities are otherwise authorized and therefore are suspicious. Quadrant C is the intersection of normal behaviors but where the activities are unauthorized and therefore represent policy violations. Quadrant D is the intersection of abnormal behavior and where the activities are also unauthorized and therefore represents the highest risk activities.

FIG. 21 is an example of suspicious activities, as defined in FIG. 20, as happening within the intersection of abnormal behavior but where activities are otherwise authorized. As shown in line 21.1, Registered Internal User 1 downloads a higher than average number of files compared to other users or when compared to the history of downloads performed by Registered Internal User 1. Line 21.1 also represents downloads of files by Registered User 1 that are of a restricted classification such as PCI, PHI, or company confidential. The user may have the authority to download such files but the activity itself is suspicious because of the classified nature of the files. In another example of suspicious activity, line 21.2 represents files shared with Registered External 1 that are downloaded from a new IP address for this user or a new endpoint for this user.

FIG. 22 is an example of activities that constitute policy violations, as defined in FIG. 20, as happening within the intersection of normal behaviors but where the activities are unauthorized. Line 22.1 shows Registered Internal User 1 downloading files of a restricted classification and then emailing those restricted files to Registered External User 1 in line 22.2. Although Registered Internal User 1 is authorized to download these files and could have formally shared the files with Registered External User 1 using the file sharing component of the Forensic Computing Platform, the user chose to email the files instead, therefore constituting a low risk policy violation.

FIG. 23 is an example of the highest risk activities, as defined in FIG. 20, as happening within the intersection of abnormal behavior and where the activities are also unauthorized. Line 23.1 shows Registered Internal User 1 downloading files of a restricted classification. Although the Registered Internal User is authorized to download these files, it constitutes a high risk activity as a result of the classification of the files and the volume of files. Line 23.2 shows that the Registered Internal User 1 emails the files of a restricted classification to an Unregistered External User 2, constituting a high-risk security violation.

FIG. 24 is an example of the lowest risk activities as defined in FIG. 20 as happening within the intersection of normal behavior and authorized activities and represents the lowest risk of activities related to the Forensic Computing Platform. As shown in line 24.1 a Registered Internal User 1 downloads an average number of files of an unrestricted classification to an endpoint at a known IP address for this user. As shown in line 24.2 a Registered External User 1 downloads shared files of an unrestricted classification from a known IP address for this user.

We have described herein a Forensic Computing Platform and its functional and technical components with exemplary work flows and use cases. Although we have described the invention in detail, it should be apparent that various modifications and changes may be made without departing from the spirit and scope of the present invention. Consequently, these and other modifications are contemplated to be within the spirit and scope of the following claims.

We claim:

1. A computing system comprising one or more network devices, the one or more network devices comprising one or more microprocessors and one or more memories that store executable instructions that, when executed by the one or more microprocessors, facilitate performance of operations, comprising:
   receiving meta data associated with an electronic file stored at an endpoint, the meta data comprising:
   one or more of a file name associated with the electronic file, a creation date on which the electronic file was created, a modification date on which the electronic file was modified, one or more data element tags, and
   an endpoint identifier that is indicative of the endpoint on which the electronic file is stored;
   analyzing the meta data based on one or more of a configured setting and a policy;
   determining, based on the analyzing of the meta data, a pattern of data use that constitutes a deviation from normal behavior, wherein the deviation from normal behavior is determined based on a detected significant number of new electronic files related to historical behavior for one or more of a user, a set of users, and the endpoint; and
   in response to determining the deviation from normal behavior, performing one or more responsive actions.

2. The system of claim 1, wherein the one or more data element tags are capable of being used to determine a data classification associated with the electronic file.

3. The system of claim 1, wherein the one or more data element tags are indicative of a type of data included within the electronic file and wherein the deviation from normal behavior is based at least in part on the type of data included within the electronic file.

4. The system of claim 1, wherein the configured setting is stored in a settings database, and the configured setting is used to determine the significant number of new electronic files to control user authorization to download data and user authorization to share data using the computing system.

5. The system of claim 4, wherein the significant number of new electronic files is determined as a number of new electronic files that exceeds a predetermined threshold set for the user, the set of users, or the endpoint.

6. The system of claim 2, wherein the data classification is usable to determine, based on the one or more of the configured setting and policy, whether the electronic file is unauthorized.

7. The system of claim 1, wherein the policy comprises one or more of a standard policy, a customized policy, a data protection policy, a policy unique to an enterprise, and a foreign jurisdiction policy.

8. The system of claim 1, wherein the one or more responsive actions comprises one or more of reporting, alerting, redacting, deleting, encrypting, and archiving the electronic file.

9. The system of claim 1, further comprising determining that the electronic file is unauthorized based on the one or more of the configured setting and policy.

10. The system of claim 9, wherein the determining that the electronic file is unauthorized comprises determining that the electronic file is located at an unauthorized device.

11. The system of claim 9, wherein the determining that the electronic file is unauthorized comprises determining that the electronic file is unauthorized for downloading by a user.

12. The system of claim 9, wherein the determining that the electronic file is unauthorized comprises determining that the electronic file is unauthorized for sharing by a user.

13. The system of claim 5, wherein the detected significant number of new electronic files is based at least in part on a number of electronic files accessed.

14. The system of claim 5, wherein the detected significant number of new electronic files is based at least in part on a number of electronic files downloaded.

15. The system of claim 5, wherein the detected significant number of new electronic files is based at least in part on a number of electronic files shared.

16. The system of claim 1, wherein the meta data associated with the electronic file further comprises a user identifier and wherein the deviation from normal behavior is related to a spike in activity for the user.

17. The system of claim 1, wherein the one or more of a configured setting and a policy is associated with one or more of a user, a set of users, and the endpoint.

18. The system of claim 1, wherein the meta data associated with the electronic file further comprises an IP address and wherein the deviation from normal behavior is further determined based on a detected volume of activity that deviates from an average volume of activity for the IP address.

19. A method related to computing forensics, the method comprising:
   transmitting machine-executable instructions to one or more network devices comprising one or more processors and one or more memories, wherein the machine-executable instructions are stored in the one or more memories, and wherein the machine-executable instructions when executed by the one or more processors enable the one or more network devices to:
   receive meta data associated with an electronic file stored at an endpoint, the meta data comprising:
   one or more of a file name of the electronic file, a creation date on which the electronic file was created, a modification date on which the electronic file was modified, a data element tag, and
   an endpoint identifier that is usable to identify the endpoint on which the electronic file is stored;
   analyze the meta data based on one or more of a configured setting and a policy;
   determine a pattern of data activity that constitutes a deviation from a normal pattern of data activity, wherein the deviation from the normal pattern of data activity is determined by detecting a significant number of new electronic files compared to historical activity for one or more of a user, a set of users, and the endpoint; and perform one or more responsive actions related to determining the pattern of data activity that constitutes the deviation from the normal pattern of data activity.

20. The method of claim 19, wherein the significant number of new electronic files is determined to exceed an average number of files received or exceed a predetermined threshold of total electronic files related to one or more of the user, the set of users, and the endpoint.

21. The method of claim 19, wherein the data element tag is used to determine a data classification associated with the electronic file.

22. The method of claim 19, wherein the data element tag is indicative of a type of data included within the electronic file.

23. The method of claim 19, wherein the configured setting relates to a configured threshold for user authorization to access the electronic file.

24. The method of claim 19, wherein the configured setting relates to a configured threshold for user authorization to upload or download the electronic file.

25. The method of claim 19, wherein the configured setting relates to a configured threshold for user authorization to share the electronic file.

26. The method of claim 19, wherein the one or more responsive actions comprises one or more of a redaction of the electronic file, a deletion of the electronic file, an encryption of the electronic file, and sending an alert regarding the deviation from normal behavior.

27. The method of claim 19, wherein the one or more responsive actions comprises predicting data breaches based on changes in data topology at the endpoint, wherein the change in data topology reflects the deviation from normal behavior.

28. The method of claim 27, wherein the changes in data topology reflect that data of a specific data classification leaked onto the endpoint.

29. The method of claim 19, wherein the pattern of data activity that constitutes the deviation from the normal pattern of data activity is based at least in part on one or more of a number of electronic files downloaded to or from the endpoint, a number of electronic file access attempts, and a number of classified electronic files discovered on the endpoint.

30. The method of claim 26, wherein the alert may be generated based on an anomaly wherein a user has sent or received a number of electronic files that exceeds the average number of electronic files sent or received by the user or exceeds a preestablished threshold of total electronic files sent or received.

* * * * *